butanol mixture. In carrying out this reaction, it is generally preferred to utilize temperatures of from about 75° C. to about 200° C. for from about one hour to about one hundred hours. Generally, several molecular proportions of selenium dioxide are added during the reaction period. The application of this reaction is fully illustrated in copending patent application, Serial No. 672,550, filed August 18, 1957. It is also described by Meystre et al. in Helvetica Chimica Acta, vol. XXXIX, page 734.

A double bond at the 6(7)-position can be introduced using chloranil in refluxing n-amyl alcohol or preferably tertiary butyl alcohol by the method of Agnello and Laubach as set forth in the Journal of the American Chemical Society, vol. 79, page 1277. This procedure by which a double bond is introduced at the 6(7)-position using a quinone having an oxidation-reduction potential less than −0.5 at a temperature between 70° C. and 190° C in an inert organic solvent with a boiling point of at least about 70° C. is also described and illustrated in United States Patent No. 2,836,607, issued July 27, 1958.

The 3-keto-pregnenes, pregnadienes or pregnatrienes so prepared are readily convertible to $\Delta^{9(11)}$-compounds by dehydration with methanesulfonyl chloride in pyridine according to known procedures illustrated in the appended examples. The reaction is carried out with an ester which is then hydrolyzed.

The $\Delta^{9(11)}$-compounds are next converted to 9,11-dihalo compounds. The $9\alpha,11\beta$-dichloro or the $9\alpha,11\beta$-dibromo compounds may be prepared by reaction of the selected $\Delta^{9(11)}$-compound with molecular halogen in a reaction inert organic solvent at a suitable temperature. The time of the reaction is not critical and may be from one-half to twenty-four hours. In preferred procedures, the reaction time is from about two to about six hours. This range is preferred since it provides good yields within an industrially practical period of time.

Some product is, of course, formed by contacting any amount of halogen with the selected steroid substrate but for practical purposes, at least an equimolar portion, or preferably a molar excess, of halogen will be employed. Thus, it is preferred to utilize from about 1.0 to about 1.25 moles of halogen for each mole of steroid substrate.

A number of reaction inert solvents are suitable for carrying out the reaction. These include, for example, lower aliphatic acids containing up to four carbon atoms, halogenated hydrocarbons containing up to two carbon atoms, saturated ethers, aliphatic nitriles containing up to four carbon atoms and dimethylsulfoxide. There may be mentioned by way of example acetic acid, propionic acid, butyric acid, propionitrile, methylene chloride, ethylene chloride, chloroform, dioxane and tetrahydrofuran. Acetic acid is preferred at the temperatures where it is liquid because of its excellent solvent powers and because it is relatively inexpensive. Mixed solvent systems may also be employed.

The temperature of the reaction is not critical. Temperatures as low as −5° C. or as high as 50° C. may be employed. As a practical matter, the reaction will generally be carried out at room temperature, i.e., from about 20° C. to about 30° C. For some operations, however, it may be convenient to utilize lower temperatures, say for example, from about 0° C. to about 10° C. since this decreases the possibility of halogen vapors escaping to the atmosphere.

The products are isolated in accordance with standard procedures. One may simply evaporate the solvent to leave the desired product as a residue. It is best in this case to triturate the residue with dilute aqueous alkali, for example, 5% sodium carbonate solution. If a water miscible solvent such as acetic acid is used, one may dilute the reaction mixture with water and extract the resulting solution with water immiscible solvents such as lower dialkyl ethers or halogenated hydrocarbons. Suitable extraction solvents include diethyl ether, methyl isopropyl ether, ethylene chloride and chloroform. The organic solution is then washed with dilute aqueous alkali such as 5% sodium or potassium carbonate. It may then be washed with water and dried over an anhydrous drying agent such as sodium or magnesium sulfate. The desired product is recovered by distilling off the solvent, preferably, in vacuo after removal of the drying agent. It is also possible in some instances to precipitate the product by simply adding water to the reaction mixture.

Preparation of $9\alpha$-bromo-$11\beta$-chloro compounds may be accomplished by reaction between a $\Delta^{9(11)}$-steroid substrati and N-bromoacetamide in the presence of anhydrous hydrogen chloride. The procedure used is substantially similar to that used in the preparation of the dichloro and dibromo compounds, that is, the solvents may be the same, the temperature range may be the same and the time of reaction may be the same. The molecular halogen of the previously described reaction is, of course, replaced with anhydrous hydrogen chloride and n-bromoacetamide. These reagents are used preferably in an amount equal to from about 1.0 to about 1.25 molar portions of each reagent per mole of steroid substrate. The $9\alpha$-chloro-$11\beta$-fluoro compound is similarly prepared using N-chloroacetamide and anhydrous hydrogen fluoride.

For the preparation of a $9\alpha$-bromo-$11\beta$-fluoro compound, the anhydrous hydrogen chloride of the previous reaction is replaced with anhydrous hydrogen fluride. The hydrogen fluoride may be added directly or may be generated in situ by reaction between a fluoride salt, for example, potassium fluoride and an acid, preferably, an acid used as a solvent such as acetic acid or propionic acid.

A large molar excess, say for example, from 100% to 300% excess of hydrogen fluoride is used. The reaction should be carried out in the presence of the fluoride ion since this aids in the production of the final compound. The ion can be provided by the use of an exxess of inorganic salt which decomposes at least to some extent in the solvent to produce the fluoride ion and a metallic ion. Alternatively, the fluoride ion can be produced by using an excess of hydrogen fluoride in the presence of an oxygenated solvent, preferably, an ether solvent such as dioxane or tetrahydrofuran. These latter solvents aid in bringing about at least partial disassociation of the hydrogen fluoride to produce hydrogen ions and fluoride ions. Otherwise, the conditions of this reaction are substantially similar to the conditions utilized in the previous reaction, i.e., the same solvents are useful, the time and temperature are the same and the amount of N-bromoacetamide used is the same.

The 9,11-dihalo compounds thus obtained are converted to the corresponding 21-desoxy compounds using p-toluenesulfonic acid and hydrogen iodide. The procedure is well known and is readily applied by first converting the 21-hydroxyl group to a tosyl ester and then reducing the compound so obtained with hydrogen iodide. The procedure is illustrated in the examples. These compounds serve as starting compounds for the preparation of the 9,11-dihalo-21-methyl steroids of this invention.

In the first step of the process of this invention, the 21-desoxy compounds are converted to 21-aminomethyl compounds by treatment with an amine acid addition salt and formaldehyde. The amine salt may be symmetrical or non-symmetrical, cyclic or non-cyclic. Preferably, it is a lower alkyl amine salt containing up to four carbon atoms in each alkyl group. These latter are generally preferred since they are readily available at reasonable cost. Preferred amine salts included, for example, diethylamine sulfate, methyl ethyl amine sulfate, di-n-butyl amine hydrobromide and ethyl isopropylamine hydriodide. Hydrochloride salts are generally preferred and of these, dimethyl amine hydrochloride is the most desirable since it is most readily available and gives good yields. Further, it is sometimes desirable to add small amounts of acid before or during the reaction so as to maintain the pH of the reaction mixture at from about 2.5 to about 5.0. This is most conveniently accomplished with hydrochloric acid.

In carrying out the reaction, the reactants are mixed together in the selected solvent and maintained at a temperature of from about 90° C. to about 140° C. for from about two to about twenty-four hours. The preferred solvents for the reaction are alkanols containing up to five carbon atoms, although other lower aliphatic oxygenated solvents can be used. The preferred alkanols are n-propanol and n-butanol since they reflux at atmospheric pressure within the preferred temperature range. Obviously, however, higher boiling solvents can be used, although usually not at the reflux temperature. Similarly, lower boiling solvents such as methyl and ethyl alcohol are useful if the reaction is carried out under pressure. It is generally most convenient to employ an excess of the paraldehyde and amine salt, to insure as complete a reaction as possible of the more expensive pregnene derivatives. A molar excess of from about 50% to about 600% or even more can be used. The amount is not critical.

The reaction will often be carried out in an inert atmosphere, for example, a nitrogen atmosphere so as to minimize loss of reaction product by side reactions. This, however, is not necessary.

At the end of the reaction period, the desired product may be isolated by evaporating the solvent, preferably in vacuo, purified by triturating with hot dilute hydrochloric acid followed in the case of compounds forming soluble hydrochlorides with hot water. The water and dilute acid solutions are combined and made basic with dilute aqueous alkali, for example, 10% sodium carbonate, bicarbonate or similar reagent. Occasionally, the pure product will precipitate from the basic solution and may be recovered by filtration. If it does not precipitate, it may be extracted with a water immiscible lower hydrocarbon or halogenated hydrocarbon solvent such as ethylene chloride, chloroform, carbon tetrachloride, chlorobenzene, hexane or octane. The desired product is then recovered from the organic solvent by evaporation in vacuo. The extraction step may also be employed with those products which precipitate from the alkaline solution and thus increase the overall yield.

In the case of compounds forming insoluble hydrochlorides, the residue from the trituration step is recovered by filtration and extracted with an organic solvent such as chloroform which dissolves the impurities. The hydrochloride is recovered by filtration and may be converted to the free base by treatment with dilute aqueous alkali as described above.

Compounds prepared in this manner are new and valuable intermediates and are included within the purview of this invention. They may be represented by the following formulas wherein X, Y, $R_1$, $R_2$, $R_3$, and $R_5$ have the same meaning as above, and $R_7$ and $R_8$ are alkyl containing up to four carbon atoms:

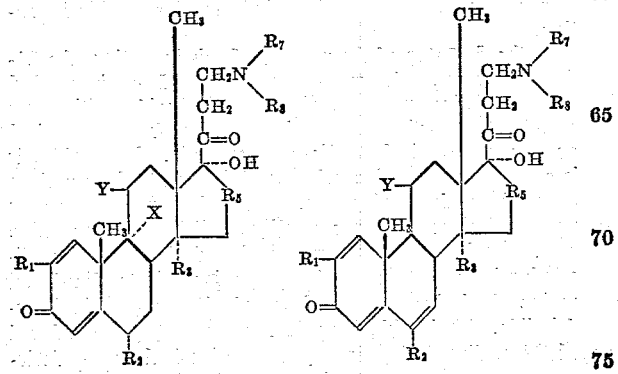

It will be noted that the formulas set forth above do not include compounds having no double bond at the 1,2-position. These compounds are prepared by a different procedure which will be set forth in more detail below.

Amines prepared as described above are next converted to quaternary ammonium halides using procedures generally employed for this purpose. Thus, for example, the amine is mixed in a lower alkanol solvent, e.g. methanol or ethanol with an alkyl halide containing up to four carbon atoms and simply allowed to stand for from about six to about sixteen hours at from about 20° C. to about 30° C. Usually an excess of as much as fifty percent or more of alkyl halide will be used, but this is not essential. The solvent is removed, for example, by evaporation in vacuo and the product recovered as a residue. It may be purified by trituration with ether, acetone or other similar solvent. Methanol and ethanol are the preferred solvents for the reaction because of their good solubility characteristics and also because they can be readily evaporated due to their low boiling point.

The preferred alkyl halides are methyl or ethyl bromide. These are preferred because they are the easiest to obtain and because at the temperatures used, they are liquids. Other alkyl halides such as methyl or ethyl chloride can be used but they are usually less convenient since they are gases at ordinary temperature and pressure. Butyl bromide, methyl iodide, or isopropyl chloride may be employed. The iodides are generally not preferred because they form insoluble precipitates when the quaternary compound is decomposed to form the propenoyl compounds in accordance with the equations shown below. They can be used, however, and the product purified by repeated recrystallizations or by standard chromatographic procedures.

The quaternary ammonium halides so prepared are new compounds and are specifically included within the scope of this invention. They are represented by the following formulas wherein X, Y, $R_1$, $R_2$, $R_3$, $R_5$, $R_7$ and $R_8$ have the same meaning as above; $R_9$ is alkyl containing up to four carbon atoms and Z is halogen.

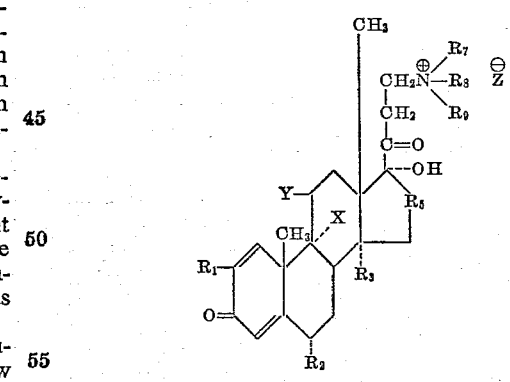

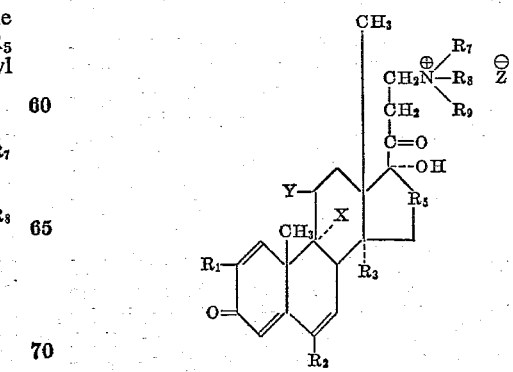

A quaternary compound thus prepared is next converted to a 17β-propylene compound. This is accomplished by reaction with water or aqueous alkali for from about one to about six hours at a temperature of from

United States Patent Office 3,064,017
Patented Nov. 13, 1962

3,064,017
9,11-DIHALO-21-METHYL STEROID COMPOUNDS AND PROCESS OF PREPARATION
Sanford K. Figdor, Gales Ferry, and Gerald D. Laubach, Lyme, Conn., assignors to Chas. Pfizer & Co., Inc., New York, N.Y., a corporation of Delaware
No Drawing. Filed Dec. 12, 1960, Ser. No. 75,089
16 Claims. (Cl. 260—397.45)

This application is concerned with new and useful steroid compounds and with pharmaceutical compositions containing them. More particularly, it is concerned with therapeutically active steroids characterized by the presence of halogen atoms at the 9- and 11-positions and a methyl group at the 21-position. It is concerned also with the process by which these valuable compounds are prepared and with intermediates used in the process.

The 9,11-dihalo-21-methyl compounds within the purview of this invention include those having the formulas:

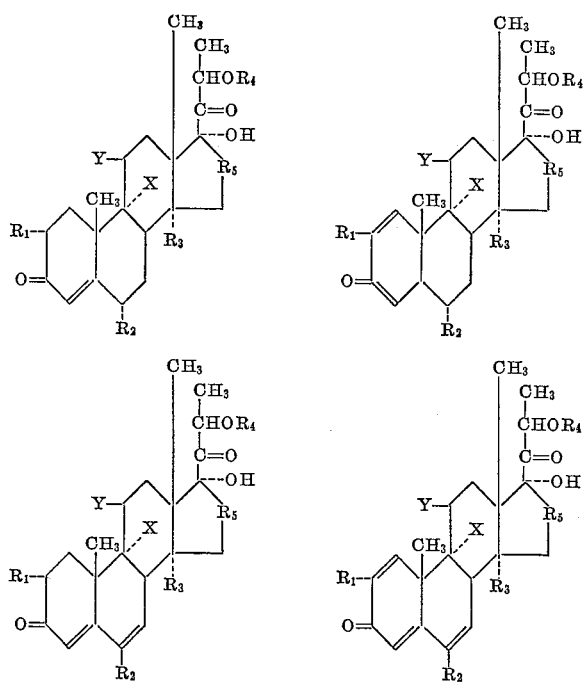

In the above structures, $R_1$ is hydrogen or methyl; $R_2$ is hydrogen, fluorine, chlorine or methyl; $R_3$ is hydrogen or hydroxyl; $R_4$ is hydrogen or acyl and $R_5$ is

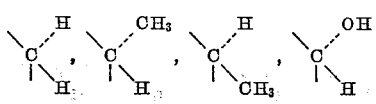

and

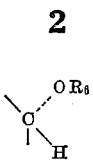

wherein $R_6$ is an acyl group. An acyl group wherever located is derived from mono- or dicarboxylic acids containing only carbon, hydrogen and oxygen up to a total of five carbon atoms. The water solubility of compounds derived from dicarboxylic acids is enhanced by conversion to alkali metal or alkaline earth metal salts by reaction with a suitable base such as sodium carbonate or calcium hydroxide. These salts are included within the purview of this invention.

In the above structures, Y is selected from the group consisting of chlorine and fluorine when X is chlorine and is selected from the group consisting of chlorine, bromine and fluorine when X is bromine. Further, no more than one of the carbon atoms at the 2, 6, 14 or 16-positions is substituted with other than hydrogen atoms. In other words, the total number of substituents other than hydrogen atoms in any particular compound in the 2, 6, 14 and 16-positions is from zero to one, i.e., no more than one.

Also included within the purview of this invention are further compounds in which the hydroxyl groups at the 16- and 17-positions are derivatized with aldehydes or ketones containing from two to nine carbon atoms to form cyclic acetals or ketals known generically as acetonides, in this case, 16α,17α-acetonides. The acetonide moiety in the compounds of this invention contains from two to nine carbon atoms.

The acetonides within the purview of this invention are prepared by procedures well known to those skilled in the art. They may be prepared, for example, by the procedure described by Woodward et al. in the Journal of the American Chemical Society, 74, p. 4241 (1952). In this procedure, the steroid compound is taken up in the carbonyl compound, for example, acetone, methyl ethyl ketone or di-n-butyl ketone which has been dried over a suitable drying agent such as anhydrous potassium carbonate. Anhydrous copper sulfate is added and the mixture agitated for from about 24 to 48 hours. The mixture is then filtered and the desired product recovered, for example, by removal of the solvent in vacuo. Other methods of forming acetals and ketals are also applicable. For example, the steroid may be taken up in the liquid aldehyde or ketone and refluxed in the presence of a catalytic amount of a mineral acid such as concentrated hydrochloric acid, for from about 1 to about 10 minutes. The desired product is precipitated by the addition of water.

The following synthetic scheme sets forth one application of the process of this invention and illustrates the preparation of 9α,11β-dichloro-21-methyl-Δ¹,⁴-pregnadiene-17α,21-diol-3,20-dione 21-acetate, one of the compounds of this invention.

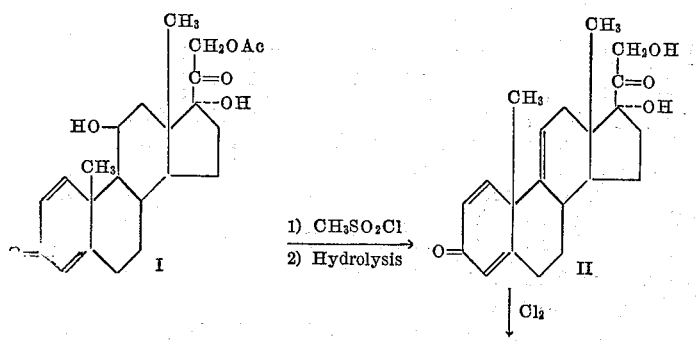

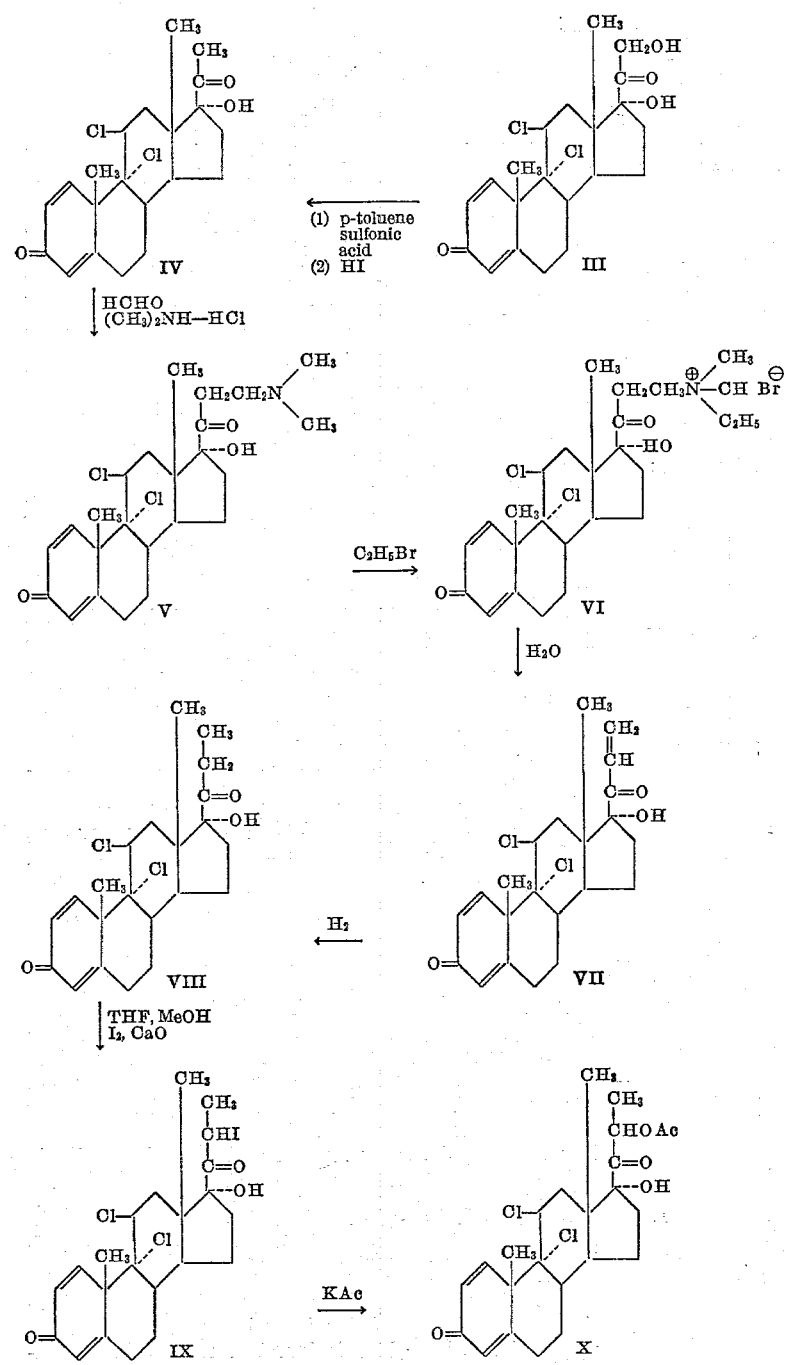

Starting compounds used in the preparation of this invention are set forth in the following table which also shows a source describing their prepartion.

Hydrocortisone_____ U.S. Patent 2,658,023.
2-methylhydrocortisone_____ JACS 77, 6401 (1955).
6-methylhydrocortisone_____ JACS 78, 6213 (1956).
6-chlorohydrocortisone_____ JACS 80, 6464 (1958).
6-fluorohydrocortisone_____ U.S. Patent 2,838,498.
14α-hydroxyhydrocortisone_____ U.S. Patent 2,745,784.
16α-hydroxyhydrocortisone_____ JACS 78, 1909 (1956).
16α-methylhydrocortisone_____ JACS 80, 3160, (1958).
16β-methylhydrocortisone_____ JACS 80, 4435 (1958).

Many of these compounds are described as 21-acetates or other esters in the original sources. These may readily be converted to the free alcohols by acid or basic hydrolysis using procedures well known in the art. Others are described as the free alcohols and these can be readily converted to 21-esters, for example, the acetates by reaction with an acylating agent such as acetic anhydride and pyridine in accordance with well known procedures.

The 3-keto-Δ⁴-compounds set forth above are readily converted to Δ¹,⁴-, Δ⁴,⁶- or Δ¹,⁴,⁶-compounds using known procedures.

A double bond can be introduced at the 1(2)-position by contacting the steroid compound with selenium dioxide in an inert organic solvent at an elevated temperature. Solvents which are useful for this reaction include, for example, tertiary butanol, tertiary pentanol, benzene, ethylene glycol diethers such as dibutyl Cellosolve, the dipropyl ether of ethylene glycol and various other glycol ethers, phenetole, xylene, dioxane and naphthalene. Preferred conditions include the addition of a lower aliphatic acid, particularly acetic acid to a tertabout 20° C. to about 30° C. Temperatures below and above this preferred range can be used although less satisfactorily. Thus, if a temperature considerably below 20° C. is used, the reaction is too slow to be practical and if a temperature considerably above 30° C. is used, there may be some decomposition of the desired product.

Although the desired products form by simple reaction with water, they form more readily and often in higher yields if the reaction is carried out at an alkaline pH of from 7.5 to about 12. The desired alkalinity may be effected by adding a small amount of aqueous solutions containinf from about 2% to about 10% by weight of an alkali or alkaline earth metal hydroxide, oxide, carbonate, bicarbonate or alkali metal acetates, tartrates or citrates.

In summary, the desired products are formed by mixing the quaternary lower alkyl ammonium halides illustrated above in an aqueous solution at a pH of from about 7 to about 12 at a temperature of from about 20° C. to about 30° C. for a period of from about one to about six hours.

The aqueous solution may contain a small amount of tert-butanol to enhance solubility.

Usually the desired product will precipitate from the reaction mixture as it forms and reaction is complete when no more precipitate forms. Occasionally, however, the desired product will not precipitate. In these cases, the product may be isolated by extraction with a water immiscible hydrocarbon or halogenated hydrocarbon solvent including, for example, ethylene dichloride, chloroform, carbon tetrachloride, chlorobenzene and benzene. It is, of course, possible to use an extraction procedure whether or not the product precipitates and this may often result in better overall yields. If an extraction step is used, it may be desirable to add a small amount of acid to the aqueous mixture to insure that all of the amine by-product of the main reaction is converted to an acid salt which is insoluble in the organic solvent.

Occasionally, when a quaternary iodide is used, the iodide salt which forms is insoluble in water. Obviously, this could lead to contamination of the final product particularly if it is insoluble in water and co-precipitates with the iodide salt. In these instances and in any other instances where there is co-precipitation of the main product and by-product, it is always preferred to use an extraction step.

The propenoyl compounds are isolated from the organic solvent by removal of the solvent in vacuo, preferably after drying the solvent using an anhydrous drying agent such as sodium or magnesium sulfate. The product may be further purified by recrystallization from a suitable solvent such as methyl alcohol.

These new and valuable intermediates are included within the purview of this invention. They are represented by the following formulas wherein X, Y, $R_1$, $R_2$, $R_3$, and $R_5$ have the same meaning as above.

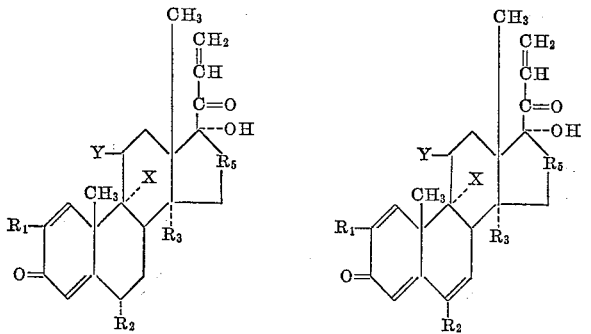

It is also possible to prepare propenoyl compounds directly from the amine. Thus, the amine acid addition salt may be taken up in ethanol and the quaternizing agent together with a small amount of basic reagent such as potassium acetate added. The mixture is refluxed for approximately 5 minutes. The product is isolated by removal of most of the solvent and precipitation with water. The procedure is illustrated in the examples.

In the next step of this process, the propenoyl group at the 17β-position is reduced to a propanoyl group with hydrogen in the presence of a catalyst. In carrying out the reduction process, i.e., the hydrogenation process, it is preferred to employ temperatures of from about 15° C. to about 35° C. although somewhat higher temperatures are not deleterious. Hydrogen pressures at from slightly below atmospheric to about 10 atmospheres may be employed. Generally speaking, room temperature and atmospheric pressure are simplest and are fully satisfactory. The reduction should be terminated when the theoretical amount of hydrogen has been adsorbed. This can be readily determined by observing the change in pressure of the hydrogen. At atmospheric pressure using laboratory quantities of reactants, the theoretical amount of hydrogen is generally consumed in less than an hour. For commercial operations, the duration of the reaction may be somewhat increased. The time of the reaction is not critical.

The products of the reaction may be isolated with relative ease; preferably, the catalyst is filtered and the solvent removed in vacuo. Often, the desired product is obtained in sufficient purity for the next reaction by simply removing the solvent. In other cases, it may be desirable to subject the material to conventional purification procedures such as recrystallization or chromatography.

The preferred catalyst for the reaction is palladium and this may be used with or without a carrier. Especially useful catalysts include 10% palladium on carbon or palladium on calcium carbonate. The proportion of catalyst to reactants is not critical and may vary widely. Between about 10% aand about 500% by weight of the steroid is satisfactory and between 50% and 100% is preferred.

The hydrogenation should be conducted in a liquid system. The choice of solvent is not critical. Suitable solvents include lower aliphatic oxygenated solvents containing up to five carbon atoms such as alkanols, esters or ketones including methanol, ethanol, ethyl acetate, propyl acetate, acetone and methyl isopropyl ketone.

The 21-methyl compounds prepared by this process are new and valuable intermediates. They are included within the purview of this invention. They may be represented by the following formulas wherein X, Y, $R_1$, $R_2$, $R_3$, and $R_5$ have the same meaning as above.

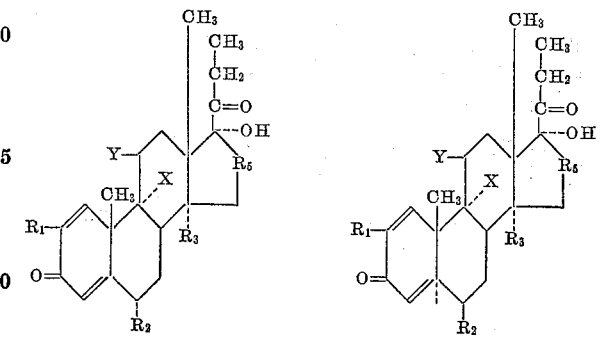

In the next step of this synthesis, the compounds are converted to 21-iodo derivatives under highly selective conditions. The reaction involves the treatment of the steroid in a solvent system consisting of tetrahydrofuran and a lower alkanol containing up to four carbon atoms in a volume ratio of two to one with from 4 to 6 molar equivalents of calcium oxide and 1.5 to 2 molar eqoivalents of iodine, the solvent system containing tertiary butyl hydroperoxide in a quantity equivalent to from 0.006 to 0.018 g. iodine/ml. tetrahydrofuran. The temperature of the reaction is from about 2 to about 5 hours.

The product may be isolated by pouring the reaction mixture into water which may contain sodium thiosulfate and acetic acid whereupon the desired product precipitates and can be recovered by filtration. The purpose of the thiosulfate and acetic acid is to destroy excess iodine.

The reaction may be carried out in an inert atmosphere, for example, a nitrogen atmosphere to minimize side reactions. This is not necessary, however.

These 21-iodo compounds are new and valuable intermediates. They may be represented by the formulas shown below wherein X, Y, $R_1$, $R_2$, $R_3$, and $R_5$ have the same meaning as above.

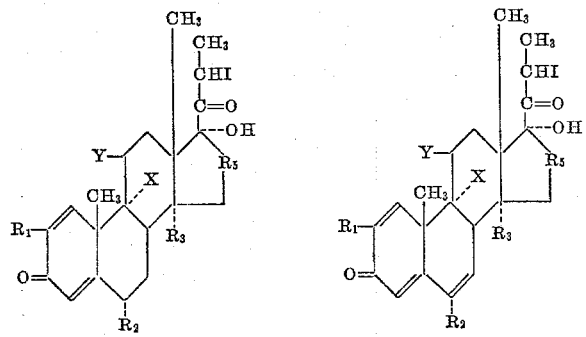

The iodo compounds are next converted to acyloxy compounds by replacement of the iodine atom with an acyloxy group containing up to five carbon atoms. Basically, this is a reaction with a sodium or potassium salt of an organic acid, and it may be carried out either by direct addition of the sodium or potassium salt to a solution of the iodo steroid or by in situ formation of the salt in the solution containing the steroid. In either event, the reaction is between the iodo steroid and the salt, for example, sodium or potassium acetate, propionate, butyrate or valerate, and takes place in a lower aliphatic oxygenated solvent containing up to five carbon atoms including esters such as ethyl acetate or ketones such as acetone or methyl isopropyl ketone. The reaction takes place at a temperature of from about 40° C. to about 100° C. during a period of from about four to about twenty-four hours. A large excess of salt is generally employed to insure complete reaction of the steroid. Thus, a quantity of the salt ranging from about 200% to about 2000% or even more is used with from about 1000% to about 2000% being preferred.

In a preferred operation, the salt is generated in situ by adding the steroid in acetone to an acetone solution containing equimolar portions of potassium bicarbonate and acetic acid or other selected acid and refluxing the mixture for from about 10 to about 16 hours. A sufficient quantity of acid and salt should be used to generate the desired excess of the potassium salt.

Whichever procedure is used, the product may be isolated by removing the solvent in vacuo and washing the residue with a minimum amount of water to remove the inorganic salts. Alternatively, the reaction mixture may be diluted with water and the resulting solution filtered to obtain the desired compound or extracted with an organic solvent. Suitable solvents include hydrocarbon and halogenated hydrocarbon solvents containing up to seven carbon atoms including, for example, benzene, toluene, chlorobenzene, carbon tetrachloride or chloroform. The product is isolated from the organic solution preferably by removal of the solvent in vacuo. It is desirable although not necessary to dry the organic solution over an anhydrous drying agent such as sodium or magnesium sulfate before evaporating the solvent.

By application of the above process, the 21-esters of the $\Delta^{1,4}$ and $\Delta^{1,4,6}$-compounds within the purview of this invention are prepared. They may be converted to free alcohols by gentle hydrolysis, for example, by treatment with dilute potassium carbonate in aqueous methanol.

The procedures set forth above are applicable only to compounds having a double bond at the 1,2-position, i.e., 1,2-dehydro compounds. The reason for this is that the reaction between the amine salt, formaldehyde and the steroid substrate leads to replacement of a hydrogen at the 2-position with an aminomethyl group in 1,2-dihydro compounds. When another substituent is present in the 2-position of 1,2-dihydro compounds, for example, a methyl group or a fluorine atom, the tendency for additional substitution is decreased, but it may still be an appreciable side reaction.

This difficulty can be overcome by reducing the 3-keto group so that the 2-position is no longer activated by the presence of the carbonyl function. Before the 3-ketone is reduced, the ketone group at the 20-position is protected by formation of the ketal derivative. The 3-ketone is then reduced, the ketal group removed by hydrolysis, and the resulting 3-hydroxy compound converted to a 21-aminomethyl compound under the conditions described above.

It is possible to reoxidize the hydroxyl group at the 3-position before forming the quaternary salt, but because of the lability of the amino group, it is preferred to carry the reaction through to the preparation of the propenoyl compound before oxidation. The compound thus obtained is reduced to a propanoyl compound which may be converted to $\Delta^{4,6}$-compounds by reaction with a quinone as described above. Alternatively, a $\Delta^{4,6}$-21-desoxy compound may be initially employed or the $\Delta^{4,6}$-derivative may be prepared from the propenoyl compound or at a subsequent step in the synthesis. These procedures are illustrated in the appended examples.

The $\Delta^{4}$- or $\Delta^{4,6}$-compounds so prepared may then be converted to the final compounds of this invention by iodination, acyloxylation, and, if desired, hydrolysis using the procedures set forth above.

The application of this series of reactions to the preparation of 9α,11β-dichloro-21-methyl-$\Delta^{4,6}$-pregnadiene-17α, 21-diol-3,20-dione 21-acetate is shown in the following synthetic sequence. The preparation of the 21-desoxy compound has already been described.

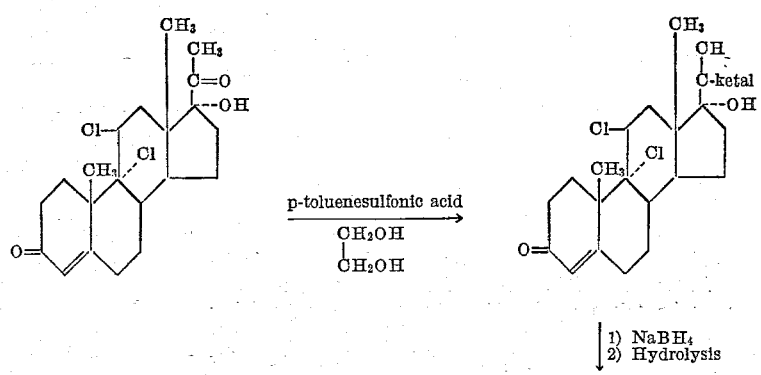

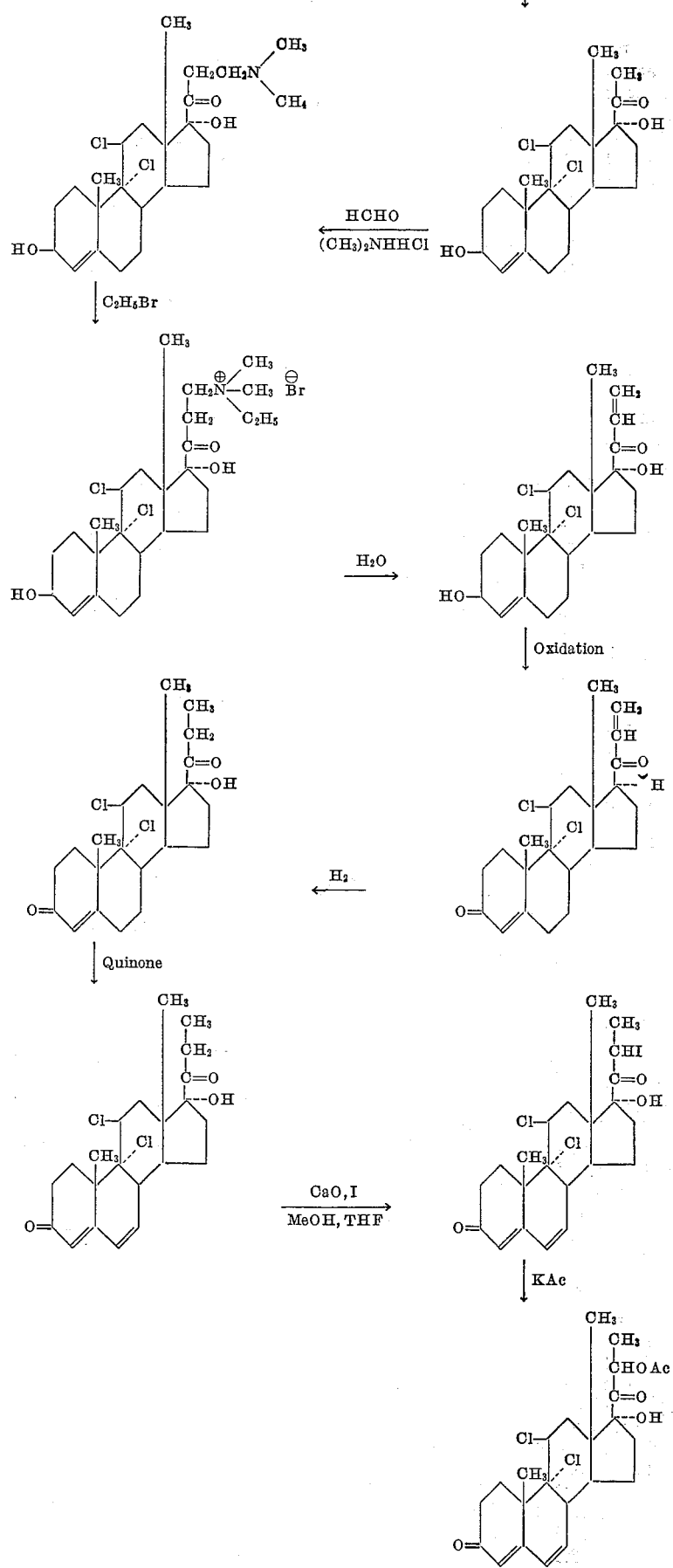

For the preparation of the 20-ketal, the Δ⁴-3-keto-9,11-dihalo-20-desoxy steroid substrate is refluxed for from about 15 to about 20 hours in benzene containing from about an equimolar portion to about a 10% excess of ethylene glycol or other glycol containing up to four carbon atoms in the presence of a catalytic amount of p-toluenesulfonic acid, usually in the form of the monohydrate. From about 0.5% to about 2.5% by weight of acid based on the weight of steroid substrate employed is sufficient. The reaction for best results should be carried out in such a manner that the water which forms is continuously removed from the reaction system, although it is not necessary.

The product may be isolated by removal of the solvent in vacuo and purified by trituration with dilute aqueous base, e.g., 5% aqueous sodium carbonate. Alternatively, the reaction mixture may be cooled, extracted with an equivalent aqueous base, the organic layer separated, dried over an anhydrous drying agent such as magnesium sulfate, filtered and the desired product recovered by removing the solvent in vacuo.

The product may be purified by recrystallization from a suitable solvent or solvent mixture, e.g., ethyl acetate or acetone-petroleum ether (B.P. 64–66° C.)

A small amount of 3-ketal or 3,20-diketal may form during the course of this reaction. These by-products are readily removed by recrystallization. The pure product is easily recognized by the presence of the characteristic Δ⁴-3-ketone peak at 1681–1677 reciprocal centimeters in the infra-red region of the spectrum.

The compounds prepared by this reaction are new and valuable intermediates and are included within the purview of this invention. They may be represented by the formulas:

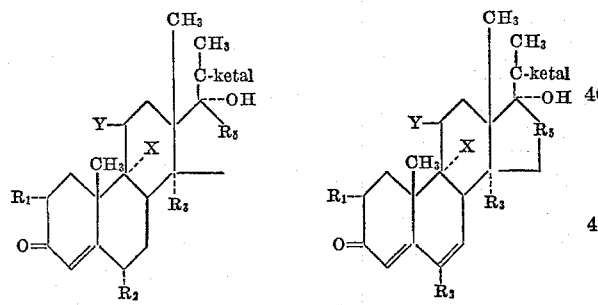

wherein the ketal moiety contains up to four carbon atoms $R_1$, $R_2$, $R_3$, $R_5$, $X$ and $Y$ have the same meaning as above.

Reduction of the 3-ketone group is accomplished by reaction with from about a 200% molar excess to about a 300% molar excess of sodium borohydride in a lower alkanol solvent containing up to three carbon atoms which may contain a small amount of water. The duration of the reaction is from about 30 minutes to about 3 hours. The reaction is most conveniently carried out at room temperature, i.e., from about 20° C. to about 30° C., although temperatures as low as 10° C. and as high as 40° C. can be used.

At the end of the reaction period, the excess reducing agent is decomposed by the addition of dilute aqueous mineral acid, e.g., 5% hydrochloric acid. The mixture may be clarified by filtration and the product isolated by removal of the solvent in vacuo. In preferred operations, the reaction mixture is extracted with an organic solvent such as ether, chloroform or ethylene dichloride after decomposition of the excess reducing agent. The organic layer is washed with dilute base, e.g., 5% sodium bicarbonate and the product isolated by removing the solvent in vacuo after drying over an anhydrous drying agent.

The products prepared by this reaction are new and valuable intermediates. They are included within the purview of this invention. They may be represented by the following formulas:

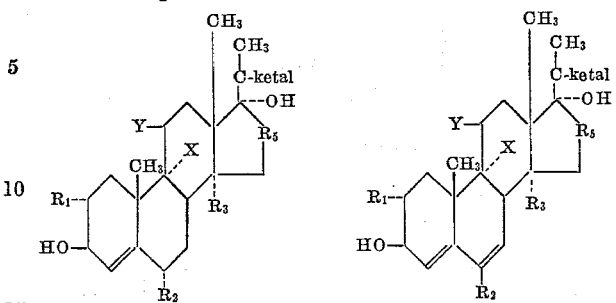

wherein the ketal moiety contains up to four carbon atoms $R_1$, $R_2$, $R_3$, $R_5$, $X$ and $Y$ have the same meaning as above.

The ketal group at the 20-position is next removed to regenerate the 20-ketone function. This is accomplished by acid hydrolysis using aqueous mineral acid such as hydrochloric, sulfuric, nitric or hydrobromic. The reaction is carried out in a water miscible lower alkanol such as methanol or ethanol. The amount of acid used is not critical since, at least in theory, one molecule of acid is sufficient to effect hydrolysis. As a practical matter, however, from about 4% to about 20% by volume of concentrated acid will be employed. A suitable mixture consists of 5 ml. of methanol, 1 ml. of water and 0.25 ml. of concentrated sulfuric acid. The duration of the reaction is from about 1 to about 4 hours. The temperature is from about 60° C. to about 100° C. Most conveniently, the reaction is carried out at the reflux temperature of the reaction mixture.

The product may be isolated as described above in connection with the isolation of the 3-hydroxy compound.

The compounds so prepared are new and valuable intermediates. They are included within the scope of this invention and may be represented by the formulas:

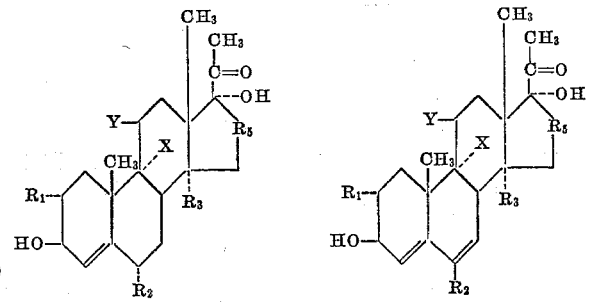

wherein $R_1$, $R_2$, $R_3$, $R_5$, $X$ and $Y$ have the same meaning as above.

The compounds obtained by this series of reactions are then treated with formaldehyde and an amine acid addition salt to obtain new and valuable intermediates represented by the formulas:

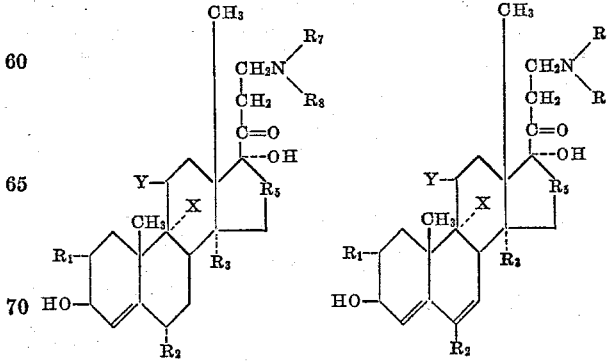

wherein $R_1$, $R_2$, $R_3$, $R_5$, $R_7$, $R_8$, $X$ and $Y$ have the same meaning as above. It is specifically intended to include these compounds within the purview of this invention.

Reaction of these compounds with a quaternizing agent followed by decomposition as described above gives a new and valuable series of intermediates represented by the formulas:

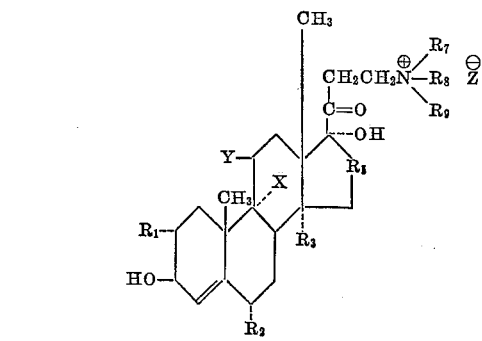

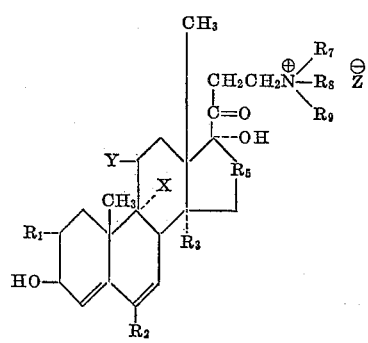

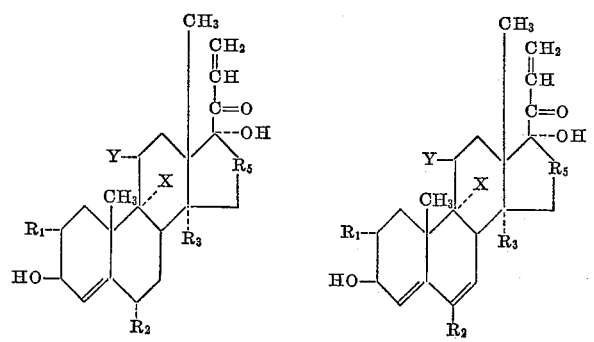

wherein $R_1$, $R_2$, $R_3$, $R_5$, $R_7$, $R_8$, $R_9$, X, Y and Z have the same meaning as above.

The hydroxyl group at the 3-position is next oxidized to form a 3-keto compound. The choice of oxidizing agent is not critical except in the case of 16-hydroxy compounds. It is preferred, however, to use chromic acid in accordance with standard procedures. One procedure which is especially effective is to use 8N chromic acid prepared by dissolving 66.7 g. of chromic acid in a minimum of water and adding 53.3 ml. of concentrated sulfuric acid. The mixture is then made up to a total volume of 250 ml. by the addition of acetone. The use of this reagent is illustrated in the examples.

Alternatively, the standard chromic acid-acetic acid couple can be employed. This reagent is prepared by dissolving sufficient chromium trioxide in a 9:1 acetic acid-water mixture to provide a solution containing 76 mg. of chromium trioxide per ml.

Other oxidizing agents well known in the art can also be used.

The 16-hydroxy compounds are selectively oxidized at the 3-position by shaking with from about a 100% to about a 400% molar excess of manganese dioxide in an aromatic hydrocarbon or halogenated hydrocarbon solvent containing up to six carbon atoms or acetone for from about 16 to about 24 hours at from about 20° C. to about 40° C. The procedure is illustrated in The Journal of the American Chemical Society, 75, 5930 (1953).

These compounds are new and are included within the scope of the invention. They are represented by the formulas:

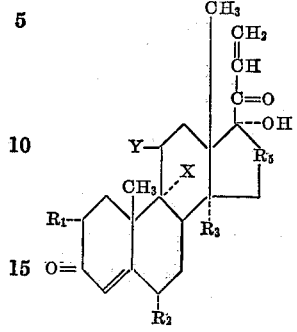 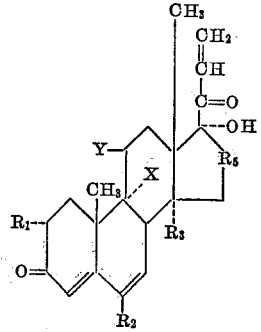

wherein $R_1$, $R_2$, $R_3$, $R_5$, X and Y have the same meaning as above.

Reduction, 21-iodination, acyloxylation and, if desired, hydrolysis provide the final compounds within the scope of this invention. In carrying out these reactions, a series of new and valuable intermediates which are specifically included in the invention are prepared. They are represented by the following formulas wherein $R_1$, $R_2$, $R_3$, $R_5$, X and Y have the same meaning as above.

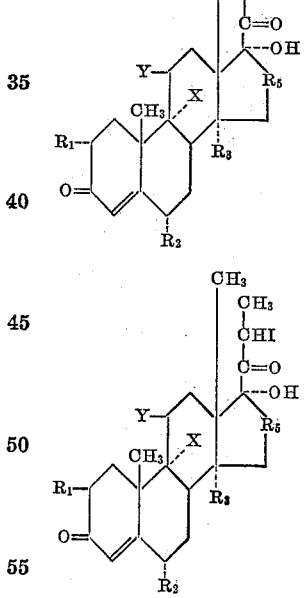 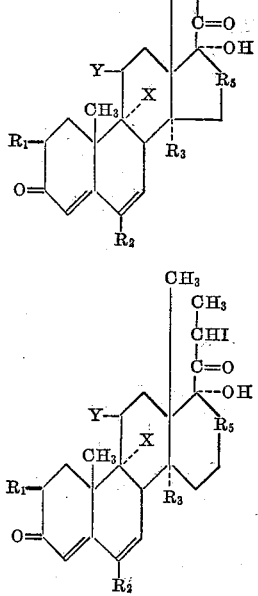

It will be recognized that these compounds are 1,2-dihydro analogs of compounds described above.

It will be apparent, then, that the process of this invention involves reacting a compound selected from the group consisting of those represented by the formulas:

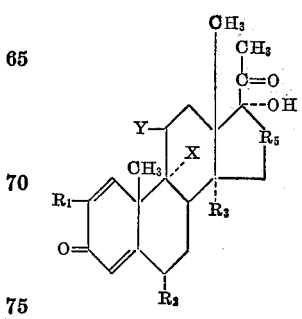 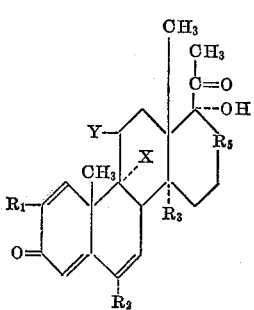

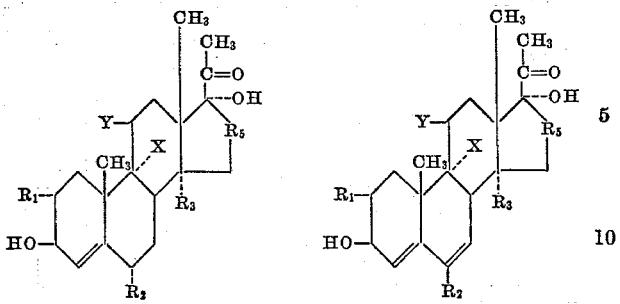

with a molar excess of formaldehyde and a lower dialkylamine salt, each alkyl group containing up to four carbon atoms at a pH of from about 2.5 to about 5.0 at a temperature of from about 90° C. to about 140° C. in an alkanol solvent containing up to five carbon atoms for a period of from about 2 to about 24 hours to produce a compound selected from the group consisting of those represented by the formulas:

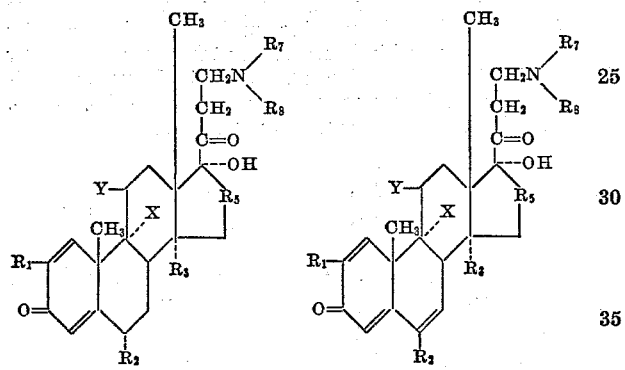

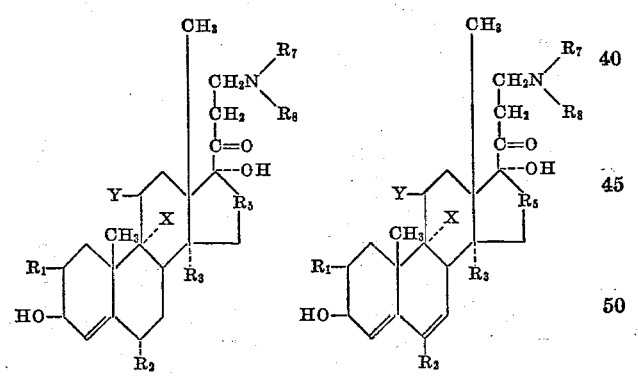

reacting said compound with an alkyl halide in a lower alkanol solvent containing up to two carbon atoms at a temperature of from about 20° C. to about 30° C. for a period of from about 6 to about 16 hours to produce a compound selected from the group consisting of those represented by the formulas:

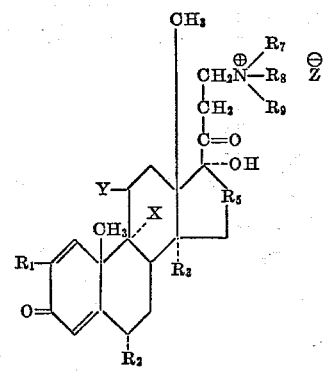

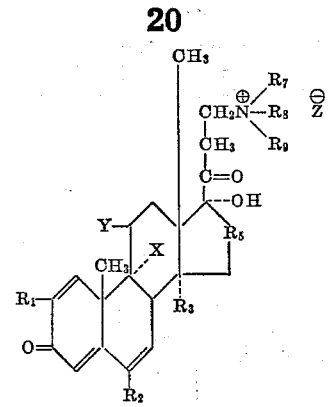

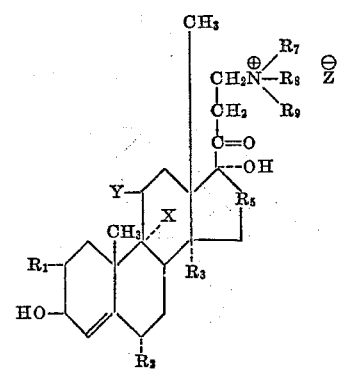

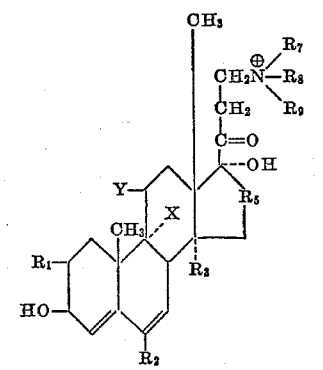

maintaining said compound in an aqueous solution at a pH of from about 7 to about 12 at a temperature of from about 20° C. to about 30° C. for a period of from about 1 to about 6 hours to produce a compound selected from the group consisting of those represented by the formulas:

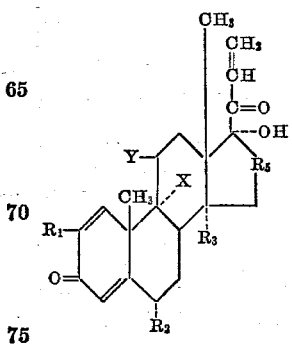 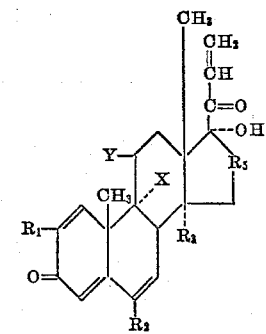

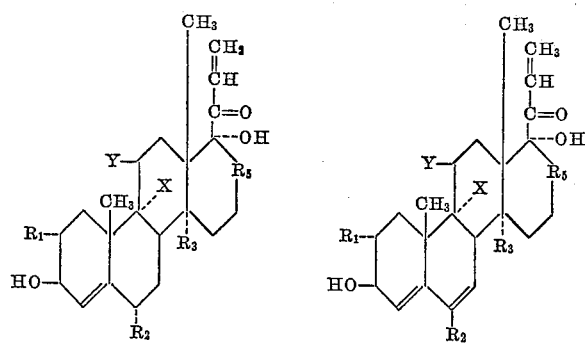

A 3-keto compound prepared as described above is reduced by reaction with hydrogen in the presence of palladium in a liquid medium at from about 15° C. to about 35° C. at a pressure of from about 1 to about 10 atmospheres to produce a compound selected from the group represented by the formulas:

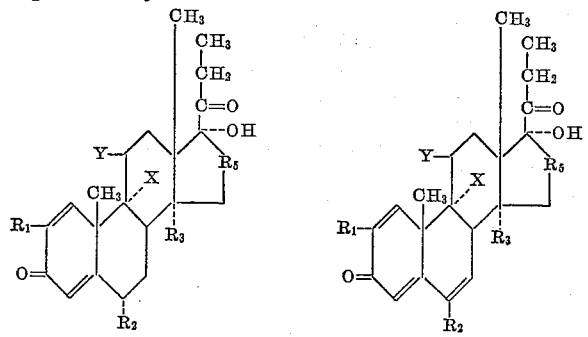

A 3-hydroxy compound prepared as described above is oxidized to produce a compound selected from the group consisting of those represented by the formulas:

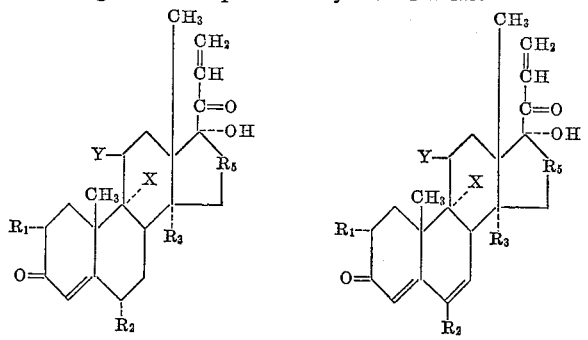

and then reduced by reaction with hydrogen in the presence of palladium in a liquid medium at from about 15° C. to about 35° C. at a pressure of from about 1 to about 10 atmospheres to produce a compound selected from the group consisting of those represented by the formulas:

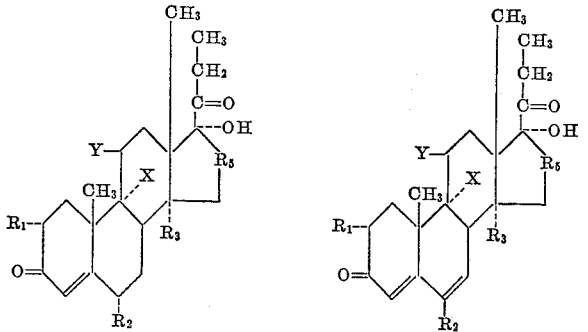

A 3-keto-17β-propanoyl compound whether $\Delta^4$-, $\Delta^{1,4}$-, $\Delta^{4,6}$- or $\Delta^{1,4,6}$- is converted to a 21-iodo compound by reaction with from 4 to 6 molar equivalents of calcium oxide and 1.5 to 2 molar equivalents of iodine in a solvent system comprising 2 volumes of tetrahydrofuran and 1 volume of a lower alkanol containing up to four carbon atoms, the said solvent system containing tertiary butyl hydroperoxide in a quantity of from 0.066 to 0.018 gram of iodine/ml. of tetrahydrofuran at a temperature of from about 20° C. to about 40° C. for a period of from about 2 to about 5 hours to produce a compound selected from the group consisting of those represented by the formulas:

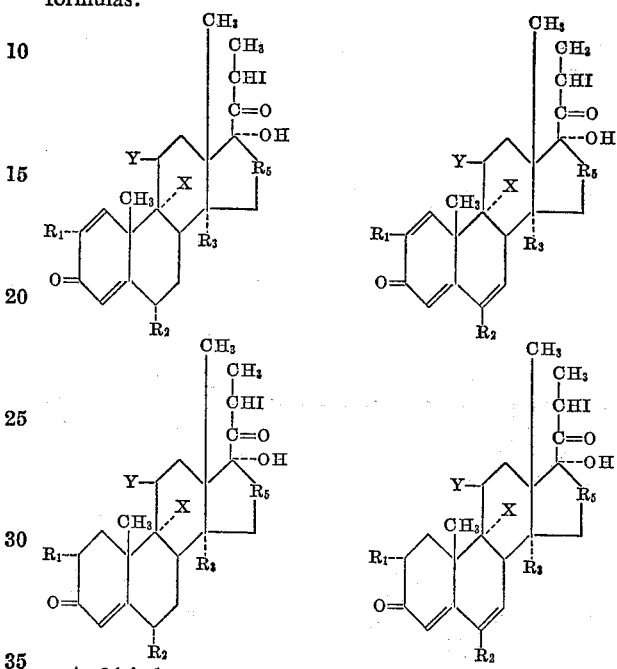

A 21-iodo compound is converted to a 21-acyloxy compound by reaction with from about a 200% molar excess to about a 2000% molar excess of a reagent selected from the group consisting of sodium and potassium salts of lower aliphatic organic acids containing up to five carbon atoms in a solvent selected from the group consisting of dimethyl formamide and aliphatic esters and ketones containing up to five carbon atoms at a temperature of from about 40° C. to about 100° C. for a period of from about 4 to about 24 hours to produce a compound selected from the group consisting of those represented by the formulas:

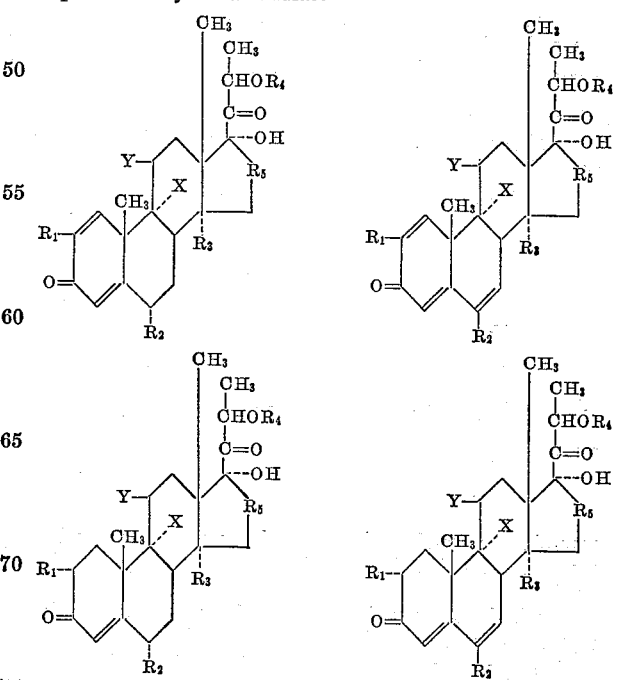

In the foregoing formal description of the process of this invention, $R_1$, $R_2$, $R_3$, $R_4$, $R_5$, $R_6$, $R_7$, $R_8$, $R_9$, X, Y and Z have exactly the same meaning as previously defined with one obvious exception. It will be apparent that treatment of the 21-iodo group with an alkali metal salt of a fatty acid can only produce 21-esters and that in the product of this reaction, $R_4$ cannot be hydrogen. The ester, however, can readily be hydrolyzed to produce a 21-hydroxy compound under standard conditions.

The process of this invention also includes within its scope a process whereby a compound selected from the group represented by the formulas:

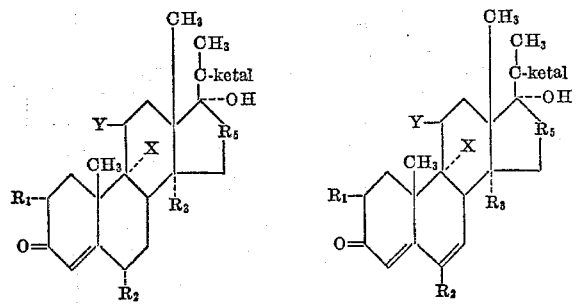

wherein the ketal moiety contains up to four carbon atoms $R_1$, $R_2$, $R_3$, $R_5$, X and Y have the same meaning as above, is prepared by refluxing a compound selected from the group represented by the formulas:

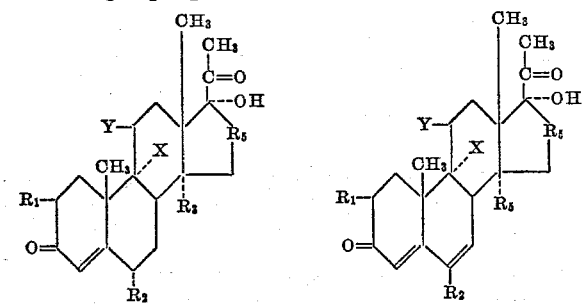

wherein $R_1$, $R_2$, $R_3$, $R_5$, X and Y have the same meaning as above in benzene containing from about an equimolar portion to about a 10% molar excess of ethylene glycol or other diol containing up to four carbon atoms and from about 0.5% to about 2.5% by weight of p-toluenesulfonic acid based on the weight of steroid substrate for from about 15 to about 20 hours. The 3-keto-20-ketals are reduced to 3-hydroxy compounds by reaction with from about a 200% molar excess to about a 300% molar excess of sodium borohydride in a lower alkanol containing up to three carbon atoms at a temperature of from about 10° C. to about 40° C. for a period of from about 30 minutes to about 3 hours. This reaction produces a compound having the formula:

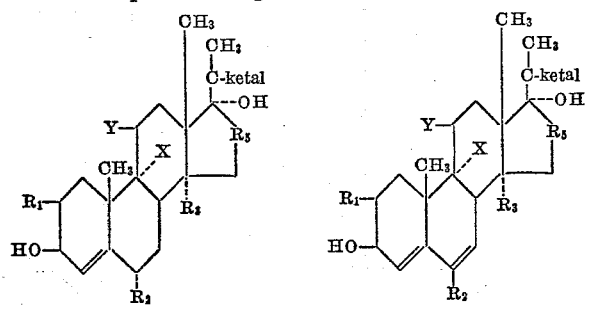

wherein the ketal moiety contains up to four carbon atoms $R_1$, $R_2$, $R_3$, $R_5$, X and Y have the same meaning as above.

The 20-keto group is regenerated by hydrolysis using aqueous mineral acid in a water miscible lower alkanol having up to three carbon atoms and containing about 4% to about 20% by volume of concentrated acid at a temperature of from about 60° C. to about 100° C. for a period of from about 1 to about 4 hours.

It should be noted that hydrolysis of the ketal group will, in the case of 16-acyloxy compounds, also hydrolyze the 16-ester. As indicated above, the resulting compound can be selectively oxidized with manganese dioxide. Re-esterification, if desired, is in accordance with standard procedures.

It will be apparent that there are four possible classes of compounds within the scope of this invention having hydroxyl groups at the 16- and the 21-positions. These are: (1) 16α,21-diol-21-esters, (2) 16α,21-diols, (3) 16α,21-diol-16,21-diesters and (4) 16α,21-diol-16-esters. Compounds of classes (1), (2) and (3) are prepared as described above. Thus, a compound of class (1) is prepared by conversion of a 16α-ol-21-iodo compound to a 21-ester. Compounds of class (2) can be prepared from compounds of class (1) by simple hydrolysis of the 21-ester. Compounds of class (3) can be prepared either by monoesterification of compounds of class (1) or by diesterification of compounds of class (2). It will be noted that in the former instance, it is possible to prepare 16,21-diesters in which the ester moieties are the same or different. In the latter instance, the diesters prepared will have the same ester moieties at the 16- and the 21-positions.

Compounds of class (4) are prepared by a procedure which is different from the procedure set forth above. The preparation of 9α,11β-dichloro-21-methyl-Δ⁴-pregnene-16α,17α,21-triol-3,20-dione 16-acetate, one of the compounds of this invention, by a procedure generally applicable to the preparation of compounds of class (4) is shown below.

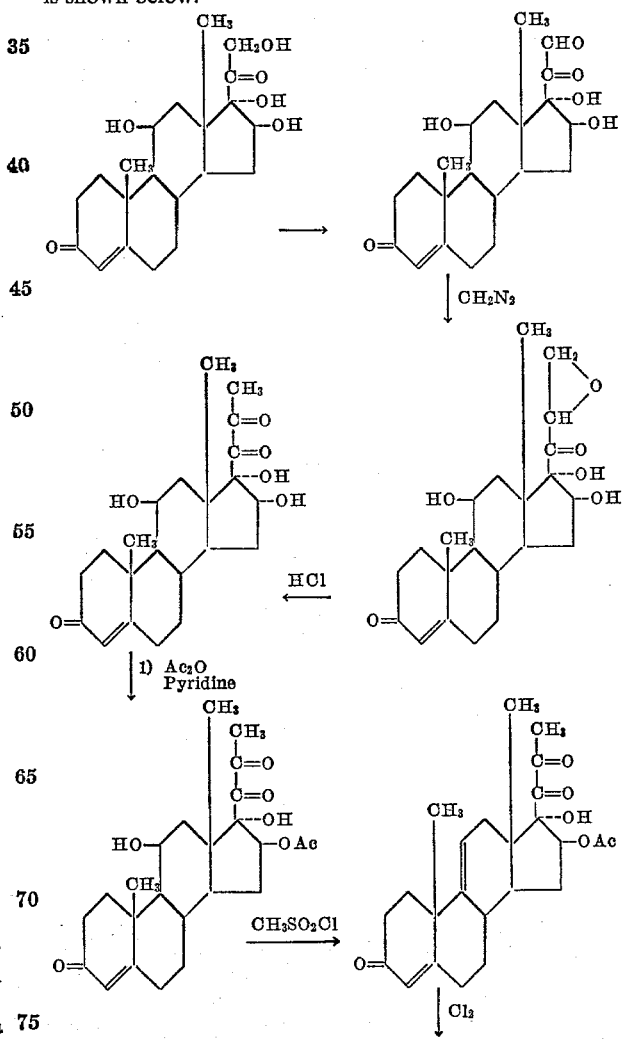

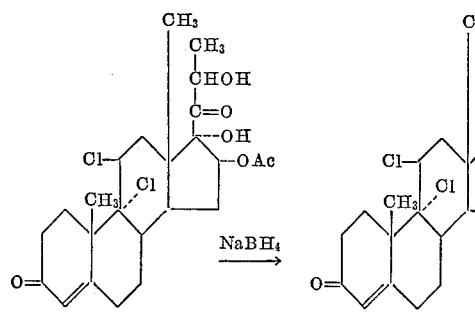

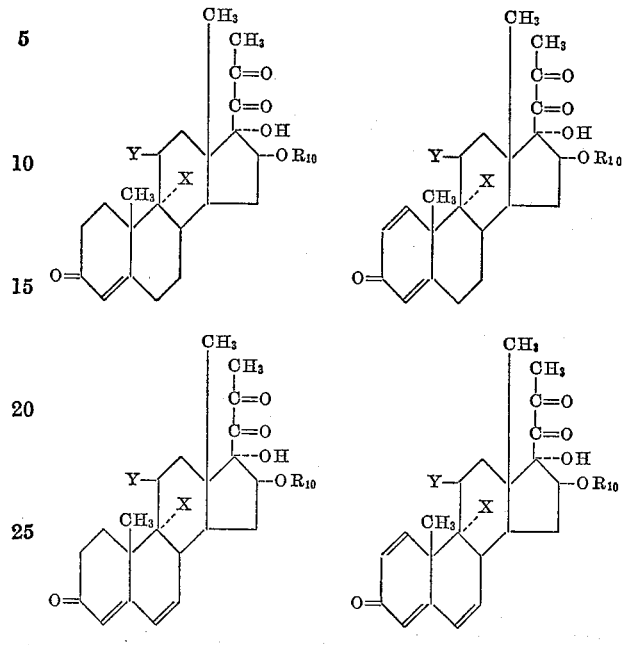

of this invention and may be represented by the following formulas:

wherein X and Y have the same meaning as above; and $R_{10}$ is an acyl hydrocarbon group containing only carbon hydrogen and oxygen up to a total of five carbon atoms as defined above.

Other compounds within the scope of this invention may also be prepared using the reaction sequence just described for the prepartion of 16α,21-diol-16-esters.

The biologically active compounds of this invention may be administered alone or in combination with acceptable pharmaceutical carriers, the choice of which is determined by the preferred route of administration, the solubility of the compounds and standard pharmaceutical practice. In general, the dosage of these compounds is of approximately the same order of magnitude as the dosages of hydrocortisone and these compounds are useful to treat the types of pathogenic conditions often treated with hydrocortisone. Because of their great adrenocortical activity, it is sometimes possible to use dosages of these compounds which are lower than those of hydrocortisone.

For oral administration, the compounds may be administered in the form of tablets containing excipients such as starch or milk sugar. Aqueous suspensions and elixirs which may be sweetened or flavored are also useful. For intra-articular injection, aqueous suspensions may be employed. In this case, various suspending and wetting agents may be added to the compositions to obtain a suspension not tending to settle out easily or to pack down in the bottle in which it is stored. Intramuscular and sub-cutaneous dosage forms may be prepared in accordance with standard procedures.

The compounds of this invention are especially valuable for topical administration to animals including humans to aid in the control of inflammations, burns and various eczemic conditions. For this use, they may be prepared in the form of ointments and salves in suitable bases especially non-aqueous petrolatum type bases.

The following examples are given solely for the purpose of illustration only and are not to be construed as limitations of this invention, many apparent variations of which are possible without departing from the spirit or scope thereof.

The following preparations illustrate the methods by which the starting compounds used in this invention are obtained.

The compound, 16α-hydroxyhydrocortisone is readily available. It may be converted to the corresponding $\Delta^1$-, $\Delta^4$- or $\Delta^{1,6}$-compounds by reaction with selenium dioxide or with a quinone by the procedures described above. These compounds may be converted to aldehydes by oxidation with cupric acetate using Weijlard's procedure set forth in U.S. Patent No. 2,773,078.

The aldehydes which may be either in the anhydrous or the monohydrated form are converted to epoxides by reaction with diazomethane in a reaction inert organic solvent at a temperature of from about 0° C. to about 25° C., preferably from about 0° C. to about 15° C. for a period of from about 1 to about 24 hours.

The epoxide may be converted to a 20,21-diketone by maintaining the epoxide in a lower polar aliphatic oxygenated solvent containing up to eight carbon atoms at a temperature of from about 50° C. to about 165° C. for a period of from about 1 to about 4 hours in the presence of hydrogen chloride, hydrogen bromide or hydrogen iodide. Suitable solvents include methanol, ethanol, hexanol, octanol, acetone, methylisopropyl ketone, propyl acetate and ethyl acetate. Ethyl acetate is especially preferred since it is readily available at a reasonable cost, and its use provides suitable yields.

The 20,21-diketone may be acylated at the 16-position in accordance with standard procedures.

The $\Delta^{9(11)}$-compounds are prepared by dehydration with methanesulfonyl chloride or other alkyl or arylsulfonyl halide in pyridine.

Conversion of the $\Delta^{9(11)}$-intermediates to the desired 9,11-dihalo compounds is effected as described above.

Reduction of the 20,21-diketone is accomplished with alkali metal hydrides such as sodium borohydride, potassium borohydride, lithium borohydride or a sodium alkoxy borohydride. The reaction is carried out by subjecting the steroid substrate to the action of the selected borohydride in a reaction inert organic solvent such as a lower alkanol, pyridine, or other amine at a temperature of from $-40°$ C. to 25° C., preferably, from about $-10°$ C. to about $+10°$ C. for a period of from about 2½ to about 8 hours. Approximately an equimolar proportion of borohydride is used, preferably from about 0.8 molar equivalents to about 1.4 molar equivalents. The preferred solvents are methanol and ethanol and these may contain small amounts of other solvents such as pyridine or dimethylformamide. If methanol is used as the solvent, it is possible to use as high as 2.8 molar equivalents of borohydride. This is associated with the known fact that borohydrides are less stable in methanol than in any other solvents.

Compounds prepared by halogenation of the $\Delta^{9(11)}$-16-acyloxy steroid described above are new and useful intermediates. They are specifically included within the scope

PREPARATION I $\Delta^{1,4}$-*Pregnadiene-11β,17α,21-Triol-3,20-Dione 21-Acetate*

A mixture of 0.8 gram of $\Delta^4$-pregnene-11β,17α,21-triol-3,20-dione 21-acetate, 0.8 grams of freshly sublimed selenium dioxide and 10 ml. of tert-butanol is heated in a nitrogen atmosphere for 10½ hours at 175° C. The solution is filtered and the desired product precipitated by the addition of water. It is isolated by filtration.

This procedure was used to prepare the following compounds from known starting materials:

2-methyl-$\Delta^{1,4}$-pregnadiene-11β,17α,21-triol-3,20-dione 21-acetate
6α-methyl-$\Delta^{1,4}$-pregnadiene-11β,17α,21-triol-3,20-dione 21-acetate
6α-chloro-$\Delta^{1,4}$-pregnadiene-11β,17α,21-triol-3,20-dione 21-acetate
6α-fluoro-$\Delta^{1,4}$-pregnadiene-11β,17α,21-triol-3,20-dione 21-acetate
$\Delta^{1,4}$-pregnadiene-11β,14α,17α,21-tetrol-3,20-dione 21-acetate
$\Delta^{1,4}$-pregnadiene-11β,16α,17α,21-tetrol-3,20-dione 21-acetate
16α-methyl-$\Delta^{1,4}$-pregnadiene-11β,17α,21-triol-3,20-dione 21-acetate
16β-methyl-$\Delta^{1,4}$-pregnadiene-11β,17α,21-triol-3,20-dione 21-acetate

PREPARATION II $\Delta^{4,6}$-*Pregnadiene-11β,17α,21-Triol-3,20-Dione 21-Acetate*

A mixture of 0.8 gram of $\Delta^4$-pregnene-11β,17α,21-triol-3,20-dione 21-acetate and 0.9 grams of chloranil in 70 ml. of tert-butanol was refluxed in a nitrogen atmosphere for 18 hours. The reaction mixture was then diluted with 150 ml. of chloroform. The solvent solution was washed with several small portions of 5% sodium hydroxide solution and then washed with water. It was dried over anhydrous sodium sulfate. The mixture was filtered and concentrated in vacuo. The residue was triturated with ether and dried in vacuo to obtain the desired product.

This procedure was used to prepare the following compounds from known starting materials:

$\Delta^{4,6}$-pregnadiene-11β,17α,21-triol-3,20-dione 21-acetate
2α-methyl-$\Delta^{4,6}$-pregnadiene-11β,17α,21-triol-3,20-dione 21-acetate
6-methyl-$\Delta^{4,6}$-pregnadiene-11β,17α,21-triol-3,20-dione 21-acetate
6-chloro-$\Delta^{4,6}$-pregnadiene-11β,17α,21-triol-3,20-dione 21-acetate
6-fluoro-$\Delta^{4,6}$-pregnadiene-11β,17α,21-triol-3,20-dione 21-acetate
$\Delta^{4,6}$-pregnadiene-11β,14α,17α,21-tetrol-3,20-dione 21-acetate
$\Delta^{4,6}$-pregnadiene-11β,16α,17α,21-tetrol-3,20-dione 21-acetate
16α-methyl-$\Delta^{4,6}$-pregnadiene-11β,17α,21-triol-3,20-dione 21-acetate
16β-methyl-$\Delta^{4,6}$-pregnadiene-11β,17α,21-triol-3,20-dione 21-acetate

PREPARATION III $\Delta^{1,4,6}$-*Pregnatriene-11β,17α,21-Triol-3,20-Dione 21-Acetate*

This compound was prepared from $\Delta^{4,6}$-pregnadiene-11β,17α,21-triol-3,20-dione 21-acetate using the procedure of Preparation I.

The procedure of Preparation I was repeated using the appropriate substrates from Preparation II to prepare the following compounds:

2-methyl-$\Delta^{1,4,6}$-pregnatriene-11β,17α,21-triol-3,20-dione 21-acetate
6-methyl-$\Delta^{1,4,6}$-pregnatriene-11β,17α,21-triol-3,20-dione 21-acetate
6-chloro-$\Delta^{1,4,6}$-pregnatriene-11β,17a,21-triol-3,20-dione 21-acetate
6-fluoro-$\Delta^{1,4,6}$-pregnatriene-11β,17α,21-triol-3,20-dione 21-acetate
$\Delta^{1,4,6}$-pregnatriene-11β,14α,17α,21-tetrol-3,20-dione 21-acetate
$\Delta^{1,4,6}$-pregnatriene-11β,16α,17α,21-tetrol-3,20-dione 21-acetate
16α-methyl-$\Delta^{1,4,6}$-pregnatriene-11β,17α,21-triol-3,20-dione 21-acetate
16β-methyl-$\Delta^{1,4,6}$-pregnatriene-11β,17α,21-triol-3,20-dione 21-acetate

PREPARATION IV $\Delta^{4,9(11)}$-*Pregnadiene-17,21-Diol-3,20-Dione 21-Acetate*

A solution containing 5 grams of $\Delta^4$-pregnene-11β,17α,21-triol-3,20-dione 21-acetate in 25 ml. of pyridine and 30 ml. of dimethylformamide is prepared. The solution is placed in a three-necked flask to which is affixed a sealed stirrer, a dropping funnel and a condenser. The condenser and dropping funnel are protected with drying tubes. The mixture is cooled to −20° C. and a solution containing 4.6 ml. of methanesulfonyl chloride in 5 ml. of pyridine is added dropwise over a period of 1 hour with continued stirring. At the end of the hour, stirring is stopped, the reaction mixture allowed to come to room temperature and left standing for 10 hours. At the end of this period, the solution is added dropwise to 750 ml. of ice cold water with stirring. The desired product precipitates and is recovered by filtration.

This procedure was used to prepare the following compounds from known starting materials:

2α-methyl-$\Delta^{4,9(11)}$-pregnadiene-17α,21-diol-3,20-dione 21-acetate
6α-methyl-$\Delta^{4,9(11)}$-pregnadiene-17α,21-diol-3,20-dione 21-acetate
6α-chloro-$\Delta^{4,9(11)}$-pregnadiene-17α,21-diol-3,20-dione 21-acetate
6α-fluoro-$\Delta^{4,9(11)}$-pregnadiene-17α,21-diol-3,20-dione 21-acetate
$\Delta^{4,9(11)}$-pregnadiene-14α,17α,21-triol-3,20-dione 21-acetate
$\Delta^{4,9(11)}$-pregnadiene-16α, 17α,21-triol-3,20-dione 16,21-diacetate
16α-methyl-$\Delta^{4,9(11)}$-pregnadiene-17α,21-diol-3,20-dione 21-acetate
16β-methyl-$\Delta^{4,9(11)}$-pregnadiene-17α,21-diol-3,20-dione 21-acetate
$\Delta^{1,4,9(11)}$-pregnatriene-17α,21-diol-3,20-dione 21 acetate
2-methyl-$\Delta^{1,4,9(11)}$-pregnatriene-17α,21-diol-3,20-dione 21-acetate
6α-methyl-$\Delta^{1,4,9(11)}$-pregnatriene-17α,21-diol-3,20-dione 21-acetate
6α-chloro-$\Delta^{1,4,9(11)}$-pregnatriene-17α,21-diol-3,20-dione 21-acetate
6α-fluoro-$\Delta^{1,4,9(11)}$-pregnatriene-17α,21-diol-3,20-dione 21-acetate
$\Delta^{1,4,9(11)}$-pregnatriene-14α,17α,21-triol-3,20-dione 21-acetate
$\Delta^{1,4,9(11)}$-pregnatriene-16α,17α,21-triol-3,20-dione 16,21-diacetate
16α-methyl-$\Delta^{1,4,9(11)}$-pregnatriene-17α,21-diol-3,20-dione 21-acetate
16β-methyl-$\Delta^{1,4,9(11)}$-pregnatriene-17α,21-diol-3,20-dione 21-acetate
$\Delta^{4,6,9(11)}$-pregnatriene-17α,21-diol-3,20-dione 21-acetate
2α-methyl-$\Delta^{4,6,9(11)}$-pregnatriene-17α,21-diol-3,20-dione 21-acetate
6-methyl-$\Delta^{4,6,9(11)}$-pregnatriene-17α,21-diol-3,20-dione 21-acetate
6-chloro-$\Delta^{4,6,9(11)}$-pregnatriene-17α,21-diol-3,20-dione 21-acetate
6-fluoro-$\Delta^{4,6,9(11)}$-pregnatriene-17α,21-diol-3,20-dione 21-acetate Δ$^{4,6,9(11)}$-pregnatriene-14α,17α,21-triol-3,20-dione 21-acetate
Δ$^{4,6,9(11)}$-pregnatriene-16α,17α,21-triol-3,20-dione 16,21-diacetate
16α-methyl-Δ$^{4,6,9(11)}$-pregnatriene-17α,21-diol-3,20-dione
16β-methyl-Δ$^{4,6,9(11)}$-pregnatriene-17α,21-diol-3,20-dione 21-acetate
Δ$^{1,4,6,9(11)}$-pregnatetraene-17α,21-diol-3,20-dione 21-acetate
2-methyl-Δ$^{1,4,6,9(11)}$-pregnatetraene-17α,21-diol-3,20-dione 21-acetate
6-methyl-Δ$^{1,4,6,9(11)}$-pregnatetraene-17α,21-diol-3,20-dione 21-acetate
6-chloro-Δ$^{1,4,6,9(11)}$-pregnatetraene-17α,21-diol-3,20-dione 21-acetate
6-fluoro-Δ$^{1,4,6,9(11)}$-pregnatetraene-17α,21-diol-3,20-dione 21-acetate
Δ$^{1,4,6,9(11)}$-pregnatetraene-14α,17α,21-triol-3,20-dione 21-acetate
Δ$^{1,4,6,9(11)}$-pregnatetraene-16α,17α,21-triol-3,20-dione 16,21-diacetate
16α-methyl-Δ$^{1,4,6,9(11)}$-pregnatetraene-17α,21-diol-3,20-dione 21-acetate
16β-methyl-Δ$^{1,4,6,9(11)}$-pregnatetraene-17α,21-diol-3,20-dione 21-acetate It will be noted that in the cases of compounds oxygenated at the 16-position, the substrate is converted to a 16,21-diacetate before dehydration at the 11-position. This is accomplished with acetic acid and pyridine in accordance with known procedures.

PREPARATION V

*9α-Chloro-11β-Fluoro-Δ$^4$-Pregnene-17α,21-Diol-3,20-Dione*

The 21-acetate of Δ$^{4,9(11)}$-pregnadiene-17α,21-diol-3,20-dione was hydrolyzed with dilute methanolic hydrochloric acid in accordance with standard procedures and 1 gram of the alcohol was taken up in 40 ml. of carbon tetrachloride containing 6 ml. of dry pyridine in a polyethylene bottle. To the mixture, there was added, 3 ml. of hydrogen fluoride in 1:1 chloroform-tetrahydrofuran and 0.5 grams of N-chlorosuccinimide was added. The mixture was allowed to stand at room temperature for 6 hours and an equal volume of 5% aqueous potassium carbonate was added. The organic layer was separated, washed with water, dilute hydrochloric acid and again with water. It was dried over anhydrous magnesium sulfate, filtered, treated with activated carbon and again filtered. The filtrate was concentrated to dryness and triturated with ether to give the desired product.

This procedure was repeated using the appropriate substrate obtained from the previous preparation to prepare the following compounds:

9α-chloro-11β-fluoro-2α-methyl-Δ$^4$-pregnene-17α,21-diol-3,20-dione
9α-chloro-11β-fluoro-6α-methyl-Δ$^4$-pregnene-17α,21-diol-3,20-dione
6α,9α-dichloro-11β-fluoro-Δ$^4$-pregnene-17α,21-diol-3,20-dione
6α,11β-difluoro-9α-chloro-Δ$^4$-pregnene-17α,21-diol-3,20-dione
9α-chloro-11β-fluoro-Δ$^4$-pregnene-14α,17α,21-triol-3,20-dione
9α-chloro-11β-fluoro-Δ$^4$-pregnene-16α,17α,21-triol-3,20-dione
9α-chloro-11β-fluoro-16α-methyl-Δ$^4$-pregnene-17α,21-diol-3,20-dione
9α-chloro-11β-fluoro-16β-methyl-Δ$^4$-pregnene-17α,21-diol-3,20-dione
9α-chloro-11β-fluoro-Δ$^{1,4}$-pregnadiene-17α,21-diol-3,20-dione
9α-chloro-11β-fluoro-2-methyl-Δ$^{1,4}$-pregnadiene-17α,21-diol-3,20-dione
9α-chloro-11β-fluoro-6α-methyl-Δ$^{1,4}$-pregnadiene-17α,21-diol-3,20-dione
6α,9α-dichloro-11β-fluoro-Δ$^{1,4}$-pregnadiene-17α,21-diol-3,20-dione
6α,11β-difluoro-9α-chloro-Δ$^{1,4}$-pregnadiene-17α,21-diol-3,20-dione
9α-chloro-11β-fluoro-Δ$^{1,4}$-pregnadiene-14α,17α,21-triol-3,20-dione
9α-chloro-11β-fluoro-Δ$^{1,4}$-pregnadiene-16α,17α,21-triol-3,20-dione
9α-chloro-11β-fluoro-16α-methyl-Δ$^{1,4}$-pregnadiene-17α,21-diol-3,20-dione
9α-chloro-11β-fluoro-16β-methyl-Δ$^{1,4}$-pregnadiene-17α,21-diol-3,20-dione
9α-chloro-11β-fluoro-Δ$^{4,6}$-pregnadiene-17α,21-diol-3,20-dione
9α-chloro-11β-fluoro-2α-methyl-Δ$^{4,6}$-pregnadiene-17α,21-diol-3,20-dione
9α-chloro-11β-fluoro-6-methyl-Δ$^{4,6}$-pregnadiene-17α,21-diol-3,20-dione
6,9α-dichloro-11β-fluoro-Δ$^{4,6}$-pregnadiene-17α,21-diol-3,20-dione
6,11β-difluoro-9α-chloro-Δ$^{4,6}$-pregnadiene-17α,21-diol-3,20-dione
9α-chloro-11β-fluoro-Δ$^{4,6}$-pregnadiene-14α,17α,21-triol-3,20-dione
9α-chloro-11β-fluoro-Δ$^{4,6}$-pregnadiene-16α,17α,21-triol-3,20-dione
9α-chloro-11β-fluoro-16α-methyl-Δ$^{4,6}$-pregnadiene-17α,21-diol-3,20-dione
9α-chloro-11β-fluoro-16β-methyl-Δ$^{4,6}$-pregnadiene-17α,21-diol-3,20-dione
9α-chloro-11-fluoro-Δ$^{1,4,6}$-pregnatriene-17α,21-diol-3,20-dione
9α-chloro-11β-fluoro-2-methyl-Δ$^{1,4,6}$-pregnatriene-17α,21-diol-3,20-dione
9α-chloro-11β-fluoro-6-methyl-Δ$^{1,4,6}$-pregnatriene-17α,21-diol-3,20-dione
6,9α-dichloro-11β-fluoro-Δ$^{1,4,6}$-pregnatriene-17α,21-diol-3,20-dione
6,11β-difluoro-9α-chloro-Δ$^{1,4,6}$-pregnatriene-17α,21-diol-3,20-dione
9α-chloro-11β-fluoro-Δ$^{1,4,6}$-pregnatriene-14α,17α,21-triol-3,20-dione
9α-chloro-11β-fluoro-Δ$^{1,4,6}$-pregnatriene-16α,17α,21-triol-3,20-dione
9α-chloro-11β-fluoro-16α-methyl-Δ$^{1,4,6}$-pregnatriene-17α,21-diol-3,20-dione
9α-chloro-11β-fluoro-16β-methyl-Δ$^{1,4,6}$-pregnatriene-17α,21-diol-3,20-dione

PREPARATION VI

*9α,11β-Dichloro-Δ$^4$-Pregnene-17α,21-Diol-3,20-Dione*

The 21-acetate of Δ$^{4,9(11)}$-pregnadiene-17α,21-diol-3,20-dione was hydrolyzed with dilute methanolic hydrochloric acid in accordance with standard procedures and 2 grams of the free alcohol was taken up in 60 ml. of carbon tetrachloride containing 2 ml. of dry pyridine. To this solution at −5° C., there was added a 25% molar excess of chlorine dissolved in 5 ml. of carbon tetrachloride. The mixture was stirred for 2 hours and allowed to come to room temperature. It was washed with 5% hydrochloric acid, 5% sodium carbonate solution and then with water. The organic layer was dried over anhydrous sodium sulfate, filtered, decolorized with charcoal, again filtered and the solvent removed in vacuo. The residue was triturated with ether to give the desired product.

This procedure was repeated using the appropriate substrate obtained from Preparation IV to prepare the following compounds:

9α,11β-dichloro-2α-methyl-Δ$^4$-pregnene-17α,21-diol-3,20-dione
9α,11β-dichloro-6α-methyl-Δ$^4$-pregnene-17α,21-diol-3,20-dione
6α,9α,11β-trichloro-Δ$^4$-pregnene-17α,21-diol-3,20-dione 9α,11β-dichloro-6α-fluoro-Δ⁴-pregnene-17α,21-diol-3,20-dione
9α,11β-dichloro-Δ⁴-pregnene-14α,17α,21-triol-3,20-dione
9α,11β-dichloro-Δ⁴-pregnene-16α,17α,21-triol-3,20-dione
9α,11β-dichloro-16α-methyl-Δ⁴-pregnene-17α,-diol-,3,20-dione
9α,11β-dichloro-16β-methyl-Δ⁴-pregnene-17α,21-diol-3,20-dione
9α,11β-dichloro-Δ¹,⁴-pregnadiene-17α,21-diol-3,20-dione
9α,11β-dichloro-2-methyl-Δ¹,⁴-pregnadiene-17α,21-diol-3,20-dione
9α,11β-dichloro-6α-methyl-Δ¹,⁴-pregnadiene-17α,21-diol-3,20-dione
6α,9α,11β-trichloro-Δ¹,⁴-pregnadiene-17α,21-diol-3,20-dione
9α,11β-dichloro-6α-fluoro-Δ¹,⁴-pregnadiene-17α,21-diol-3,20-dione
9α,11β-dichloro-Δ¹,⁴-pregnadiene-14α,17α,21-triol-3,20-dione
9α,11β-dichloro-Δ¹,⁴-pregnadiene-16α,17α,21-triol-3,20-dione
9α,11β-dichloro-16α-methyl-Δ¹,⁴-pregnadiene-17α,21-diol-3,20-dione
9α,11β-dichloro-16β-methyl-Δ¹,⁴-pregnadiene-17α,21-diol-3,20-dione
9α,11β-dichloro-Δ⁴,⁶-pregnadiene-17α,21-diol-3,20-dione
9α,11β-dichloro-2α-methyl-Δ⁴,⁶-pregnadiene-17α,21-diol-3,20-dione
9α,11β-dichloro-6-methyl-Δ⁴,⁶-pregnadiene-17α,21-diol-3,20-dione
6,9α,11β-trichloro-Δ⁴,⁶-pregnadiene-17α,21-diol-3,20-dione
9α,11β-dichloro-6-fluoro-Δ⁴,⁶-pregnadiene-17α,21-diol-3,20-dione
9α,11β-dichloro-Δ⁴,⁶-pregnadiene-14α,17α,21-triol-3,20-dione
9α,11β-dichloro-Δ⁴,⁶-pregnadiene-16α,17α,21-triol-3,20-dione
9α,11β-dichloro-16α-methyl-Δ⁴,⁶-pregnadiene-17α,21-diol-3,20-dione
9α,11β-dichloro-16β-methyl-Δ⁴,⁶-pregnadiene-17α,21-diol-3,20-dione
9α,11β-dichloro-Δ¹,⁴,⁶-pregnatriene-17α,21-diol-3,20-dione
9α,11β-dichloro-2-methyl-Δ¹,⁴,⁶-pregnatriene-17α,21-diol-3,20-dione
9α,11β-dichloro-6-methyl-Δ¹,⁴,⁶-pregnatriene-17α,21-diol-3,20-dione
6,9α,11β-trichloro-Δ¹,⁴,⁶-pregnatriene-17α,21-diol-3,20-dione
9α,11β-dichloro-6-fluoro-Δ¹,⁴,⁶-pregnatriene-17α,21-diol-3,20-dione
9α,11β-dichloro-Δ¹,⁴,⁶-pregnatriene-14α,17α,21-triol-3,20-dione
9α,11β-dichloro-Δ¹,⁴,⁶-pregnatriene-16α,17α,21-triol-3,20-dione
9α,11β-dichloro-16α-methyl-Δ¹,⁴,⁶-pregnatriene-17α,21-diol-3,20-dione
9α,11β-dichloro-16β-methyl-Δ¹,⁴,⁶-pregnatriene-17α,21-diol-3,20-dione

PREPARATION VII

*9α,11β-Dibromo-Δ⁴-Pregnene-17α,21-Diol-3,20-Dione*

The 21-acetate of Δ⁴,⁹⁽¹¹⁾-pregnadiene-17α,21-diol-3,20-dione was hydrolyzed with dilute methanolic hydrochloric acid in accordance with standard procedures and 2 grams of the free alcohol was taken up in 60 ml. of carbon tetrachloride containing 2 ml. of dry pyridine. To this solution at −5° C., there was added a 25% molar excess of bromine dissolved in 5 ml. of carbon tetrachloride. The mixture was stirred for 2 hours and allowed to come to room temperature. It was washed with 5% hydrochloric acid, 5% sodium carbonate solution and then with water. The organic layer was dried over anhydrous sodium sulfate, filtered, decolorized with charcoal, again filtered and the solvent removed in vacuo. The residue was triturated with ether to give the desired product.

This procedure was repeated using the appropriate substrate obtained from Preparation IV to prepare the following compounds:

9α,11β-dibromo-2α-methyl-Δ⁴-pregnene-17α,21-diol-3,20-dione
9α,11β-dibromo-6α-methyl-Δ⁴-pregnene-17α,21-diol-3,20-dione
9α,11β-dibromo-6α-chloro-Δ⁴-pregnene-17α,21-diol-3,20-dione
9α,11β-dibromo-6α-fluoro-Δ⁴-pregnene-17α,21-diol-3,20-dione
9α,11β-dibromo-Δ⁴-pregnene-14α,17α,21-triol-3,20-dione
9α,11β-dibromo-Δ⁴-pregnene-16α,17α,21-triol-3,20-dione
9α,11β-dibromo-16α-methyl-Δ⁴-pregnene-17α,21-diol-3,20-dione
9α,11β-dibromo-16β-methyl-Δ⁴-pregnene-17α,21-diol-3,20-dione
9α,11β-dibromo-Δ¹,⁴-pregnadiene-17α,21-diol-3,20-dione
9α,11β-dibromo-2-methyl-Δ¹,⁴-pregnadiene-17α,21-diol-3,20-dione
9α,11β-dibromo-6α-methyl-Δ¹,⁴-pregnadiene-17α,21-diol-3,20-dione
9α,11β-dibromo-6α-chloro-Δ¹,⁴-pregnadiene-17α,21-diol-3,20-dione
9α,11β-dibromo-6α-fluoro-Δ¹,⁴-pregnadiene-17α,21-diol-3,20-dione
9α,11β-dibromo-Δ¹,⁴-pregnadiene-14α,17α,21-triol-3,20-dione
9α,11β-dibromo-Δ¹,⁴-pregnadiene-16α,17α,21-triol-3,20-dione
9α,11β-dibromo-16α-methyl-Δ¹,⁴-pregnadiene-17α,21-diol-3,20-dione
9α,11β-dibromo-16β-methyl-Δ¹,⁴-pregnadiene-17α,21-diol-3,20-dione
9α,11β-dibromo-Δ⁴,⁶-pregnadiene-17α,21-diol-3,20-dione
9β,11β-dibromo-2α-methyl-Δ⁴,⁶-pregnadiene-17α,21-diol-3,20-dione
9α,11β-dibromo-6-methyl-Δ⁴,⁶-pregnadiene-17α,21-diol-3,20-dione
9α,11β-dibromo-6-chloro-Δ⁴,⁶-pregnadiene-17α,21-diol-3,20-dione
9α,11β-dibromo-6-fluoro-Δ⁴,⁶-pregnadiene-17α,21-diol-3,20-dione
9α,11β-dibromo-Δ⁴,⁶-pregnadiene-14α,17α,21-triol-3,20-dione
9α,11β-dibromo-Δ⁴,⁶-pregnadiene-16α,17α,21-triol-3,20-dione
9α,11β-dibromo-16α-methyl-Δ⁴,⁶-pregnadiene-17α,21-diol-3,20-dione
9α,11β-dibromo-16β-methyl-Δ⁴,⁶-pregnadiene-17α,21-diol-3,20-dione
9α,11β-dibromo-Δ¹,⁴,⁶-pregnatriene-17α,21-diol-3,20-dione
9α,11β-dibromo-2-methyl-Δ¹,⁴,⁶-pregnatriene-17α,21-diol-3,20-dione
9α,11β-dibromo-6-methyl-Δ¹,⁴,⁶-pregnatriene-17α,21-diol-3,20-dione
9α,11β-dibromo-6-chloro-Δ¹,⁴,⁶-pregnatriene-17α,21-diol-3,20-dione
9α,11β-dibromo-6-fluoro-Δ¹,⁴,⁶-pregnatriene-17α,21-diol-3,20-dione
9α,11β-dibromo-Δ¹,⁴,⁶-pregnatriene-14α,17α,21-triol-3,20-dione
9α,11β-dibromo-Δ¹,⁴,⁶-pregnatriene-16α,17α,21-triol-3,20-dione
9α,11β-dibromo-16α-methyl-Δ¹,⁴,⁶-pregnatriene-17α,21-diol-3,20-dione
9α,11β-dibromo-16β-methyl-Δ¹,⁴,⁶-pregnatriene-17α,21-diol-3,20-dione

PREPARATION VIII

*9α-Bromo-11β-Chloro-Δ⁴-Pregnene-17α,21-Diol-3,20-Dione*

The 21-acetate of Δ⁴,⁹⁽¹¹⁾-pregnadiene-17α,21-diol-3,20-dione was hydrolyzed with dilute methanolic hydrochloric acid in accordance with standard procedures and 1 gram of the alcohol was taken up in 60 ml. of carbon tetrachloride containing 8 ml. of dry pyridine. A 10% molar excess of N-bromoacetamide was added and a 10% molar excess of anhydrous hydrogen chloride was passed through the mixture in a slow strain over a period of 2 minutes. The mixture was allowed to stand for 2 hours and washed with 5% aqueous potassium carbonate. The organic layer was separated, washed with water, dilute hydrochloric acid and again with water. It was dried over anhydrous magnesium sulfate, filtered, treated with activated carbon and again filtered. The filtrate was concentrated to dryness and triturated with ether to give the desired product.

This procedure was repeated using the appropriate substrate obtained from Preparation IV to prepare the following compounds:

9α-bromo-11β-chloro-2α-methyl-Δ⁴-pregnene-17α,21-diol-3,20-dione
9α-bromo-11β-chloro-6α-methyl-Δ⁴-pregnene-17α,21-diol-3,20-dione
6α,11β-dichloro-9α-bromo-Δ⁴-pregnene-17α,21-diol-3,20-dione
9α-bromo-11β-chloro-6α-fluoro-Δ⁴-pregnene-17α,21-diol-3,20-dione
9α-bromo-11β-chloro-Δ⁴-pregnene-14α,17α,21-triol-3,20-dione
9α,bromo-11β-chloro-Δ⁴-pregnene-16α,17α,21-triol-3,20-dione
9α-bromo-11β-chloro-16α-methyl-Δ⁴-pregnene-17α,21-diol-3,20-dione
9α-bromo-11β-chloro-16β-methyl-Δ⁴-pregnene-17α,21-diol-3,20-dione
9α-bromo-11β-chloro-Δ¹,⁴-pregnadiene-17α,21-diol-3,20-dione
9α-bromo-11β-chloro-2-methyl-Δ¹,⁴-pregnadiene-17α,21-diol-3,20-dione
9α-bromo-11β-chloro-6α-methyl-Δ¹,⁴-pregnadiene-17α,21-diol-3,20-dione
6α,11β-dichloro-9α-bromo-Δ¹,⁴-pregnadiene-17α,21-diol-3,20-dione
9α-bromo-11β-chloro-6α-fluoro-Δ¹,⁴-pregnadiene-17α,21-diol-3,20-dione
9α-bromo-11β-chloro-Δ¹,⁴-pregnadiene-14α,17α,21-triol-3,20-dione
9α-bromo-11β-chloro-Δ¹,⁴-pregnadiene-16α,17α,21-triol-3,20-dione
9α-bromo-11β-chloro-16α-methyl-Δ¹,⁴-pregnadiene-17α,21-diol-3,20-dione
9α-bromo-11β-chloro-16β-methyl-Δ¹,⁴-pregnadiene-17α,21-diol-3,20-dione
9α-bromo-11β-chloro-Δ⁴,⁶-pregnadiene-17α,21-diol-3,20-dione
9α-bromo-11β-chloro-2α-methyl-Δ⁴,⁶-pregnadiene-17α,21-diol-3,20-dione
9α-bromo-11β-chloro-6-methyl-Δ⁴,⁶-pregnadiene-17α,21-diol-3,20-dione
6,11β-dichloro-9α-bromo-Δ⁴,⁶-pregnadiene-17α,21-diol-3,20-dione
9α-bromo-11β-chloro-6-fluoro-Δ⁴,⁶-pregnadiene-17α,21-diol-3,20-dione
9α-bromo-11β-chloro-Δ⁴,⁶-pregnadiene-14α,17α,21-triol-3,20-dione
9α-bromo-11β-chloro-Δ⁴,⁶-pregnadiene-16α,17α,21-triol-3,20-dione
9α-bromo-11β-chloro-16α-methyl-Δ⁴,⁶-pregnadiene-17α,21-diol-3,20-dione
9α-bromo-11β-chloro-16β-methyl-Δ⁴,⁶-pregnadiene-17α,21-diol-3,20-dione
9α-bromo-11β-chloroΔ¹,⁴,⁶-pregnatriene-17α,21-diol-3,20-dione
9α-bromo-11β-chloro-2-methyl-Δ¹,⁴,⁶-pregnatriene-17α,21-diol-3,20-dione
9α-bromo-11β-chloro-6-methyl-Δ¹,⁴,⁶-pregnatriene-17α,21-diol-3,20-dione
6,11β-dichloro-9α-bromo-Δ¹,⁴,⁶-pregnatriene-17α,21-diol-3,20-dione
9α-bromo-11β-chloro-6-fluoro-Δ¹,⁴,⁶-pregnatriene-17α,21-diol-3,20-dione
9α-bromo-11β-chloro-Δ¹,⁴,⁶-pregnatriene-14α,17α,21-triol-3,20-dione
9α-bromo-11β-chloro-Δ¹,⁴,⁶-pregnatriene-16α,17α,21-triol-3,20-dione
9α-bromo-11β-chloro-16α-methyl-Δ¹,⁴,⁶-pregnatriene-17α,21-diol-3,20-dione
9α-bromo-11β-chloro-16β-methyl-Δ¹,⁴,⁶-pregnatriene-17α,21-diol-3,20-dione

PREPARATION IX

*9α-Bromo-11β-Fluoro-Δ⁴-Pregnene-17α,21-Diol-3,20-Dione*

The 21-acetate of Δ⁴-pregnene-17α,21-diol-3,20-dione was hydrolyzed with dilute methanolic hydrochloric acid in accordance with standard procedures and 2 grams of the alcohol was taken up in 50 ml. of carbon tetrachloride containing 6 ml. of dry pyridine in a polyethylene bottle. To the mixture, there was added 5 ml. of hydrogen fluoride in 1:1 chloroform-tetrahydrofuran, followed by 0.9 grams of N-bromoacetamide. The mixture was allowed to stand at room temperature for 6 hours and an equal volume of 5% aqueous potassium carbonate was added. The organic layer was separated, washed with water, dilute hydrochloric acid and again with water. It was dried over anhydrous magnesium sulfate, filtered, treated with activated carbon and again filtered. The filtrate was concentrated to dryness and triturated with ether to give the desired product.

This procedure was repeated using the appropriate substrate obtained from Preparation IV to prepare the following compounds:

9α-bromo-11β-fluoro-2α-methyl-Δ⁴-pregnene-17α,21-diol-3,20-dione
9α-bromo-11β-fluoro-6α-methyl-Δ⁴-pregnene-17α,21-diol-3,20-dione
9α-bromo-11β-fluoro-6α-chloro-Δ⁴-pregnene-17α,21-diol-3,20-dione
6α,11β-difluoro-9α-bromo-Δ⁴-pregnene-17α,21-diol-3,20-dione
9α-bromo-11β-fluoro-Δ⁴-pregnene-14α,17α,21-triol-3,20-dione
9α-bromo-11β-fluoro-Δ⁴-pregnene-16α,17α,21-triol-3,20-dione
9α-bromo-11β-fluoro-16α-methyl-Δ⁴-pregnene-17α,21-diol-3,20-dione
9α-bromo-11β-fluoro-16β-methyl-Δ⁴-pregnene-17α,21-diol-3,20-dione
9α-bromo-11β-fluoro-Δ¹,⁴-pregnadiene-17α,21-diol-3,20-dione
9α-bromo-11β-fluoro-2-methyl-Δ¹,⁴-pregnadiene-17α,21-diol-3,20-dione
9α-bromo-11β-fluoro-6α-methyl-Δ¹,⁴-pregnadiene-17α,21-diol-3,20-dione
9α-bromo-11β-fluoro-6α-chloro-Δ¹,⁴-pregnadiene-17α,21-diol-3,20-dione
6α,11β-difluoro-9α-bromo-Δ¹,⁴-pregnadiene-17α,21-diol-3,20-dione
9α-bromo-11β-fluoro-Δ¹,⁴-pregnadiene-14α,17α,21-triol-3,20-dione
9α-bromo-11β-fluoro-Δ¹,⁴-pregnadiene-16α,17α,21-triol-3,20-dione
9α-bromo-11β-fluoro-16α-methyl-Δ¹,⁴-pregnadiene-17α,21-diol-3,20-dione
9α-bromo-11β-fluoro-16β-methyl-Δ¹,⁴-pregnadiene-17α,21-diol-3,20-dione 9α-bromo-11β-fluoro-Δ$^{4,6}$-pregnadiene-17α,21-diol-3,20-dione
9α-bromo-11β-fluoro-2α-methyl-Δ$^{4,6}$-pregnadiene-17α,21-diol-3,20-dione
9α-bromo-11β-fluoro-6-methyl-Δ$^{4,6}$-pregnadiene-17α,21-diol-3,20-dione
9α-bromo-11β-fluoro-6-chloro-Δ$^{4,6}$-pregnadiene-17α,21-diol-3,20-dione
6,11β-difluoro-9α-bromo-Δ$^{4,6}$-pregnadiene-17α,21-diol-3,20-dione
9α-bromo-11β-fluoro-Δ$^{4,6}$-pregnadiene-14α,17α,21-triol-3,20-dione
9α-bromo-11β-fluoro-Δ$^{4,6}$-pregnadiene-16α,17α,21-triol-3,20-dione
9α-bromo-11β-fluoro-16α-methyl-Δ$^{4,6}$-pregnadiene-17α,21-diol-3,20-dione
9α-bromo-11β-fluoro-16β-methyl-Δ$^{4,6}$-pregnadiene-17α,21-diol-3,20-dione
9α-bromo-11β-fluoro-Δ$^{1,4,6}$-pregnatriene-17α,21-diol-3,20-dione
9α-bromo-11β-fluoro-2-methyl-Δ$^{1,4,6}$-pregnatriene-17α,21-diol-3,20-dione
9α-bromo-11β-fluoro-6-methyl-Δ$^{1,4,6}$-pregnatriene-17α,21-diol-3,20-dione
9α-bromo-11β-fluoro-6-chloro-Δ$^{1,4,6}$-pregnatriene-17α,21-diol-3,20-dione
6,11β-difluoro-9α-bromo-Δ$^{1,4,6}$-pregnatriene-17α,21-diol-3,20-dione
9α-bromo-11β-fluoro-Δ$^{1,4,6}$-pregnatriene-14α,17α,21-triol-3,20-dione
9α-bromo-11β-fluoro-Δ$^{1,4,6}$-pregnatriene-16α,17α,21-triol-3,20-dione
9α-bromo-11β-fluoro-16α-methyl-Δ$^{1,4,6}$-pregnatriene-17α,21-diol-3,20-dione
9α-bromo-11β-fluoro-16β-methyl-Δ$^{1,4,6}$-pregnatriene-17α,21-diol-3,20-dione

PREPARATION X

Preparation of 21-Desoxy Compounds

The following procedure is illustrative of the method by which each of the compounds of Preparations V through IX are converted to 21-desoxy compounds. It should be noted that for the application of this process to 16-hydroxy compounds, the substrate is first converted to a 16α,17α-acetonide by reaction with acetone in accordance with standard procedures. The acetonide moiety is removed under the usual conditions after the reaction with hydrogen iodide.

A total of 30 grams of the selected substrate was taken up in 175 ml. of pyridine in a 500 ml. three-necked flask. The reaction mixture was maintained at approximately −25° C. and 19.1 grams of anhydrous p-toluenesulfonyl chloride in 200 ml. of methylene chloride was added dropwise with stirring. The stirring was continued for 16 hours and the reaction mixture was poured into a separator funnel. The mixture was washed with 600 ml. of ice cold chloroform containing 100 ml. of water. The aqueous extract was removed and the chloroform layer washed four times with 250 ml. portions of 2 N hydrochloric acid. The organic solution was washed with 5% aqueous sodium bicarbonate and then with water. It was dried over anhydrous sodium sulfate, filtered and the solvent removed in vacuo to leave the 21-tosylate ester of the substrate as a residue.

The residue was taken up in 350 ml. of glacial acetic acid containing 26.9 grams of sodium iodide and refluxed with stirring for ½ hour in a nitrogen atmosphere. The solution was cooled and 200 ml. of 0.5 N sodium thiosulfate containing 2 grams of sodium bisulfite was added. The solvent was removed in vacuo using a rotating evaporator which was heated on a steam bath. A Dry Ice-acetone trap was included in the train. The residue was diluted with 150 ml. of water. The precipitate was isolated by filtration and washed with water followed by methanol.

The following examples illustrate the process and the compounds of this invention.

EXAMPLE I

*9α-11β-Dichloro-21-Dimethylaminomethyl-Δ$^{1,4}$-Pregnadiene-17α-Ol-3,20-Dione*

A total of 20 grams of 9α,11β-dichloro-Δ$^{1,4}$-pregnadiene-17α-ol-3,20-dione was taken up in 350 ml. of methanol containing 12 grams of paraformaldehyde and 40 grams of dimethylamine hydrochloride. The mixture was maintained at 90° C. under pressure for 12 hours. The hot mixture was filtered and the solution evaporated in vacuo. The residue was digested with hot 0.25 N hydrochloric acid, filtered and the filtrate made basic with 10% sodium carbonate. The solution was extracted with chloroform, the organic layer dried over anhydrous sodium sulfate, filtered and the solvent removed in vacuo to leave the desired product as a residue.

EXAMPLE II

*9α,11β-Dichloro-21-Dimethylaminomethyl-Δ$^{1,4}$-Pregnadiene-17α-Ol-3,20-Dione*

A total of 35 grams of 9α,11β-dichloro-6α-methyl-Δ$^{1,4}$-pregnadiene-17α-ol-3,20-dione was taken up in 500 ml. of n-amyl alcohol containing 20 grams of paraformaldehyde, 60 grams of dimethylamine sulfate and 2 ml. of dilute sulfuric acid. The mixture was refluxed for 2 hours in a nitrogen atmosphere, filtered and the solvent removed in vacuo. The residue was digested with 150 ml. of hot 0.25 N sulfuric acid and filtered. The filtrate was adjusted to an approximate pH of 11 with 10% sodium carbonate and extracted with chloroform. The chloroform solution was dried over anhydrous magnesium sulfate, filtered and the desired product obtained by evaporating the solvent in vacuo.

EXAMPLE III

*9α,11β-Dichloro-6α-Fluoro-21-Dimethylaminomethyl-Δ$^{1,4}$-Pregnadiene-17α-Ol-3,20-Dione*

A total of 10 grams of 9α,11β-dichloro-6α-fluoro-Δ$^{1,4}$-pregnadiene-17α-ol-3,20-dione was taken up in 500 ml. of n-butanol containing 4.8 grams of paraformaldehyde, 16 grams of dimethylamine hydrochloride and 15 drops of 3 N hydrochloric acid. The solution was refluxed under nitrogen for 4 hours during which time an additional 1 ml. of 3 N hydrochloric acid was added to maintain the acidity at a pH of approximately 2.5. The solvent was removed in vacuo and the residue digested with two 200 ml. portions of hot 0.25 N hydrochloric acid. The residue was washed with water, filtered and the filtrate adjusted to a pH of approximately 10 with 10% aqueous sodium carbonate and extracted with benzene. The benzene solution was dried over anhydrous sodium sulfate, filtered and the solvent removed in vacuo to leave the desired product as a residue.

EXAMPLE IV

*9α,11β-Dichloro-21-Dimethyl-Ethylaminomethyl-Δ$^{1,4,6}$-Pregnatriene-17α-Ol-3,20-Dione*

A total of 25 grams of 9α,11β-dichloro-Δ$^{1,4,6}$-pregnatriene-17α-ol-3,20-dione was taken up in 350 ml. of methanol containing 12 grams of paraformaldehyde, 40 grams of methylethylamine phosphate and 10 ml. of 2.5 N phosphoric acid. The mixture was maintained at 100° C. under pressure for 20 hours, during which time an additional small portion of 2 N phosphoric acid was added to maintain the acidity at a pH of 5.0. The hot mixture was filtered and the solution evaporated in vacuo. The residue was digested with hot 0.2 N phosphoric acid, filtered and the filtrate made basic with 10% sodium carbonate. The solution was extracted with ethylene dichloride. The organic layer was dried over anhydrous sodium sulfate, filtered and the solvent removed in vacuo to leave the desired product as a residue.

Example V

*6,9α,11β-Trichloro-21-Dibutylaminomethyl-Δ$^{1,4,6}$-Pregnatriene-17α-Ol-3,20-Dione*

A total of 20 grams of 6,9α,11β-trichloro-Δ$^{1,4,6}$-pregnatriene-17α-ol-3,20-dione was taken up in 750 ml. of n-butanol containing 15 grams of parafomaldehyde, 20 grams of dibutylamine hydrochloride and 15 drops of 3 N hydrochloric acid. The solution was refluxed under nitrogen for 6 hours during which time, an additional 1 ml. of 3 N hydrochloric acid was added to maintain the acidity at a pH of approximately 3. The solvent was removed in vacuo and the residue digested with two 300 ml. portions of hot 0.25 N hydrochloric acid. The residue was washed with water, filtered and the filtrate adjusted to a pH of approximately 10 with 10% aqueous sodium carbonate. It was then extracted with chloroform. The chloroform solution was dried over anhydrous sodium sulfate, filtered and the solvent removed in vacuo to leave the desired product as a residue.

Example VI

*9α,11β-Dichloro-16α-Methyl-21-Diethylaminomethyl-Δ$^{1,4,6}$-Pregnadiene-17α-Ol-3,20-Dione*

A total of 35 grams of 9α,11β-dichloro-16α-methyl-Δ$^{1,4,6}$-pregnatriene- 17α-ol-3,20-dione was taken up in 500 ml. of n-butanol containing 20 grams of paraformaldehyde, 60 grams of diethylamine hydrobromide and 3 ml. of 40% aqueous hydrobromic acid. The mixture was refluxed for 2 hours and filtered. The filtrate was evaporated in vacuo and the residue digested with 150 ml. of hot 0.25 N hydrochloric acid and filtered. The filtrate was adjusted to an approximate pH of 10 with 10% sodium carbonate. The aqueous solution was extracted with carbon tetrachloride, the organic layer dried over anhydrous magnesium sulfate, filtered and the desired product obtained by removing the solvent in vacuo.

The following compounds are prepared using the procedures of Examples I through VI. Although only 9,11-dichloro compounds are listed, it should be understood that 9-bromo-11-chloro; 9,11-dibromo; 9-bromo-11-fluoro; and 9-chloro-11-fluoro compounds are similarly prepared. Further, although only dimethylaminomethyl compounds are listed, it should be understood that other dialkylamino compounds including those in which the alkyl substituents contain up to four carbon atoms are similarly prepared. The list is given to avoid unnecessary repetition of experimental details.

9α,11β-dichlor-2-methyl-21-dimethylaminomethyl-Δ$^{1,4}$-pregnadiene-17α-ol-3,20-dione
9α,11β-dichloro-6α-methyl-21-dimethylaminomethyl-Δ$^{1,4}$-pregnadiene-17α-ol-3,20-dione
6α,9α,11β-trichloro-21-dimethylaminomethyl-Δ$^{1,4}$-pregnadiene-17α-ol-3,20-dione
9α,11β-dichloro-21-dimethylaminomethyl-Δ$^{1,4}$-pregnadiene-14α,17α-diol-3,20-dione
9α,11β-dichloro-21-dimethylaminomethyl-Δ$^{1,4}$-pregnadiene-16α,17α-diol-3,20-dione
9α,11β-dichloro-16α-methyl-21-dimethylaminomethyl-Δ$^{1,4}$-pregnadiene-17α-ol-3,20-dione
9α,11β-dichloro-16β-methyl-21-dimethylaminomethyl-Δ$^{1,4}$-pregnadiene-17α-ol-3,20-dione
9α,11β-dichloro-21-dimethylaminomethyl-Δ$^{1,4}$-pregnadiene-17α-ol-3,20-dione
9α,11β-dichloro-2α-methyl-21-dimethylaminomethyl-Δ$^{1,4}$-pregnadiene-17α-ol-3,20-dione
9α,11β-dichloro-2-methyl-21-dimethylaminomethyl-Δ$^{1,4,6}$-pregnatriene-17α-ol-3,20-dione
9α,11β-dichloro-6-methyl-21-dimethylaminomethyl-Δ$^{1,4,6}$-pregnatriene-17α-ol-3,20-dione
9α,11β-dichloro-6-fluoro-21-dimethylaminomethyl-Δ$^{1,4,6}$-pregnatriene-17α-ol-3,20-dione
9α,11β-dichloro-21-dimethylaminomethyl-Δ$^{1,4,6}$-pregnatriene-14α,17α-diol-3,20-dione
9α,11β-dichloro-21-dimethylaminomethyl-Δ$^{1,4,6}$-pregnatriene-16α,17α-diol-3,20-dione
9α,11β-dichloro-16β-methyl-21-dimethylaminomethyl-Δ$^{1,4,6}$-pregnatriene-17α-ol-3,20-dione

Example VII

*Preparation of Quaternary Ammonium Compounds*

The following procedures are illustrative of the methods used to prepare the quaternary ammonium halides of this invention.

A solution of 7.5 grams of the product prepared in Example I in 180 ml. of methanol containing 80 ml. of methyl bromide was allowed to stand overnight and the mixture was then evaporated to dryness in vacuo. The residue was triturated with acetone and the desired product recovered by filtration. An additional crop of the quaternary compound may be obtained by evaporation of the acetone filtrate and this is purified by trituration with methanol and recovered by filtration. The product obtained was 9α,11β-dichloro-21-dimethylaminomethyl-Δ$^{1,4}$-pregnadiene-17α-ol-3,20-dione methobromide.

A solution of 7.5 grams of the product obtained in Example II in 150 ml. of ethanol containing a 50% molar excess of butyl chloride was allowed to stand at 25° C. for 16 hours and the mixture was then evaporated to dryness in vacuo. The residue was triturated with acetone and the desired product recovered by filtration. The product obtained was 9α,11β-dichloro-6α-methyl-21-dimethylaminomethyl-Δ$^{1,4}$-pregnadiene - 17α - ol-3,20-dione butyl chloride.

A solution of 8 grams of the product obtained in Example IV in 200 ml. of methanol containing a 20% molar excess of ethyl iodide was allowed to stand for 20 hours at approximately 28° C. and the mixture was then evaporated to dryness in vacuo. The residue was triturated with ether and the desired product recovered by filtration. The product obtained was 9α,11β-dichloro-21-dimethylaminomethyl-Δ$^{1,4,6}$-pregnatriene-17α-ol-3,20-dione ethyl iodide.

Other quaternary alkyl ammonium halide salts of the 21-dialkylaminomethyl compounds prepared as described above, in which the quaternizing agent contains up to four carbon atoms, are prepared in accordance with the procedure of this example.

Example VIII

*9α-Bromo-11β-Chloro-6α-Methyl-21-Methylene-Δ$^{1,4}$-Pregnadiene-17α-Ol-3,20-Dione*

A solution of 200 mg. of 9α-bromo-11β-chloro-6α-methyl - 21 - dimethylaminomethyl - Δ$^{1,4}$ - pregnadiene-17α-ol-3,20-dione methobromide in 10 ml. of water was prepared and clarified by filtration. To the solution, there was added 68 mg. of sodium bicarbonate in 2 ml. of water at 25° C. A precipitate separated and the suspension was stirred for 1 hour, filtered, washed with water and dried in vacuo to yield the desired product.

Example IX

*6α,9α,11β-Trichloro-21-Methylene-Δ$^{1,4}$-Pregnadiene-17α-Ol-3,20-Dione*

A solution containing 200 mg. of 6α,9α,11β-trichloro-21 - dimethylaminomethyl - Δ$^{1,4}$ - pregnadiene - 17α - ol-3,20-dione butyl chloride was dissolved in 10 ml. of water and stirred at 20° C. for 6 hours. The desired product precipitated and was recovered by filtration.

Example X

*9α,11β-Dibromo-6α-Fluoro-21-Methylene-Δ$^{1,4,6}$-Pregnatriene-17α-Ol-3,20-Dione*

A solution containing 200 mg. of 9α,11β-dibromo-6α-fluoro - 21 - dimethylaminomethyl - Δ$^{1,4,6}$ - pregnatriene-17α-ol-3,20-dione methobromide was dissolved in 15 ml.

of water and clarified by filtration. The solution was adjusted to pH 12 by the cautious addition of 2% sodium hydroxide at 30° C. A precipitate separated and the suspension was stirred for 4 hours before recovering the desired product by filtration.

EXAMPLE XI

*9α-Bromo-11β-Fluoro-16α-Methyl-21-Methylene-Δ$^{1,4,6}$-Pregnatriene-17α-Ol-3,20-Dione*

A solution containing 400 mg. of 9α-bromo-11β-fluoro-16α - methyl - 21 - dimethylaminomethyl - Δ$^{1,4,6}$ - pregnatriene-17α-ol-3,20-dione ethyl chloride was dissolved in 15 ml. of water and the solution clarified by filtration. A 2% aqueous solution of sodium citrate in 2 ml. of water was added. The resulting mixture was stirred for 4 hours during which time the desired product separated and was recovered by filtration.

EXAMPLE XII

*9α-Chloro-11β-Fluoro-21-Methylene-Δ$^{1,4}$-Pregnadiene-17α-Ol-3,20-Dione*

A solution containing 200 mg. of 9α-chloro-11β-fluoro-21 - di - n - butylaminomethyl - Δ$^{1,4}$ - pregnadiene - 17α-ol-3,20-dione methobromide was dissolved in 15 ml. of water and stirred at 25° C. for 4 hours. The desired product separated and was recovered by filtration.

EXAMPLE XIII

*9α,11β-Dichloro-6α-Fluoro-21-Methylene-Δ$^{1,4}$-Pregnadiene-17α-Ol-3,20-Dione*

A solution containing 300 mg. of 9α,11β-dichloro-6α-fluoro - 21 - diethylaminomethyl - Δ$^{1,4}$ - pregnadiene -17α-ol-3,20-dione n-butyl chloride was dissolved in 20 ml. of water and adjusted to pH 9.5 with aqueous sodium carbonate. The mixture was stirred at 30° C. for 6 hours. The desired product separated and was recovered by filtration.

EXAMPLE XIV

*9α,11β-Dichloro-21-Methylene-Δ$^{1,4,6}$-Pregnatriene-17α-Ol-3,20-Dione*

A solution containing 150 mg. of 9α,11β-dichloro-21-di - n - propylaminomethyl - Δ$^{1,4,6}$ - pregnatriene - 17α-ol-3,20-dione methyl iodide was dissolved in 15 ml. of water and stirred at 25° C. for 4 hours. The resulting mixture was extracted with chloroform, filtered and the desired product recovered by evaporation of the filtrate.

The following compounds are prepared using the procedures of Examples VIII through XIV. Although only 9,11-dichloro compounds are listed, it should be understood that 9-bromo-11-chloro; 9,11-dibromo; 9-bromo-11-chloro; and 9-chloro-11-fluoro compounds are similarly prepared.

9α,11β-dichloro-2-methyl-21-methylene-Δ$^{1,4}$-pregnadiene-17α-ol-3,20-dione
9α,11β-dichloro-21-methylene-Δ$^{1,4}$-pregnadiene-14α,17α-diol-3,20-dione
9α,11β-dichloro-21-methylene-Δ$^{1,4}$-pregnadiene-16α,17α-diol-3,20-dione
9α,11β-dichloro-16β-methyl-21-methylene-Δ$^{1,4}$-pregnadiene-17α-ol-3,20-dione
9α,11β-dichloro-16α-methyl-21-methylene-Δ$^{1,4}$-pregnadiene-17α-ol-3,20-dione
9α,11β-dichloro-2-methyl-21-methylene-Δ$^{1,4,6}$-pregnatriene-17α-ol-3,20-dione
9α,11β-dichloro-6-methyl-21-methylene-Δ$^{1,4,6}$-pregnatriene-17α-ol-3,20-dione
6,9α,11β-trichloro-21-methylene-Δ$^{1,4,6}$-pregnatriene-17α-ol-3,20-dione
9α,11β-dichloro-21-methylene-Δ$^{1,4,6}$-pregnatriene-14α,17α-diol-3,20-dione
9α,11β-dichloro-21-methylene-Δ$^{1,4,6}$-pregnatriene-16α,17α-diol-3,20-dione
9α,11β-dichloro-16β-methyl-21-methylene-Δ$^{1,4,6}$-pregnatriene-17α-ol-3,20-dione

EXAMPLE XV

*9α,11β-Dichloro-21-Methylene-Δ$^{1,4}$-Pregnadiene-17α-Ol-3,20-Dione*

A total of 5 grams of 9α,11β-dichloro-21-diethylaminomethyl-Δ$^{1,4}$-pregnadiene-17α-ol-3,20-dione hydrochloride prepared by bubbling anhydrous hydrogen chloride through the free base in ether was taken up in 100 ml. of ethanol and a 50% molar excess of ethyl bromide together with 0.6 gram of potassium acetate was added. The mixture was refluxed for 5 hours and evaporated to 1/5 volume. The desired product was precipitated by the addition of 4 volumes of water and collected by filtration.

EXAMPLE XVI

*9α,11β-Dichloro-21-Methyl-Δ$^{1,4}$-Pregnadiene-17α-Ol-3,20-Dione*

A total of 1 gram of 9α,11β-dichloro-21-methylene-Δ$^{1,4}$-pregnadiene-17α-ol-3,20-dione was taken up in 300 ml. of 95% ethanol containing 250 mg. of palladium on carbon at 25 to 30° C. and hydrogen was bubbled in at atmospheric pressure. Reaction was stopped after 15 minutes and the catalyst removed by filtration. The catalyst was washed with an additional 50 ml. of 95% ethanol and the filtrates combined. The solvent was removed in vacuo leaving the desired product as a residue.

EXAMPLE XVII

*9α-Bromo-11β-Chloro-16α,21-Dimethyl-Δ$^{1,4}$-Pregnadiene-17α-Ol-3,20-Dione*

A total of 1 gram of 9α-bromo-11β-chloro-16α-methyl-21 - methylene - Δ$^{1,4}$ - pregnadiene - 17α - ol - 3,20 - dione was taken up in 300 ml. of methanol containing 1 gram of 5% palladium on calcium carbonate at 15° C. and agitated under hydrogen at 10 atmospheres pressures. The reaction was stopped after 1 molar equivalent of hydrogen had been adsorbed and the catalyst was removed by filtration. The catalyst was washed with an additional 50 ml. of methanol and the filtrates combined. The solvent was removed in vacuo leaving the desired product as a residue.

EXAMPLE XVIII

*9α,11β-Dibromo-6,21-Dimethyl-Δ$^{1,4,6}$-Pregnatriene-17α-Ol-3,20-Dione*

A total of 1 gram of 9α,11β-dibromo-6-methyl-21-methylene-Δ$^{1,4,6}$-pregnatriene-17α-ol-3,20-dione was taken up in 250 ml. of ethyl acetate containing 2½ grams of palladium catalyst at 40° C. and hydrogen was bubbled in at atmospheric pressure. Reaction was stopped after 1 molar equivalent of hydrogen was adsorbed and the catalyst was removed by filtration. It was washed with an additional 50 ml. of ethyl acetate and the filtrates combined. The solvent was removed in vacuo leaving the desired product as a residue.

EXAMPLE XIX

*6α-Chloro-9α-Bromo-11β-Fluoro-21-Methyl-Δ$^{1,4,6}$-Pregnatriene-17α-Ol-3,20-Dione*

A total of 1 gram of 6α-chloro-9α-bromo-11β-fluoro-21-methylene Δ$^{1,4,6}$ - pregnatriene - 17α - ol - 3,20 - dione was taken up i n 250 ml. of di-n-butyl ketone containing 100 mg. of palladium catalyst, and hydrogen was bubbled in at 5 atmospheres pressure. Reaction was stopped after 10 minutes and the catalyst removed by filtration. The catalyst was washed with an additional 30 ml. of di-n-butyl ketone and the filtrates combined. The solvent was removed in vacuo leaving the desired product as a residue.

EXAMPLE XX

*9α-Chloro-11β-Fluoro-21-Methyl-Δ$^{1,4,6}$-Pregnatriene-16α,17α-Diol-3,20-Dione*

A total of 1 gram of 9α-chloro-11β-fluoro-21-methylene-Δ$^{1,4,6}$-pregnatriene-16α,17α-diol-3,20-dione was taken up in 350 ml. of ethyl acetate containing 5 grams of palladium catalyst at 15° C. and hydrogen was bubbled in at atmospheric pressure for 60 minutes. The catalyst was removed by filtration, washed with an additional 50 ml. of chloroform and the filtrates combined. The solvent was removed in vacuo leaving the desired product as a residue.

EXAMPLE XXI

9α,11β-Dichloro-6α,21-Dimethyl-Δ$^{1,4}$-Pregnadiene-17α-Ol-3,20-Dione

A total of 1 gram of 9α,11β-dichloro-6α-methyl-21-methylene-Δ$^{1,4}$-pregnadiene-17α-ol-3,20-dione was taken up in 300 ml. of ethanol containing 500 mg. of palladium catalyst at 35° C. in a hydrogen atmosphere. At the end of 45 minutes, approximately 1 mole of oxygen had been adsorbed. The reaction mixture was then filtered to remove the catalyst. The catalyst was washed with an additional 50 ml. of acetic acid, and the solvent was removed in vacuo leaving the desired product as a residue.

EXAMPLE XXII

9α,11β-Dichloro-6α-Fluoro-21-Methyl-Δ$^{1,4}$-Pregnadiene-17α-Ol-3,20-Dione

A total of 1 gram of 9α,11β-dichloro-6α-fluoro-21-methylene-Δ$^{1,4}$-pregnadiene-17α-ol-3,20-dione, was taken up in 250 ml. of acetone containing 750 mg. of palladium on carbon at 20° C. under a hydrogen atmosphere maintained at 2.5 atmospheres pressure. At the end of 5 minutes, the catalyst was removed by filtration and washed with an additional 35 ml. of acetone. The filtrates were combined and the solvent removed in vacuo leaving the desired product as a residue.

EXAMPLE XXIII

9α,11β-Dichloro-16β,21-Dimethyl-Δ$^{1,4}$-Pregnadiene-17α-Ol-3,20-Dione

A total of 1 gram of 9α,11β-dichloro-16β-methyl-21-methylene-Δ$^{1,4}$-pregnadiene-17α-ol-3,20-dione was taken up in 300 ml. of propanol containing 150 mg. of palladium on carbon at 25° C. and hydrogen was bubbled in at atmospheric pressure. Reaction was stopped after 30 minutes and the catalyst removed by filtration. The catalyst was washed with an additional 50 ml. of propanol and the filtrates combined. The solvent was removed in vacuo leaving the desired product as a residue.

The following compounds are prepared using the procedures of Examples XV through XXIII. Although only 9,11-dichloro compounds are listed, it should be understood that 9-bromo-11-chloro; 9,11-dibromo; 9-bromo-11-fluoro; and 9-chloro-11-fluoro compounds are similarly prepared.

9α,11β-dichloro-2,21-dimethyl-Δ$^{1,4}$-pregnadiene-17α-ol-3,20-dione
6α,9α,11β-trichloro-21-methyl-Δ$^{1,4}$-pregnadiene-17α-ol-3,20-dione
9α,11β-dichloro-21-methyl-Δ$^{1,4}$-pregnadiene-14α,17α-diol-3,20-dione
9α,11β-dichloro-21-methyl-Δ$^{1,4}$-pregnadiene-16α,17α-diol-3,20-dione
9α,11β-dichloro-21-methyl-Δ$^{1,4,6}$-pregnatriene-17α-ol-3,20-dione
9α,11β-dichloro-2,21-dimethyl-Δ$^{1,4,6}$-pregnatriene-17α-ol-3,20-dione
9α,11β-dichloro-6-fluoro-21-methyl-Δ$^{1,4,6}$-pregnatriene-17α-ol-3,20-dione
9α,11β-dichloro-21-methyl-Δ$^{1,4,6}$-pregnatriene-14α,17α-diol-3,20-dione
9α,11β-dichloro-16α,21-dimethyl-Δ$^{1,4,6}$-pregnatriene-17α-ol-3,20-dione
9α,11β-dichloro-16β,21-dimethyl-Δ$^{1,4,6}$-pregnatriene-17α-ol-3,20-dione

EXAMPLE XXIV

9α,11β-Dichloro-21-Iodo-21-Methyl-Δ$^{1,4}$-Pregnadiene-17α-Ol-3,20-Dione

A total of 0.1 gram of 9α,11β-dichloro-21-methyl-Δ$^{1,4}$-pregnadiene-17α-ol-3,20-dione was dissolved in 0.9 ml. of absolute methanol and 1.8 of tetrahydrofuran containing tertiary butyl hydroperoxide in a quantity equivalent to 0.006 gram of iodine/ml. of tetrahydrofuran. The air was displaced by nitrogen and 4 molar equivalents of calcium oxide and 1.5 molar equivalents of finely powdered iodine was added. The reaction flask was stoppered and stirred magnetically at 20° C. for 5 hours. The mixture was then poured into 50 ml. of cold dilute aqueous sodium thiosulfate containing 1% by volume of glacial acetic acid. It was stirred for 15 minutes and filtered to yield the desired product.

EXAMPLE XXV

9α-Bromo-11β-Chloro-21-Iodo-6α,21-Dimethyl-Δ$^{1,4}$-Pregnadiene-17α-Ol-3,20-Dione A total of 1 gram of 9α-bromo-11β-chloro-6α,21-dimethyl-Δ$^{1,4}$-pregnadiene-17α-ol-3,20-dione was dissolved in 9 ml. of absolute ethanol and 18 ml. of tetrahydrofuran containing 0.018 gram of iodine/ml. of tetrahydrofuran. To this mixture, there was added 6 molar equivalents of calcium oxide and 2 molar equivalents of iodine. The reaction flask was stoppered and stirred magnetically at 40° C. for 2 hours. The reaction mixture was then poured into 500 ml. of cold dilute aqueous sodium thiosulfate containing 10% by volume of glacial acetic acid. It was stirred at 5° C. for 2 hours and the product recovered by filtration.

EXAMPLE XXVI

9α,11β-Dibromo-6-Fluoro-21-Iodo-21-Methyl-Δ$^{1,4,6}$ Pregnatriene-17α-Ol-3,20-Dione A total of 0.15 gram of 9α,11β-dibromo-6-fluoro-21-methyl-Δ$^{1,4,6}$-pregnatriene-17α-ol-3,20-dione was dissolved in 1.35 ml. of propanol and 2.7 ml. of tetrahydrofuran containing tertiary butyl hydroperoxide in a quantity equivalent to 0.012 gram of iodine/ml. of tetrahydrofuran. The air was displaced by nitrogen and 5 molar equivalents of calcium oxide and 1.75 molar equivalents of finely powdered iodine was added. The reaction flask was stoppered and stirred magnetically at 30° C. for 3 hours. The mixture was then poured into 200 ml. of water and sufficient solid sodium thiosulfate to decompose the excess iodine. The mixture was stirred vigorously for 5 minutes and the product recovered by filtration.

The following compounds are prepared using the procedures of Examples XXIV through XXVI. Although only 9,11 dichloro compounds are listed, it should be understood that 9-bromo-11-chloro; 9,11-dibromo; 9-bromo-11-fluoro; and 9-chloro-11-fluoro compounds are similarly prepared.

9α,11β-dichloro-21-iodo-2,21-dimethyl-Δ$^{1,4}$-pregnadiene-17α-ol-3,20-dione
6α,9α,11β-trichloro-21-iodo-21-methyl-Δ$^{1,4}$-pregnadiene-17α-ol-3,20-dione
9α,11β-dichloro-6α-fluoro-21-iodo-21-methyl-Δ$^{1,4}$-pregnadiene-17α-ol-3,20-dione
9α,11β-dichloro-21-iodo-21-methyl-Δ$^{1,4}$-pregnadiene-14α,17α-diol-3,20-dione
9α,11β-dichloro-21-iodo-21-methyl-Δ$^{1,4}$-pregnadiene-16α,17α-diol-3,20-dione
9α,11β-dichloro-21-iodo-16α,21-dimethyl-Δ$^{1,4}$-pregnadiene-17α-ol-3,20-dione
9α,11β-dichloro-21-iodo-16β,21-dimethyl-Δ$^{1,4}$-pregnadiene-17α-ol-3,20-dione
9α,11β-dichloro-21-iodo-21-methyl-Δ$^{1,4,6}$-pregnatriene-17α-ol-3,20-dione
9α,11β-dichloro-21-iodo-2,21-dimethyl-Δ$^{1,4,6}$-pregnatriene-17α-ol-3,20-dione 9α,11β-dichloro-21-iodo-6,21-dimethyl-Δ$^{1,4,6}$-pregnatriene-17α-ol-3,20-dione 6,9α,11β-trichloro-21-iodo-21-methyl-Δ$^{1,4,6}$-pregnatriene-17-α-ol-3,20-dione 9α,11β-dichloro-21-iodo-21-methyl-Δ$^{1,4,6}$-pregnatriene-14α,17α-diol-3,20-dione 9α,11β-dichloro-21-iodo-21-methyl-Δ$^{1,4,6}$-pregnatriene-16α,17α,-diol-3,20-dione 9α,11β-dichloro-21-iodo-16β,21-dimethyl-Δ$^{1,4,6}$-pregnatriene-17-ol-3,20-dione

EXAMPLE XXVII

*9α-Bromo-11β-Chloro-21-Methyl-Δ$^{1,4}$-Pregnadiene-17α,21-Diol-3,20-Dione 21-Acetate*

A mixture containing 10 grams of potassium bicarbonate and an equimolar portion of acetic acid in 1 liter of acetone was prepared. To this mixture, there was added 7.3 grams of 9α-bromo-11β-chloro-21-iodo-21-methyl-Δ$^{1,4}$-pregnadiene-17α-ol-3,20-dione in 3.6 liters of acetone. The mixture was refluxed for 16 hours and concentrated to a volume of approximately 100 ml. in vacuo. To the concentrate, there was added 275 ml. of water and the resulting solution was extracted three times with 300 ml. portions of chloroform. The combined chloroform extracts were washed successively with one 200 ml. portion of water, one 200 ml. portion of aqueous sodium bicarbonate and finally with a 200 ml. portion of water. The organic layer was separated, dried over magnesium sulfate, filtered and the desired product obtained by removal of the solvent in vacuo.

This procedure was also used to prepare the formate, propionate, butyrate and valerate esters of this compound.

EXAMPLE XXVIII

*6α,9α,11β-Trichloro-21-Methyl-Δ$^{1,4}$-Pregnadiene-17α,21-Diol-3,20-Dione 21-Acetate*

A solution containing 20 grams of 6α,9α,11β-trichloro-21-iodo-21-methyl-Δ$^{1,4}$-pregnadiene-17α-ol-3,20-dione in 200 ml. of acetone was prepared and a 2000% molar excess of potassium acetate was added. The mixture was maintained at 56° C. for 24 hours and the solvent removed in vacuo. The residue was washed with water, filtered and dried to yield the desired product.

The formate, propionate, butyrate, isobutyrate and valerate were similarly prepared.

EXAMPLE XXIX

*9α-Chloro-11β-Fluoro-6,21-Dimethyl-Δ$^{1,4,6}$-Pregnatriene-17α,21-Diol-3,20-Dione 21-Acetate*

A solution containing 20 grams of 9α-chloro-11β-fluoro-21-iodo-6,21-dimethyl-Δ$^{1,4,6}$-pregnatriene - 17α - ol - 3,20-dione in 200 ml. of dimethyl propamide was prepared and a 200% molar excess of sodium acetate was added. The mixture was maintained at 100° C. for 4 hours and the solvent was removed in vacuo. The residue was washed with water, filtered and dried to yield the desired product.

The following compounds are prepared using the procedures of Examples XXVI through XXIX. Although only 9,11-dichloro compounds are listed, it should be understood that 9-bromo-11-chloro; 9,11-dibromo; 9-bromo-11-fluoro; and 9-chloro-11-fluoro compounds are similarly prepared. Although only acetate esters are listed, it should be understood that formates, propionates, butyrates, valerates and other esters of this invention are similarly prepared.

9α,11β-dichloro-2,21-dimethyl-Δ$^{1,4}$-pregnadiene-17α,21-diol-3,20-dione 21-acetate 6α,9α,11β-trichloro-21-methyl-Δ$^{1,4}$-pregnadiene-17α,21-diol-3,20-dione 21-acetate 9α,11β-dichloro-6α-fluoro-21-methyl-Δ$^{1,4}$-pregnadiene-17α,21-diol-3,20-dione 21-acetate 9α,11β-dichloro-21-methyl-Δ$^{1,4}$-pregnadiene-14α,17α,21-triol-3,20-dione 21-acetate 9α,11β-dichloro-21-methyl-Δ$^{1,4}$-pregnadiene-16α,17α,21-triol-3,20-dione 21-acetate 9α,11β-dichloro-16α,21-dimethyl-Δ$^{1,4}$-pregnadiene-17α,21-diol-3,20-dione 21-acetate 9α,11β-dichloro-16β,21-dimethyl-Δ$^{1,4}$-pregnadiene-17α,21-diol-3,20-dione 21-acetate 9α,11β-dichloro-2,21-dimethyl-Δ$^{1,4,6}$-pregnatriene-17α,21-diol-3,20-dione 21-acetate 6,9α,11β-trichloro-21-methyl-Δ$^{1,4,6}$-pregnatriene-17α,21-diol-3,20-dione 21-acetate 9α,11β-dichloro-6-fluoro-21-methyl-Δ$^{1,4,6}$-pregnatriene-17α,21-diol-3,20-dione 21-acetate 9α,11β-dichloro-21-methyl-Δ$^{1,4,6}$-pregnatriene-14α,17α,21-triol-3,20-dione 21-acetate 9α,11β-dichloro-21-methyl-Δ$^{1,4,6}$-pregnatriene-16α,17α,21-triol-3,20-dione 21-acetate 9α,11β-dichloro-16α,21-dimethyl-Δ$^{1,4,6}$-pregnatriene-17α,21-diol-3,20-dione 21-acetate 9α,11β-dichloro-16β,21-dimethyl-Δ$^{1,4,6}$-pregnatriene-17α,21-diol-3,20-dione 21-acetate

EXAMPLE XL

*9α,11β-Dichloro-Δ$^4$-Pregnene-17α-Ol-3,20-Dione-20-Ethylene Ketal*

A total of 5 g. of 9α,11β-dichloro-Δ$^4$-pregnene-17α-ol-3,20-dione in 40 ml. of benzene containing an equimolar portion of ethylene glycol and 0.5% by weight of p-toluenesulfonic acid monohydrate (based on the weight of steroid) was refluxed for 20 hours employing a water trap so that water was removed as it formed. At the end of this period, the solution was cooled and made basic by the addition of 5% aqueous sodium carbonate. The aqueous mixture was extracted with a 1:1 solution of benzene and ether, the organic layer separated, dried over an anhydrous sodium sulfate and filtered. The solvent was removed in vacuo and the residue recrystallized from acetone-petroleum ether to yield the desired product.

EXAMPLE XLI

*9α,11β-Dichloro-6α-Fluoro-Δ$^4$-Pregnene-17α-Ol-3,20-Dione-20-Butylene Ketal*

A total of 5 g. of 9α,11β-dichloro-6α-fluoro-Δ$^4$-pregnene-17α-ol-3,20-dione in 40 ml. of benzene containing a 10% molar excess of 1,2-dihydroxybutane and 2.5% by weight of p-toluenesulfonic acid monohydrate (based on the weight of steroid employed) was refluxed for 15 hours while removing water continuously. At the end of this period, the solution was cooled and made basic by the addition of 5% aqueous sodium carbonate, the desired product was isolated and purified in accordance with Example XL.

EXAMPLE XLII

*6α,9α,11β-Trichloro-Δ$^4$-Pregnene-17α-Ol-3,20-Dione-20-Propylene Ketal*

A total of 5 g. of 6α,9α,11β-trichloro-Δ$^4$-pregnene-17α-ol-3,20-dione in 40 ml. of benzene containing a 10% molar excess of 1,2-dihydroxypropane and 2.5% by weight of p-toluenesulfonic acid monohydrate (based on the weight of steroid employed) was refluxed for 15 hours while removing water continuously. At the end of this period, the solution was cooled and made basic by the addition of 5% aqueous sodium carbonate, the desired product was isolated and purified in accordance with Example XL.

EXAMPLE XLIII

*9α,11β-Dichloro-16α-Methyl-Δ$^4$-Pregnene-17α-Ol-3,20-Dione-20-Ethylene Ketal*

A total of 5 g. of 9α,11β-dichloro-16α-methyl-Δ$^4$-pregnene-17α-ol-3,20-dione in 40 ml. of benzene containing an equimolar portion of ethylene glycol and 0.5% by weight of p-toluenesulfonic acid monohydrate (based on the weight of steroid) was refluxed for 20 hours employing a water trap so that water was removed as it formed.

At the end of this period, the solution was cooled and made basic by the addition of 5% aqueous sodium carbonate. The aqueous mixture was extracted with a 1:1 solution of benzene and ether, the organic layer separated, dried over an anhydrous sodium sulfate and filtered. The solvent was removed in vacuo and the residue recrystallized from acetone-petroleum ether to yield the desired product.

The following compounds are prepared using the procedure of Examples XL through XLIII. Although only 9,11-dichloro compounds are listed, it should be understood that 9-chloro-11-fluoro; 9-bromo-11-chloro; 9,11-dibromo, and 9-bromo-11-fluoro compounds are similarly prepared. Further, although only ethylene ketals are listed, it should be understood that other 20-ketals including those containing up to four carbon atoms in the ketal moiety are similarly prepared. A list is given to avoid unnecessary repetition of experimental details.

9α,11β-dichloro-2α-methyl-Δ⁴-pregnene-17α-ol-3,20-dione-20-ethylene ketal

9α,11β-dichloro-6α-methyl-Δ⁴-pregnene-17α-ol-3,20-dione-20-ethylene ketal

6α,9α,11β-trichloro-Δ⁴-pregnene-17α-ol-3,20-dione-20-ethylene ketal

9α,11β-dichloro-Δ⁴-pregnene-14α,17α-diol-3,20-dione-20-ethylene ketal

9α,11β-dichloro-Δ⁴-pregnene-16α,17α-diol-3,20-dione-20-ethylene ketal

9α,11β-dichloro-16α-methyl-Δ⁴-pregnene-17α-ol-3,20-dione 20-ethylene ketal

9α,11β-dichloro-16β-methyl-Δ⁴-pregnene-17α-ol-3,20-dione-20-ethylene ketal

9α,11β-dichloro-Δ⁴-pregnene-17α-ol-3,20-dione-20-ethylene ketal

9α,11β-dichloro-2α-methyl-Δ⁴-pregnene-17α-ol-3,20-dione 20-ethylene ketal

9α,11β-dichloro-2α-methyl-Δ⁴,⁶-pregnadiene-17α-ol-3,20-dione-20-ethylene ketal

9α,11β-dichloro-6-methyl-Δ⁴,⁶-pregnadiene-17α-ol-3,20-dione-20-ethylene ketal

9α,11β-dichloro-6-fluoro-Δ⁴,⁶-pregnadiene-17α-ol-3,20-dione-20-ethylene ketal

9α,11β-dichloro-Δ⁴,⁶-pregnadiene-14α,17α-diol-3,20-dione-20-ethylene ketal

9α,11β-dichloro-Δ⁴,⁶-pregnadiene-16α,17α-diol-3,20-dione-20-ethylene ketal

9α,11β-dichloro-16β-methyl-Δ⁴,⁶-pregnadiene-17α-ol-3,20-dione-20-ethylene ketal

EXAMPLE XLIV

*9α,11β-Dichloro-Δ⁴-Pregnene-3β,17α-Diol-20-One-20-Ethylene Ketal*

A total of 5 g. of 9α,11β-dichloro-Δ⁴-pregnene-17α-ol-3,20-dione-20-ethylene ketal was taken up in 50 ml. of methanol containing a 200% molar excess of sodium borohydride and 2 ml. of water. The mixture was allowed to stand at 40° C. for three hours. At the end of this period, 20 ml. of 5% aqueous hydrochloric acid was added and the mixture filtered. The filtrate was extracted twice with 50 ml. portions of ether. The combined organic layers were washed with 5% aqueous sodium bicarbonate, separated, dried over anhydrous magnesium sulfate, filtered and the solvent removed in vacuo to give the desired product.

EXAMPLE XLV

*9α,11β-Dichloro-6α-Fluoro-Δ⁵-Pregnene-3β,17α-Diol-20-One-20-Butylene Ketal*

A total of 5 g. of 9α,11β-dichloro-6α,21-dimethyl-Δ¹,⁴-pregnadiene-17α-ol-3,20-dione-20-butylene ketal was taken up in 60 ml. of propanol containing a 300% molar excess of sodium borohydride and allowed to stand for 30 minutes at 40° C. At the end of this period, the excess borohydride was decomposed and the product isolated as described in the previous example.

EXAMPLE XLVI

*6,9α,11β-Trichloro-Δ⁵-Pregnene-3β,17α-Diol-20-One-20-Propylene Ketal*

A total of 5 g. of 6α,9α,11β-trichloro-Δ⁴-pregnene-17α-ol-3,20-dione-20-propylene ketal was taken up in 75 ml. of ethanol containing a 250% molar excess of sodium borohydride. The reaction mixture was allowed to stand at 25° C. for 2½ hours. At the end of this period, the excess reducing agent was decomposed and the desired product isolated in accordance with the procedure of Example XLIV.

EXAMPLE XLVII

*9α,11β-Dichloro-16α-Methyl-Δ⁵-Pregnene-3β,17β-Diol-20-One-20-Ethylene Ketal*

A total of 5 g. of 9α,11β-dichloro-16α-methyl-Δ⁴-pregnene-17α-ol-3,20-dione-20-ethylene ketal was taken up in 100 cc. of ethanol containing a 300% molar excess of sodium borohydride. The reaction mixture was allowed to stand at 25° C. for 2½ hours. At the end of this period, the excess reducing agent was decomposed and the desired product isolated in accordance with the procedure of Example XLIV.

The following compounds are prepared using the procedures of Examples XLIV through XLVII. Although only 9,11-dichloro compounds are listed, it should be understood that 9-chloro-11-fluoro; 9-bromo-11-chloro, 9,11-dibromo, and 9-bromo-11-fluoro compounds are similarly prepared. Further, although only ethylene ketals are listed, it should be understood that other 20- ketals including those containing up to four carbon atoms in the ketal moiety are similarly prepared. A list is given to avoid unnecessary repetition of experimental details.

9α,11β-dichloro-2α-methyl-Δ⁴-pregnene-3β,17α-diol-20-one-20-ethylene ketal

9α,11β-dichloro-6α-methyl-Δ⁴-pregnene-3β,17α-diol-20-one-20-ethylene ketal

6α,9α,11β-trichloro-Δ⁴-pregnene-3β,17α-diol-20-one-20-ethylene ketal

9α,11β-dichloro-Δ⁴-pregnene-3β,14α,17α-triol-20-one-20-ethylene ketal

9α,11β-dichloro-Δ⁴-pregnene-3β,16α,17α-triol-20-one-20-ethylene ketal

9α,11β-dichloro-16α-methyl-Δ⁴-pregnene-3β,17α-diol-20-one-20-ethylene ketal

9α,11β-dichloro-16β-methyl-Δ⁴-pregnene-3β,17α-diol-20-one-20-ethylene ketal

9α,11β-dichloro-Δ⁴-pregnene-3β,17α-diol-20-one-20-ethylene ketal

9α,11β-dichloro-2α-methyl-Δ⁴-pregnene-3β,17α-diol-20-one-20-ethylene ketal

9α,11β-dichloro-2α-methyl-Δ⁴,⁶-pregnadiene-3β,17α-diol-20-one-20-ethylene ketal

9α,11β-dichloro-6-methyl-Δ⁴,⁶-pregnadiene-3β,17α-diol-20-one-20-ethylene ketal

9α,11β-dichloro-6-fluoro-Δ⁴,⁶-pregnadiene-3β,17α-diol-20-one-20-ethylene ketal

9α,11β-dichloro-Δ⁴,⁶-pregnadiene-3β,14α,17α-triol-20-one-20-ethylene ketal

9α,11β-dichloro-Δ⁴,⁶-pregnadiene-3β,16α,17α-triol-20-one-20-ethylene ketal

9α,11β-dichloro-16β-methyl-Δ⁴,⁶-pregnadiene-3β,17α-diol-20-one-20-ethylene ketal

EXAMPLE XLVIII

*9α,11β-Dichloro-Δ⁴-Pregnene-3β,17α-Diol-20-One*

A total of 5 g. of the product prepared in Example XLIV was taken up in 50 ml. of methanol containing 4% by volume concentrated hydrochloric acid. The mixture was refluxed for four hours, cooled, and extracted with two 50 ml. portions of chloroform. The combined organic layers were washed with 5% aqueous sodium bicarbonate, separated, dried over anhydrous magnesium sulfate, filtered and the desired product obtained by removing the solvent in vacuo.

EXAMPLE XLIX
$9\alpha,11\beta$-Dichloro-$6\alpha$-Floro-$\Delta^4$-Pregnene-$3\beta,17\alpha$-Diol-20-One A total of 5 g. of the product prepared in Example XLV was taken up in 50 ml. of ethanol containing 20% by volume of concentrated hydrochloric acid and the mixture was refluxed for one hour. The product was isolated in accordance with the procedure of Example XLVIII.

EXAMPLE L
$6\alpha,9\alpha,11\beta$-Trichloro-$\Delta^4$-Pregnene-$3\beta,17\alpha$-Diol-20-One A total of 5 g. of the product prepared in Example XLVI was taken up in 50 ml. of ethanol containing 10% by volume of concentrated hydrochloric acid and the mixture was refluxed for one hour. The product was isolated in accordance with the procedure of Example XLVIII.

EXAMPLE LI
$9\alpha,11\beta$-Dichloro-$16\alpha$-Methyl-$\Delta^4$-Pregnene-$3\beta,17\alpha$-Diol-20-One A total of 5 g. of the compound prepared in Example XLVII was taken up in 100 ml. of ethanol containing 15% by volume of concentrated hydrobromic acid. The mixture was maintained at 60° C. for four hours and isolated in accordance with the procedure of Example XLVIII.

The following compounds are prepared using the procedures of Examples XLVIII through LI. Although only 9,11-dichloro compounds are listed, it should be understood that 9-chloro-11-fluoro, 9-bromo-11-chloro, 9,11-dibromo, and 9-bromo-11-fluoro compounds are similarly prepared. Further, although only ethylene ketals are listed, it should be understood that other 20-ketals including those containing up to four carbon atoms in the ketal moiety are similarly prepared. A list is given to avoid unnecessary repetition of experimental details.

$9\alpha,11\beta$-dichloro-$2\alpha$-methyl-$\Delta^4$-pregnene-$3\beta,17\alpha$-diol-20-one
$9\alpha,11\beta$-dichloro-$6\alpha$-methyl-$\Delta^4$-pregnene-$3\beta,17\alpha$-diol-20-one
$6\alpha,9\alpha,11\beta$-trichloro-$\Delta^4$-pregnene-$3\beta,17\alpha$-diol-20-one
$9\alpha,11\beta$-dichloro-$\Delta^4$-pregnene-$3\beta,14\alpha,17\alpha$-triol-20-one
$9\alpha,11\beta$-dichloro-$\Delta^4$-pregnene-$3\beta,16\alpha,17\alpha$-triol-20-one
$9\alpha,11\beta$-dichloro-$16\alpha$-methyl-$\Delta^4$-pregnene-$3\beta,17\alpha$-diol-20-one
$9\alpha,11\beta$-dichloro-$16\beta$-methyl-$\Delta^4$-pregnene-$3\beta,17\alpha$-diol-20-one
$9\alpha,11\beta$-dichloro-$\Delta^4$-pregnene-$3\beta,17\alpha$-diol-20-one
$9\alpha,11\beta$-dichloro-$2\alpha$-methyl-$\Delta^4$-pregnene-$3\beta,17\alpha$-diol-20-one
$9\alpha,11\beta$ - dichloro - $2\alpha$ - methyl - $\Delta^{4,6}$-pregnadiene-$3\beta,17\alpha$-diol-20-one
$9\alpha,11\beta$-dichloro-6-methyl-$\Delta^{4,6}$-pregnadiene-$3\beta,17\alpha$-diol-20-one
$9\alpha,11\beta$-dichloro-6-fluoro-$\Delta^{4,6}$-pregnadiene-$3\beta,17\alpha$-diol-20-one
$9\alpha,11\beta$-dichloro-$\Delta^{4,6}$-pregnadiene-$3\beta,14\alpha,17\alpha$-triol-20-one
$9\alpha,11\beta$-dichloro-$\Delta^{4,6}$-pregnadiene-$3\beta,16\alpha,17\alpha$-triol-20-one
$9\alpha,11\beta$-dichloro-$16\beta$-methyl-$\Delta^{4,6}$-pregnadiene-$3\beta,17\alpha$-diol-20-one

EXAMPLE LII
$9\alpha,11\beta$ - Dichloro - 21 - Dimethylaminomethyl - $\Delta^4$ - Pregnene-$3\beta,17\alpha$-Diol-20-One A total of 20 g. of the product prepared in Example XLVIII was taken up in 350 ml. of methanol containing 12 grams of paraformaldehyde and 40 g. of dimethylamine hydrochloride. The mixture was maintained at 90°C. under pressure for 12 hours. The hot mixture was filtered and the solution evaporated in vacuo. The residue was digested with hot 0.25 N hydrochloric acid, filtered and the filtrate made basic with 10% sodium carbonate. The solution was extracted with chloroform, the organic layer dried over anhydrous sodium sulfate, filtered and the solvent removed in vacuo to leave the desired product as a residue.

EXAMPLE LIII
$9\alpha,11\beta$-Dichloro-$6\alpha$-Fluoro-21-Dimethylethylaminomethyl-$\Delta^4$-Pregnene-$3\beta,17\alpha$-Diol-20-One A total of 25 g. of the product prepared in Example XLIX was taken up with 350 ml. of methanol containing 12 grams of paraformaldehyde and 40 g. of dimethylamine hydrochloride. The mixture was maintained at 90°C. under pressure for 12 hours. The hot mixture was filtered and the solution evaporated in vacuo. The residue was digested with hot 0.25 N hydrochloric acid, filtered and the filtrate made basic with 10% sodium carbonate. The solution was extracted with choloroform, the organic layer dried over anhydrous sodium sulfate, filtered, and the solvent removed in vacuo to leave the desired product as a residue.

EXAMPLE LIV
$6\alpha,9\alpha,11\beta$ - Trichloro - 21 - Dibutylaminomethyl - $\Delta^4$ - Pregnene-$3\beta,17\alpha$-Diol-20-One A total of 20 g. of the product prepared in Example L was taken up in 750 ml. of n-butanol containing 15 g. of paraformaldehyde, 20 g. of dibutylamine hydrochloride and 15 drops of 3 N hydrochloric acid. The solution was refluxed under nitrogen for 6 hours during which time, an additional 1 ml. of 3 N hydrochloric acid was added to maintain the acidity at a pH of approximately 3. The solvent was removed in vacuo and the residue digested with two 300 ml. portions of hot 0.25 N hydrochloric acid. The residue was washed with water, filtered and the filtrate adjusted to a pH of approximately 10 with 10% aqueous sodium carbonate. It was then extracted with chloroform. The chloroform solution was dried over anhydrous sodium sulfate, filtered and the solvent removed in vacuo to leave the desired product as a residue.

EXAMPLE LV
$9\alpha,11\beta$ - Dichloro - $16\alpha$ - Methyl - 21 - Diethylaminomethyl-$\Delta^4$-Pregnene-$3\beta,17\alpha$-Diol-20-One A total of 35 g. of a product prepared as in Example LI was taken up in 500 ml. of n-butanol containing 20 g. of paraformaldehyde, 60 g. of diethylamine hydrobromide and 3 ml. of 40% aqueous hydrobromic acid. The mixture was refluxed for 2 hours and filtered. The filtrate was evaporated in vacuo and the residue digested with 150 ml. of hot 0.25 N hydrochloric acid and filtered. The filtrate was adjusted to an approximate pH of 10 with 10% sodium carbonate. The aqueous solution was extracted with carbon tetrachloride, the organic layer dried over anhydrous magnesium sulfate, filtered and the desired product obtained by removing the solvent in vacuo.

The following compounds are prepared using the procedures of Examples LII through LV. Although only 9,11-dichloro compounds are listed, it should be understood that 9-bromo-11-chloro; 9,11-dibromo; 9-bromo-11-fluoro; and 9-chloro-11-fluoro compounds are similarly prepared. Although only dimethylaminomethyl compounds are listed, it should be understood that other alkyl amino compounds including those in which the alkyl substituents contain up to four carbon atoms are similarly prepared. The list is given to avoid unnecessary repetition of experimental details.

$9\alpha,11\beta$-dichloro-2-methyl-21-dimethylaminomethyl-$\Delta^4$-pregnene-$3\beta,17\alpha$-diol-20-one 9α,11β-dichloro-6α-methyl-21-dimethylaminomethyl-Δ⁴-pregnene-3β,17α-diol-20-one 6α,9α,11β-trichloro-21-dimethylaminomethyl-Δ⁴-pregnene-3β,17α-diol-20-one 9α,11β-dichloro-21-dimethylaminomethyl-Δ⁴-pregnene-3β,14α,17α-triol-20-one 9α,11β-dichloro-21-dimethylaminomethyl-Δ⁴-pregnene-3β,16α,17α-triol-20-one 9α,11β-dichloro-16α-methyl-21-dimethylaminomethyl-Δ⁴-pregnene-3β,17α-diol-20-one 9α,11β-dichloro-16β-methyl-21-dimethylaminomethyl-Δ⁴-pregnene-3β,17α-diol-20-one 9α,11β-dichloro-21-dimethylaminomethyl-Δ⁴-pregnene-3β,17α-diol-20-one 9α,11β-dichloro-2α-methyl-21-dimethylaminomethyl-Δ⁴-pregnene-3β,17α-diol-20-one 9α,11β-dichloro-2-methyl-21-dimethylaminomethyl-Δ⁴,⁶-pregnadiene-3β,17α-diol-20-one 9α,11β-dichloro-6-methyl-21-dimethylaminomethyl-Δ⁴,⁶-pregnadiene-3β,17α-diol-20-one 9α,11β-dichloro-6-fluoro-21-dimethylaminomethyl-Δ⁴,⁶-pregnadiene-3β,17α-diol-20-one 9α,11β-dichloro-21-dimethylaminomethyl-Δ⁴,⁶-pregnadiene-3β,14α,17α-triol-20-one 9α,11β-dichloro-21-dimethylaminomethyl-Δ⁴,⁶-pregnadiene-3β,16α,17α-triol-20-one 9α,11β-dichloro-16β-methyl-21-dimethylaminomethyl-Δ⁴,⁶-pregnadiene-3β,17α-diol-20-one

EXAMPLE LVI

*Preparation of Quaternary Ammonium Compounds*

The following procedures are illustrative of the methods used to prepare 3-hydroxy quaternary ammonium halides of this invention.

A solution of 7.5 g. of the product prepared in Example LII in 180 ml. of methanol containing 80 ml. of methyl bromide was allowed to stand overnight and the mixture was then evaporated to dryness in vacuo. The residue was triturated with acetone and the desired product recovered by filtration. An additional crop of quaternary compound may be obtained by evaporation of the acetone filtrate and this is purified by trituration with methanol and recovered by filtration. The product obtained was 9α,11β-dichloro-21-dimethylaminomethyl-Δ⁴-pregnene-3β,17α-diol-20-one methobromide.

A solution of 7.5 g. of the product obtained in Example LIII in 150 ml. of ethanol containing a 50% molar excess of butyl chloride was allowed to stand at 25° C. for 16 hours and the mixture was then evaporated to dryness in vacuo. The residue was triturated with acetone and the desired product recovered by filtration. The product obtained was 9α,11β-dichloro-6α-fluoro-21-dimethylaminomethyl-Δ⁴-pregnene-3β,17α-diol-20-one butyl chloride.

A solution of 8 g. of the product obtained in Example LIV in 200 ml. of methanol containing a 20% molar excess of ethyl iodide was allowed to stand for 20 hours at approximately 28° C. and the mixture was then evaporated to dryness in vacuo. The residue was triturated with ether and the desired product recovered by filtration. The product obtained was 6α,9α,11β-trichloro-21-dibutylaminomethyl-Δ⁴-pregnene-3β,17α-diol-20-one ethyl iodide.

Other quaternary alkyl amine halides salts of the 21-dialkylamino methyl compounds prepared as described above in which the quaternizing agent contains up to four carbon atoms are prepared in accordance with the procedures of this example.

EXAMPLE LVII

*9α,11β-Dichloro-21-Methylene-Δ⁴-Pregnene-3β,17α-Diol-20-One*

A solution of 200 mg. of 9α,11β-dichloro-21-dimethylaminomethyl-Δ⁴-pregnene-3β,17α-diol-20-one-methobromide in 10 ml. of water was prepared and clarified by filtration. To the solution there was added 68 mg. of sodium bicarbonate in 2 ml. of water at 25° C. A precipitate separated and the suspension was stirred for one hour, filtered, washed with water and dried in vacuo to yield the desired product.

EXAMPLE LVIII

*6α,11β-Dichloro-6α-Fluoro-21-Methylene-Δ⁴-Pregnene-3β,17α-Diol-20-One*

A solution containing 200 mg. of 9α,11β-dichloro-6α-fluoro-21-dimethylaminomethyl-Δ⁴-pregnene-3β,17α-diol-20-one butyl chloride was dissolved in 10 ml. of water and stirred at 20° C. for six hours. The desired product separated and was recovered by filtration.

EXAMPLE LIX

*6α,9α,11β-Trichloro-21-Methylene-Δ⁴-Pregnene-3β,17α-Diol-20-One*

A solution containing 200 mg. of 6α,9α,11β-trichloro-21-dibutylaminomethyl-Δ⁴-pregnene-3β,17α-diol-20-one butyl bromide was dissolved in 15 ml. of water and clarified by filtration. The solution was adjusted to pH 12 by the cautious addition of 2% sodium hydroxide at 30° C. A precipitate separated and the suspension was stirred for four hours before recovering the desired product by filtration.

EXAMPLE LX

*9α,11β-Dichloro-16α-Methyl-21-Methylene-Δ⁴-Pregnene-3β,17α-Diol-20-One*

A solution containing 400 mg. of 9α,11β-dichloro-16α-methyl-21-dimethylaminomethyl-Δ⁴-pregnene-3β,17α-diol-20-one ethyl chloride was dissolved in 15 ml. of water and the solution clarified by filtration. A 2% aqueous solution of sodium citrate in 2 ml. of water was added. The resulting mixture was stirred for four hours during which time the desired product separated and was recovered by filtration.

The following compounds are prepared using the procedure of Examples LVII through LX. Although only 9,11-dichloro compounds are listed, it should be understood that 9-bromo-11-chloro; 9,11-dibromo; 9-bromo-11-fluoro; and 9-chloro-11-fluoro compounds are similarly prepared. The list is given to avoid unnecessary repetition of experimental details.

9α,11β-dichloro-2α-methyl-21-methylene-Δ⁴-pregnene-3β,17α-diol-20-one

9α,11β-dichloro-21-methylene-Δ⁴-pregnene-3β,14α,17α-triol-20-one

9α,11β-dichloro-21-methylene-Δ⁴-pregnene-3β,16α,17α-triol-20-one

9α,11β-dichloro-16α-methyl-21-methylene-Δ⁴-pregnene-3β,17α-diol-20-one

9α,11β-dichloro-16β-methyl-21-methylene-Δ⁴-pregnene-3β,17α-diol-20-one

9α,11β-dichloro-2α-methyl-21-methylene-Δ⁴,⁶-pregnadiene-3β,17α-diol-20-one

9α,11β-dichloro-6-methyl-21-methylene-Δ⁴,⁶-pregnadiene-3β,17α-diol-20-one 6,9α,11β-trichloro-21-methylene-Δ⁴,⁶-pregnadiene-3β,17α-diol-20-one 9α,11β-dichloro-21-methylene-Δ⁴,⁶-pregnadiene-3β,17α-diol-20-one 9α,11β-dichloro-21-methylene-Δ⁴,⁶-pregnadiene-3β,14α,17α-triol-20-one 9α,11β-dichloro-21-methylene-Δ⁴,⁶-pregnadiene-3β,16α,17α-triol-20-one 9α,11β-dichloro-16β-methyl-21-methylene-Δ⁴,⁶-pregnadiene-3β,17α-diol-20-one

EXAMPLE LXI

*9α-Bromo-11β-Fluoro-21-Methylene-Δ⁴-Pregnene-3β,17α-Diol-20-One*

A total of 5 g. of 9α-bromo-11β-fluoro-21-diethylaminomethyl-Δ⁴-pregnene-3β,17α-diol - 20 - one - hydrochloride prepared by bubbling anhydrous hydrogen chloride through the free base in ether was taken up in 100 ml. of ethanol and a 50% molar excess of ethyl bromide together with 0.6 g. of potassium acetate was added. The mixture was refluxed for five hours and evaporated to ⅓ volume. The desired product was precipitated by the addition of four volumes of water and collected by filtration.

EXAMPLE LXII

9α,11β-Dichloro-21-Methylene-Δ⁴-Pregnene-17α-Ol-3,20-Dione

A total of 20 g. of the product prepared in Example LVII in 1500 ml. of acetone at 10° C. was treated with 30 ml. of 8 N chromic acid reagent added in one portion with vigorous stirring. After five minutes, the reaction temperature rose to 22° C. and the entire mixture was poured into 10 l. of water whereupon the ketone precipitated. It was collected by filtration, washed with water and air-dried. An additional portion of the desired product was isolated by extracting the aqueous filtrate with chloroform, drying the organic layer over anhydrous sodium sulfate filter and evaporating the solvent in vacuo.

EXAMPLE LXIII

9α,11β-Dichloro-6α-Fluoro-21-Methylene-Δ⁴-Pregnene-17α-Ol-3,20-Dione

To a solution of 5 g. of the product in Example LVIII in 25 ml. of glacial acetic acid there was added 15 ml. of a solution of chromic trioxide in 9:1 acetic acid-water solution containing 76 mg. of chromic trioxide per ml. of solution. The mixture was kept at room temperature for an additional four hours. The desired product was precipitated by the addition of water and collected by filtration.

EXAMPLE LXIV

6α,9α,11β-Trichloro-21-Methylene-Δ⁴-Pregnene-17α-Ol-3,20-Dione

Chromic anhydride (0.125 g.) was added to 15 ml. of pyridine at approximately 5° C. and the mixture allowed to warm spontaneously to room temperature. To this solution there was added 2.5 g. of the product prepared in Example LIX in 20 ml. of pyridine and the mixture was allowed to stand at room temperature for 25 hours. The solution was extracted with ether and the ether solution washed twice with 5% aqueous hydrochloric acid and then with water. The ether layer was dried over anhydrous sodium sulfate filter and the desired product obtained by removal of the solvent in vacuo.

EXAMPLE LXV

9α,11β-Dichloro-16α-Methyl-21-Methylene-Δ⁴-Pregnene-17α-Ol-3,20-Dione

A solution of 0.5 g. of sodium dichromate dihydrate in 10 ml. of glacial acetic acid was added over a 30 minute period to 0.25 g. of the product prepared in Example LX in 50 ml. of 1:1 glacial acetic acid-benzene at 10° C. After one hour, an additional 0.3 g. of oxidized agent in 7 ml. of solvent was added and the mixture left standing for 24 hours at 10° C. It was poured into cold aqueous sodium bisulfite solution and the solution extracted with ether. The organic layer was washed with water until the washings were neutral, dried over anhydrous sodium sulfate, filtered and the ether removed in vacuo to isolate the desired product.

The following compounds are prepared using procedures of Examples LXII through LXV. Although only 9,11-dichloro compounds are listed, it should be understood that 9-bromo-11-chloro; 9,11-dibromo; 9-bromo-11-fluoro; and 9-chloro-11-fluoro compounds are similarly prepared. The list is given to avoid unnecessary repetition of experimental details.

9α,11β-dichloro-2α-methyl-21-methylene-Δ⁴-pregnene-17α-ol-3,20-dione
9α,11β-dichloro-21-methylene-Δ⁴-pregnene-14α,17α-diol-3,20-dione
9α,11β-dichloro-16α-methyl-21-methylene-Δ⁴-pregnene-17α-ol-3,20-dione
9α,11β-dichloro-16β-methyl-21-methylene-Δ⁴-pregnene-17α-ol-3,20-dione
9α,11β-dichloro-2α-methyl-21-methylene-Δ⁴,⁶-pregnadiene-17α-ol-3,20-dione
9α,11β-dichloro-6-methyl-21-methylene-Δ⁴,⁶-pregnadiene-17α-ol-3,20-dione
6,9α,11β-trichloro-21-methylene-Δ⁴,⁶-pregnadiene-17α-ol-3,20-dione
9α,11β-dichloro-21-methylene-Δ⁴,⁶-pregnadiene-14α,17α-diol-3,20-dione
9α,11β-dichloro-16β-methyl-21-methylene-Δ⁴,⁶-pregnadiene-17α-ol-3,20-dione The compounds 9α,11β-dichloro-21-methylene-Δ⁴-pregnene-16α,17α-diol-3,20-dione and 9,11β-dichloro-21-methylene-Δ⁴,⁶-pregnadiene-16α-17α-diol-3,20-dione and the other 9,11-halogenated compounds of this class were prepared by oxidizing with manganese dioxide in accordance with the procedure described in the Journal of the American Chemical Society 75, 5930 (1953). For example, a solution containing 1 g. of the appropriate substrate in 100 ml. of chloroform were shaken with 10 g. of manganese dioxide at room temperature for four hours and filtered. The precipitate was washed with chloroform. The combined chloroform solutions were dried over anhydrous magnesium sulfate, filtered and the solvent removed in vacuo to yield the desired product as a residue.

EXAMPLE LXVI

9α,11β-Dichloro-21-Methyl-Δ⁴-Pregnene-17α-Ol-3,20-Dione

A total of 1 g. of the product prepared in Example LXII was taken up in 300 ml. of 95% ethanol containing 250 mg. of palladium on carbon at 25 to 30° C. Hydrogen was bubbled in the atmospheric pressure. Reaction was stopped atfer 15 minutes and the catalyst removed by filtration. The catalyst was washed with an additional 50 ml. of 95% ethanol and the filtrates combined. The solvent was removed in vacuo leaving the desired product as a residue.

EXAMPLE LXVII

9α,11β-Dichloro-6α-Fluoro-21-Methyl-Δ⁴-Pregnene-17α-Ol-3,20-Dione

A total of 1 g. of the product prepared in Example LXIII was taken up in 300 ml. of methanol containing 1 g. of 5% palladium on calcium carbonate at 15° C. The mixture was agitated under hydrogen maintained at 10 atmospheres pressure. The reaction was stopped after one molecular equivalent of hydrogen had been adsorbed and the catalyst was removed by filtration. The catalyst was washed with an additional 50 ml. of methanol and the filtrates combined. The solvent was removed in vacuo leaving the desired product as a residue.

EXAMPLE LXVIII

6α,9α,11β-Dichloro-21-Methyl-Δ⁴-Pregnene-17α-Ol-3,20-Dione

A total of 1 g. of the product prepared in Example LXIV was taken up in 250 ml. of ethyl acetate containing 2.5 g. of palladium catalyst. Hydrogen was bubbled in an atmospheric pressure while maintaining the temperature at 40° C. Reaction was stopped after one molar equivalent of hydrogen had been adsorbed and the catalyst was removed by filtration. It was washed with an additional 50 ml. of ethyl acetate and the filtrates combined. The solvent was removed in vacuo leaving the desired product as a residue.

EXAMPLE LXIX

9α,11β-Dichloro-16α,21-Dimethyl-Δ⁴-Pregnene-17α-Ol-3,20-Dione

A total of 1 g. of the product prepared in Example LXV was taken up in 250 ml. of di-n-butyl ketone containing 100 mg. of palladium catalyst and hydrogen was bubbled in an atmospheric pressure. Reaction was stopped after ten minutes and the catalyst removed by filtration. The catalyst was washed with 30 ml. of solvent and the filtrates combined. The solvent was removed in vacuo leaving the desired product as a residue.

The following compounds are prepared using the procedures of Examples LXVI through LXIX. Although only 9,11-dichloro compounds are listed, it should be understood that 9-chloro-11-fluoro; 9-bromo-11-chloro; 9,11-dibromo, and 9-bromo-11-fluoro compounds are similarly prepared. A list is given to avoid unnecessary repetition of experimental details.

9α,11β-dichloro-6α,21-dimethyl-Δ⁴-pregnene-17α-ol-3,20-dione
9α,11β-dichloro-16β,21-dimethyl-Δ⁴-pregnene-17α-ol-3,20-dione
9α,11β-dichloro-2α,21-dimethyl-Δ⁴-pregnene-17α-ol-3,20-dione
6α,9α,11β-trichloro-21-methyl-Δ⁴-pregnene-17α-ol-3,20-dione
9α,11β-dichloro-21-methyl-Δ⁴-pregnene-14α,17α-diol-3,20-dione
9α,11β-dichloro-21-methyl-Δ⁴-pregnene-16α,17α-diol-3,20-dione
9α,11β-dichloro-21-methyl-Δ⁴,⁶-pregnadiene-17α-ol-3,20-dione
9α,11β-dichloro-2α,21-dimethyl-Δ⁴,⁶-pregnadiene-17α-ol-3,20-dione
9α,11β-dichloro-6,21-dimethyl-Δ⁴,⁶-pregnadiene-17α-ol-3,20-dione
6,9α,11β-trichloro-21-methyl-Δ⁴,⁶-pregnadiene-17α-ol-3,20-dione
9α,11β-dichloro-21-methyl-Δ⁴,⁶-pregnadiene-14α,17α-diol-3,20-dione
9α,11β-dichloro-16β,21-dimethyl-Δ⁴,⁶-pregnadiene-17α-ol-3,20-dione

EXAMPLE LXX

9α,11β-Dichloro-21-Iodo-21-Methyl-Δ⁴-Pregnene-17α-Ol-3,20-Dione

A total of 1 g. of the product prepared in Example LXVI was dissolved in 0.9 ml. of absolute methanol and 18 ml. of tetrahydrofuran containing tertiary butyl hydroperoxide in a quantity equivalent 0.006 g. of iodine per ml. of tetrahydrofuran. The air was displaced by nitrogen and four molar equivalents of calcium oxide and 1.5 molar equivalents of finely powdered iodine was added. The reaction flask was stoppered and stirred magnetically at 20° C. for five hours. The mixture was then poured into 50 ml. of cold dilute aqueous sodium thiosulfate containing 1% by volume of glacial acetic acid. It was stirred for 15 minutes and filtered to yield the desired product.

EXAMPLE LXXI

9α,11β-Dichloro-6α-Fluoro-21-Iodo-21-Methyl-Δ⁴-Pregnene-17α-Ol-3,20-Dione

A total of 1 g. of the product prepared in Example LXVII was dissolved in 9 ml. of absolute ethanol and 18 ml. of tetrahydrofuran containing tertiary butyl hydroperoxide in a quantity equivalent to 0.018 g. of iodine per ml. of tetrahydrofuran. To this mixture there was added six molar equivalents of calcium oxide and two molar equivalents of iodine. The reaction flask was stoppered and stirred magnetically at 40° C. for two hours. The reaction mixture was then poured into 500 ml. of cold dilute aqueous sodium thiosulfate containing 10% by volume of glacial acetic acid. It was stirred at 5° C. for two hours and the product recovered by filtration.

EXAMPLE LXXII

6α,9α,11β-Trichloro-21-Iodo-21-Methyl-Δ⁴-Pregnene-17α-Ol-3,20-Dione

A total of 0.15 g. of the product prepared in Example LXVIII was dissolved in 1.35 ml. of propanol and 2.7 ml. of tetrahydrofuran containing tertiary butyl hydroperoxide in a quantity equivalent to 0.012 g. of iodine per ml. of tetrahydrofuran. The air was displaced by nitrogen and five molar equivalents of calcium oxide and 1.75 molar equivalents of finely powdered iodine was added. The reaction flask was stoppered and stirred magnetically at 30° C. for three hours. The mixture was then poured into 200 ml. of water and sufficient solid sodium thiosulfate was added to decompose the excess iodine. The mixture was stirred vigorously for 5 minutes and the product recovered by filtration.

EXAMPLE LXXIII

9α,11β-Dichloro-21-Iodo-16α,21-Dimethyl-Δ⁴-Pregnene-17α-Ol-3,20-Dione

This compound was prepared from the compound prepared in Example LXIX using the procedure of Example LXXII.

The following compounds are prepared using the procedures of Examples LXX through LXXIII. Although only 9,11-dichloro compounds are listed, it should be understood that 9-chloro-11-fluoro; 9-bromo-11-chloro; 9,11-dibromo, and 9-bromo-11-fluoro compounds are similarly prepared. The list is given to avoid unnecessary repetition of experimental details.

9α,11β-dichloro-21-iodo-2α,21-dimethyl-Δ⁴-pregnene-17α-ol-3,20-dione
6α,9α,11β-trichloro-21-iodo-21-methyl-Δ⁴-pregnene-17α-ol-3,20-dione
9α,11β-dichloro-6α-fluoro-21-iodo-21-methyl-Δ⁴-pregnene-17α-ol-3,20-dione
9α,11β-dichloro-21-iodo-21-methyl-Δ⁴-pregnene-14α,17α-diol-3,20-dione
9α,11β-dichloro-21-iodo-21-methyl-Δ⁴-pregnene-16α,17α-diol-3,20-dione
9α,11β-dichloro-21-iodo-16α,21-dimethyl-Δ⁴-pregnene-17α-ol-3,20-dione
9α,11β-dichloro-21-iodo-16β,21-dimethyl-Δ⁴-pregnene-17α-ol-3,20-dione
9α,11β-dichloro-21-iodo-21-methyl-Δ⁴,⁶-pregnadiene-17α-ol-3,20-dione
9α,11β-dichloro-21-iodo-2α,21-dimethyl-Δ⁴,⁶-pregnadiene-17α-ol-3,20-dione
9α,11β-dichloro-21-iodo-6,21-dimethyl-Δ⁴,⁶-pregnadiene-17α-ol-3,20-dione
6,9α,11β-trichloro-21-iodo-21-methyl-Δ⁴,⁶-pregnadiene-17α-ol-3,20-dione
9α,11β-dichloro-21-iodo-21-methyl-Δ⁴,⁶-pregnadiene-14α,17α-diol-3,20-dione
9α,11β-dichloro-21-iodo-21-methyl-Δ⁴,⁶-pregnadiene-16α,17α-diol-3,20-dione
9α,11β-dichloro-21-iodo-16β,21-dimethyl-Δ⁴,⁶-pregnadiene-17α-ol-3,20-dione

EXAMPLE LXXIV

9α,11β-Dichloro-21-Methyl-Δ⁴-Pregnene-17α,21-Diol-3,20-Dione-21-Acetate

The mixture containing 10 g. of potassium bicarbonate and an equimolar portion of acetic acid in 1 l. of acetone was prepared. To this mixture there was added 7.3 g. of the product prepared in Example LXX in 3.6 l. of acetone. The mixture was refluxed for 16 hours and concentrated to a volume of approximately 100 ml. in vacuo. To the concentrate there was added 275 ml. of water and the resulting solution was extracted three times with 300 ml. portions of chloroform. The combined chloroform extractions were washed successively with one 200 ml. portion of water, one 200 ml. portion of aqueous sodium bicarbonate and finally with a 200 ml. portion of water.

The organic layer was separated, dried over magnesium sulfate, filtered and the desired product obtained by removal of the solvent in vacuo. This procedure was also used to prepare the formate, propionate, butyrate and the valerate esters of this compound.

EXAMPLE LXXV

*$9\alpha,11\beta$-Dichloro-$6\alpha$-Fluoro-21-Methyl-$\Delta^4$-Pregnene-$17\alpha,21$-Diol-3,20-Dione-21-Acetate*

A solution containing 20 g. of the product prepared in Example LXXI in 200 ml. of acetone was prepared and a 2,000% molar excess of potassium acetate was added. The mixture was maintained at 56° C. for 24 hours and the solvent removed in vacuo. The residue was washed with water, filtered and dried to yield the desired product.

The formate, propionate, butyrate, isobutyrate, and valerate esters were similarly prepared.

EXAMPLE LXXVI

*$6\alpha,9\alpha,11\beta$-Trichloro-21-Methyl-$\Delta^4$-Pregnene-$17\alpha,21$-Diol-3,20-Dione-21-Acetate*

A solution containing 20 g. of the product prepared in Example XXII in 200 ml. of N,N-dimethylpropionamide was prepared and a 200% molar excess of sodium acetate was added. The mixture was maintained at 200° C. for four hours and the solvent was removed in vacuo. The residue was washed with water, filtered and dried to yield the desired product.

The formate, propionate, butyrate and valerate esters of this compound were similarly prepared.

EXAMPLE LXXVII

*$9\alpha,11\beta$-Dichloro-$16\alpha,21$-Dimethyl-$\Delta^4$-Pregnene-$17\alpha$-21-Diol-3,20-Dione-21-Acetate*

This compound was prepared from the compound prepared in Example LXXIII using the procedure of Example LXXV.

The formate, propionate, butyrate, and valerate esters were similarly prepared.

The following compounds are prepared using the procedures of Examples LXXIV through LXXVII. Although only 9,11-dichloro compounds are listed, it should be understood that 9-bromo-11-chloro; 9,11-dibromo; 9-bromo-11-fluoro; and 9-chloro-11-fluoro compounds are similarly prepared. Although only acetate esters are listed, it should be understood that formates, propionates, butyrates, valerates and other esters of this invention are similarly prepared. The list is given to avoid unnecessary repetition of experimental details.

$9\alpha,11\beta$-dichloro-$2\alpha,21$-dimethyl-$\Delta^4$-pregnene-$17\alpha,21$-diol-3,20-dione-21-acetate
$6\alpha,9\alpha,11\beta$-trichloro-21-methyl-$\Delta^4$-pregnene-$17\alpha,21$-diol-3,20-dione-21-acetate
$9\alpha,11\beta$-dichloro-$6\alpha$-fluoro-21-methyl-$\Delta^4$-pregnene-$17\alpha,21$-diol-3,20-dione-21-acetate
$9\alpha,11\beta$-dichloro-21-methyl-$\Delta^4$-pregnene-$14\alpha,17\alpha,21$-triol-3,20-dione-21-acetate
$9\alpha,11\beta$-dichloro-21-methyl-$\Delta^4$-pregnene-$16\alpha,17\alpha,21$-triol-3,20-dione-21-acetate
$9\alpha,11\beta$-dichloro-$16\alpha,21$-dimethyl-$\Delta^4$-pregnene-$17\alpha,21$-diol-3,20-dione-21-acetate
$9\alpha,11\beta$-dichloro-$16\beta,21$-dimethyl-$\Delta^4$-pregnene-$17\alpha,21$-diol-3,20-dione-21-acetate
$9\alpha,11\beta$-dichloro-21-methyl-$\Delta^{4,6}$-pregnadiene-$17\alpha,21$-diol-3,20-dione-21-acetate
$9\alpha,11\beta$-dichloro-$2\alpha,21$-dimethyl-$\Delta^{4,6}$-pregnadiene-$17\alpha,21$-diol-3,20-dione-21-acetate
$6,9\alpha,11\beta$-trichloro-21-methyl-$\Delta^{4,6}$-pregnadiene-$17\alpha,21$-diol-3,20-dione-21-acetate
$9\alpha,11\beta$-dichloro-6-fluoro-21-methyl-$\Delta^{4,6}$-pregnadiene-$17\alpha,21$-diol-3,20-dione-21-acetate
$9\alpha,11\beta$-dichloro-21-methyl-$\Delta^{4,6}$-pregnadiene-$14\alpha,17\alpha,21$-triol-3,20-dione-21-acetate
$9\alpha,11\beta$-dichloro-21-methyl-$\Delta^{4,6}$-pregnadiene-$16\alpha,17\alpha,21$-triol-3,20-dione-21-acetate
$9\alpha,11\beta$-dichloro-$16\alpha,21$-dimethyl-$\Delta^{4,6}$-pregnadiene-$17\alpha,21$-diol-3,20-dione-21-acetate
$9\alpha,11\beta$-dichloro-$16\beta,21$-dimethyl-$\Delta^{4,6}$-pregnadiene-$17\alpha,21$-diol-3,20-dione-21-acetate

EXAMPLE LXXVIII

*$\Delta^4$-Pregnene-$11\beta,16\alpha,17\alpha$-Triol-3,20-Dione-21-Ol*

A suspension of 500 mg. of $\Delta^4$-pregnene-$11\beta,16\alpha,17\alpha$, 21-tetrol-3,20-dione in 10 ml. of methanol was maintained at 60° C. while adding 750 mg. of cupric acetate partially dissolved in a mixture of 3 ml. of water and 12 ml. of methanol containing three drops of glacial acetic acid. The mixture was maintained at 60° C. for 30 minutes and the blue supernatant liquid decanted from the precipitated cuprous oxide. The blue solution was treated with 100 mg. of ethylenediamine tetra-acetic acid and evaporated to a volume of 4 ml. The residue was washed with water and filtered. The product was recovered as the monohydrate and converted to the non-hydrated form by heating at 135° C. and 0.5 mm. of mercury pressure for 24 hours.

EXAMPLE LXXIX

*$17\beta$-(2,3-Epoxido-Propionyl)-$\Delta^4$-Pregnene-$11\beta,16\alpha,17\alpha$-Diol-30-One*

A solution was prepared containing 1 m. mole of the product prepared in the previous example in 35 ml. of methanol containing 17.5 ml. of ether. To this solution there was added a diazomethane solution containing 4 m. moles of diazomethane in 17.5 ml. of ether. The solution was maintained at 0° C. for 24 hours and the solution evaporated in vacuo. The residue was triturated with ether and the crystalline product recovered by filtration.

EXAMPLE LXXX

*21-Methyl-$\Delta^4$-Pregnene-$11\beta,16\alpha,17\alpha$-Triol-3,20,21-Trione*

A mixture containing 10 g. of the compound prepared in the previous example in 100 ml. of ethyl acetate was maintained at 165° C. for one hour while anhydrous hydrogen chloride was bubbled into the mixture. At the end of this period, the solvent was evaporated in vacuo to leave the desired product as a residue. It was purified by trituration with ether.

EXAMPLE LXXXI

*21-Methyl-$\Delta^4$-Pregnene-$11\beta,16\alpha,17\alpha$-Triol-3,20,21-Trione-16-Acetate*

A total of 3.5 mg. of the compounds prepared in the previous example in 40 ml. of anhydrous pyridine containing 2 ml. of acetic anhydride was maintained at 0° C. for eight hours and then allowed to warm spontaneously to room temperature. The mixture was concentrated in vacuo and the residue taken up in chloroform. The chloroform solution was washed successively with water, dilute hydrochloric acid, dilute sodium bicarbonate, and again with water. It was dried over anhydrous sodium sulfate, filtered and the solvent removed in vacuo to leave the desired product as a residue.

EXAMPLE LXXXII

*21-Methyl-$\Delta^{4,9(11)}$-Pregnadiene-$16\alpha,17\alpha$-Diol-3,20,21-Trione-16-Acetate*

A solution containing 5 g. of the product prepared as described in the previous example in 25 ml. of N,N-dimethylformamide was prepared. The solution was placed in a three-necked flask to which was affixed a sealed stirrer, a dropping funnel and a condenser. The condenser and dropping funnel were protected with drying tubes. The mixture was cooled to −20° C. and a solution containing 4.6 ml. of methanesulfonyl chloride in 5 ml. of pyridine was added drop-wise over a period of one hour with continued stirring. At the end of the hour, stirring was stopped, the reaction mixture allowed to come to room temperature, i.e. 25-30° C. and left standing for ten hours. At the end of this period, the solution was added drop-wise to 750 ml. of ice cold water with stirring. The desired product precipitated and was recovered by filtration. It was purified by recrystallization from acetone-petroleum ether.

EXAMPLE LXXXIII $9\alpha,11\beta$-Dichloro-21-Methyl-$\Delta^4$-Pregnene-$16\alpha,17\alpha$-Diol-3,20,21-Trione-16-Acetate A total of 2 g. of the compound prepared as described in the previous example was taken up in 60 ml. of carbon tetrachloride containing 2 ml. of dry pyridine. To this solution at $-50°$ C. there was added a 25% molar excess of chlorine dissolved in 5 ml. of carbon tetrachloride. The mixture was stirred for two hours and allowed to come to room temperature. It was washed with 5% hydrochloric acid, 5% sodium carbonate, and finally with water. The organic layer was dried over anhydrous sodium sulfate, filtered, decolorized with charcoal, again filtered and the solvent removed in vacuo. The residue was triturated with ether to give the desired product.

EXAMPLE LXXXIV $9\alpha,11\beta$-Dichloro-21-Methyl-$\Delta^4$-Pregnene-$16\alpha,17\alpha,21$-Triol-3,20-Dione-16-Acetate A solution containing 1.86 g. of the product prepared in the previous example in 150 ml. of methanol was prepared. To this solution, there was added a mixture containing 133 mg. of sodium borohydride in 36 ml. of methanol and the mixture was allowed to stand at from 0° C. to 5° C. for three hours. The excess reducing agent was decomposed by the drop-wise use of dilute acetic acid. The mixture was filtered and the solvent removed in vacuo. The residue was taken up in chloroform, washed with water, the organic layer dried over anhydrous sodium sulfate, filtered, and the desired product recovered by removal of the solvent in vacuo.

Examples LXXVIII through LXXXIV are illustrative of the procedures used to prepare other 16,21-diol-16-esters of this invention including $\Delta^1$, $\Delta^4$, and $\Delta^{1,6}$-derivatives of the compound prepared in accordance with Example LXXXIV. Other 16-esters in which the acyl group is an acyl hydrocarbon containing only carbon hydrogen oxide up to a total of ten carbon atoms are similarly prepared. Other 9,11-dihalo compounds of the invention are prepared in accordance with the procedures of Preparations V through IX above. A double bond in the 1,2-position may be introduced in accordance with the procedure of Preparation I. A double bond in the 6-position is introduced in accordance with the procedure of Preparation II.

EXAMPLE LXXXV

Preparation of 16,17-Acetonides

A variety of 16,17-acetonides of this invention were prepared in accordance with standard procedures. Those prepared included the acetals and ketals from acetaldehyde, propionaldehyde, butyraldehyde, isopropyl ketone, methyl ethyl ketone, and di-n-butyl ketone. The following example is illustrative of the procedure used.

A total of 100 mg. of $9\alpha,11\beta$-dichloro-21-methyl-$\Delta^{1,4}$-pregnadiene-$16\alpha,17\alpha$-21-triol-3,20-dione was taken up in 100 ml. of acetone which had been previously dried over anhydrous potassium carbonate. To this mixture there was added 495 mg. of anhydrous copper sulfate and the mixture was stirred at 20° C. to 30° C. for two days. It was then filtered, dried over anhydrous potassium carbonate, again filtered and the excess solvent removed in vacuo. The residue was triturated with ether containing a few drops of acetone and the desired product recovered by filtration.

EXAMPLE LXXXVI

A variety of mono and diesters of the 16,21-diols and 21-ols synthesized as described above were prepared by treatment with acylating agents by conventional methods. These included such compounds as mono and diformates, propionates, isbutyrates, hexanoates, and decanoates. The acid esters of polycarboxylic acids such as the hemisuccinates have the advantage that alkali metal or alkaline earth metal salts can be prepared from them by treatment with molecular proportions of a base such as sodium carbonate or calcium hydroxide. These salts in addition to being biologically active have the advantage of being more soluble in water than the free alcohols themselves or ordinary esters thereof.

What is claimed is:

1. A compound selected from the group consisting of those having the formulas:

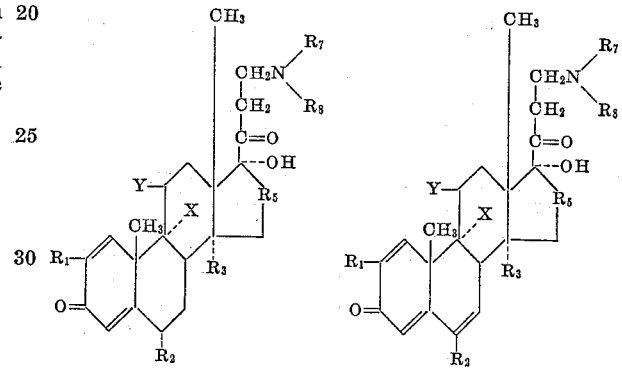

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_5$ is selected from the group consisting of

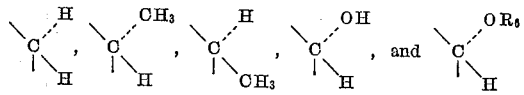

wherein $R_6$ is an acyl group; X is selected from the group consisting of chlorine and bromine; Y is selected from the group consisting of chlorine and fluorine when X is chlorine and from the group consisting of chlorine, bromine and fluorine when X is bromine; the total number of substitutents other than hydrogen in a particular compound in the 2-, 6-, 14- and 16-positions being from zero to one; $R_7$ and $R_8$ are selected from the group consisting of alkyl containing up to four carbon atoms; an acyl group containing only carbon, hydrogen and oxygen atoms and being derived from mono- and dicarboxylic acids containings up to ten carbon atoms.

2. A compound selected from the group consisting of those having the formulas:

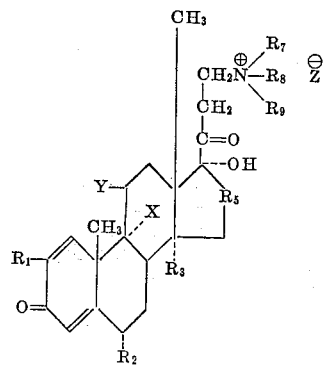

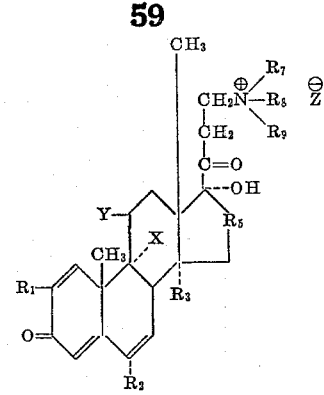

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_5$ is selected from the group consisting of:

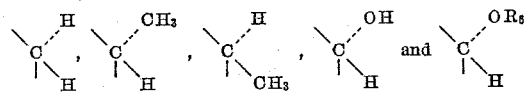

wherein $R_6$ is an acyl group; X is selected from the group consisting of chlorine and bromine; Y is selected from the group consisting of chlorine and fluorine when X is chlorine and from the group consisting of chlorine, bromine and fluorine when X is bromine; the total number of substituents other than hydrogen in a particular compound in the 2-, 6-, 14- and 16-positions being from zero to one; $R_7$, $R_8$, and $R_9$ are selected from the group consisting of alkyl containing up to four carbon atoms and Z is halogen; and acyl group containing only carbon, hydrogen and oxygen atoms and being derived from mono- and dicarboxylic acids and containing up to ten carbon atoms.

3. A compound selected from the group consisting of those having the formulas:

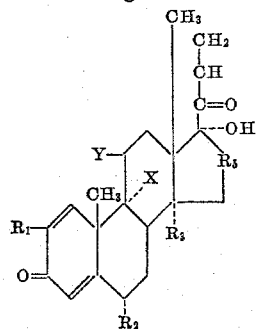

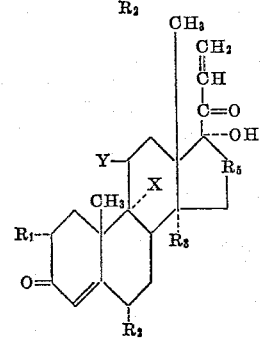

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_5$ is selected from the group consisting of:

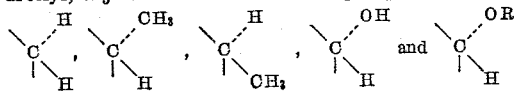

wherein $R_6$ is an acyl group; X is selected from the group consisting of chlorine and bromine; Y is selected from the group consisting of chlorine and fluorine when X is chlorine and from the group consisting of chlorine, bromine and fluorine when X is bromine: the total number of substituents other than hydrogen in a particular compound in the 2-, 6-, 14- and 16-positions being from zero to one; an acyl group containing only carbon, hydrogen and oxygen atoms and being derived from mono- and dicarboxylic acids containing up to ten carbon atoms.

4. A compound selected from the group consisting of those having the formulas:

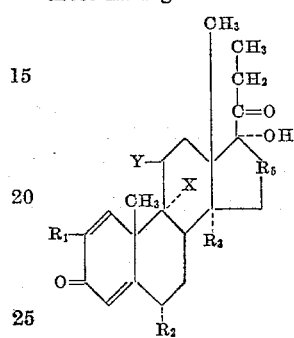 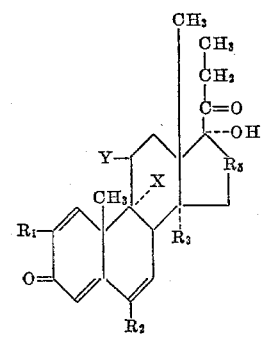

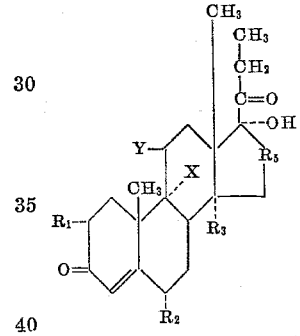 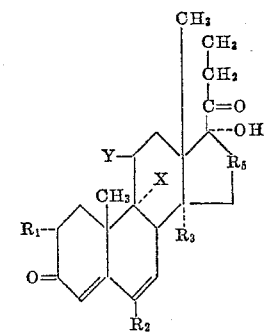

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_5$ is selected from the group consisting of:

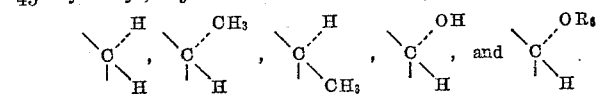

wherein $R_6$ is an acyl group; X is selected from the group consisting of chlorine and bromine; Y is selected from the group consisting of chlorine and fluorine when X is chlorine and from the group consisting of chlorine, bromine and fluorine when X is bromine; the total number of substituents other than hydrogen in a particular compound in the 2-, 6-, 14- and 16-positions being from zero to one; an acyl group containing only carbon, hydrogen and oxygen atoms and being derived from mono- and dicarboxylic acids containing up to ten carbon atoms.

5. A compound selected from the group consisting of those having the formulas:

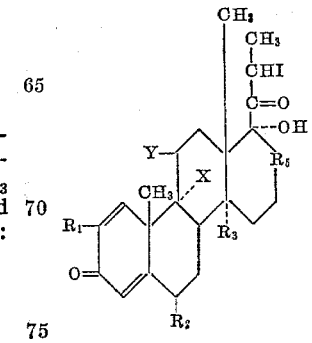 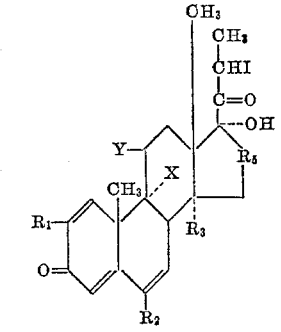

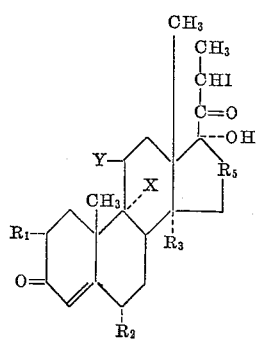

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_5$ is selected from the group consisting of:

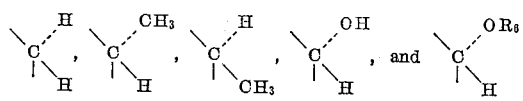

wherein $R_6$ is an acyl group; X is selected from the group consisting of chlorine and bromine; Y is selected from the group consisting of chlorine, and fluorine when X is chlorine and from the group consisting of chlorine, bromine and fluorine when X is bromine; the total number of substituents other than hydrogen in a particular compound in the 2-, 6-, 14- and 16-positions being from zero to one; an acyl group containing only carbon, hydrogen and oxygen atoms and being derived from mono- and discarboxylic acids containing up to ten carbon atoms.

6. A compound selected from the group consisting of those having the formulas:

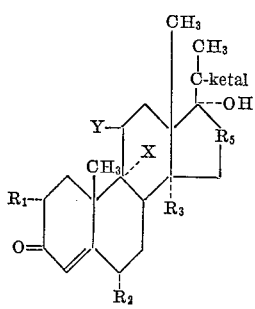

wherein the ketal moiety contains up to four carbon atoms; $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_5$ is selected from the group consisting of:

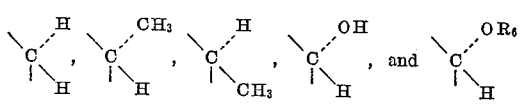

wherein $R_6$ is an acyl group; X is selected from the group consisting of chlorine and bromine; Y is selected from the group consisting of chlorine and fluorine when X is chlorine and from the group consisting of chlorine, bromine and fluorine when X is bromine; the total number of substituents other than hydrogen in a particular compound in the 2-, 6-, 14- and 16-positions being from zero to one; an acyl group containing only carbon, hydrogen and oxygen atoms and being derived from mono- and dicarboxylic acids containing up to ten carbon atoms.

7. A compound selected from the group consisting of those having the formulas:

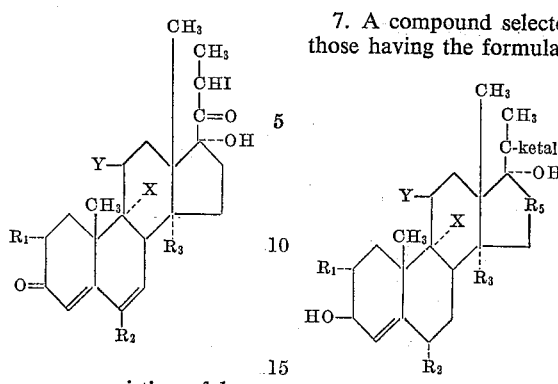

wherein the ketal moiety contains up to four carbon atoms; $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_5$ is selected from the group consisting of:

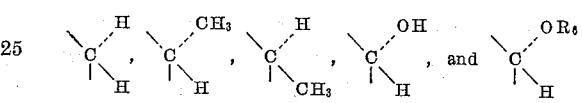

wherein $R_6$ is an acyl group; X is selected from the group consisting of chlorine and bromine; Y is selected from the group consisting of chlorine and fluorine when X is chlorine and from the group consisting of chlorine, bromine and fluorine when X is bromine; the total number of substituents other than hydrogen in a particular compound in the 2-, 6-, 14- and 16-positions being from zero to one; an acyl group containing only carbon, hydrogen and oxygen atoms and being derived from mono- and dicarboxylic acids containing up to ten carbon atoms.

8. A compound selected from the group consisting of those having the formulas:

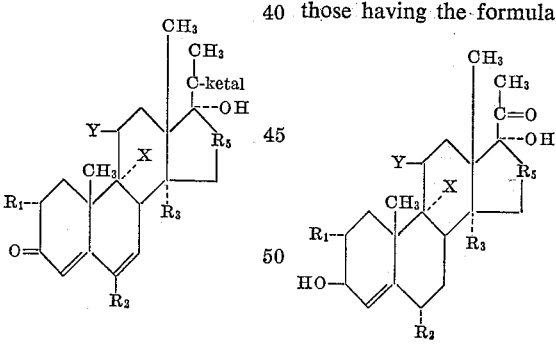

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_5$ is selected from the group consisting of:

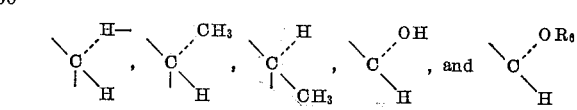

wherein $R_6$ is an acyl group; X is selected from the group consisting of chlorine and bromine; Y is selected from the group consisting of chlorine and fluorine when X is chlorine and from the group consisting of chlorine, bromine and fluorine when X is bromine; the total number of substituents other than hydrogen in a particular compound in the 2-, 6-, 14- and 16-positions being from zero to one; an acyl group containing only carbon, hydrogen and oxygen atoms and being derived from mono- and dicarboxylic acids containing up to ten carbon atoms.

9. A compound selected from the group consisting of those having the formulas:

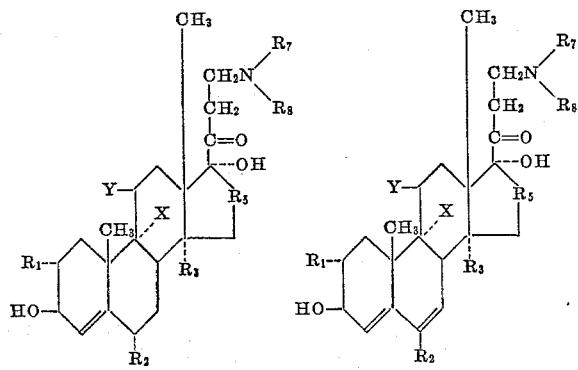

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_5$ is selected from the group consisting of:

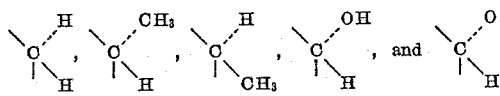

wherein $R_6$ is an acyl group; X is selected from the group consisting of chlorine and bromine; Y is selected from the group consisting of chlorine and fluorine when X is chlorine and from the group consisting of chlorine, bromine and fluorine when X is bromine; the total number of substituents other than hydrogen in a particular compound in the 2-, 6-, 14- and 16-positions being from zero to one; $R_7$ and $R_8$ are selected from the group consisting of alkyl containing up to four carbon atoms; an acyl group containing only carbon, hydrogen and oxygen atoms and being derived from mono- and dicarboxylic acids containing up to ten carbon atoms.

10. A compound selected from the group consisting of those having the formulas:

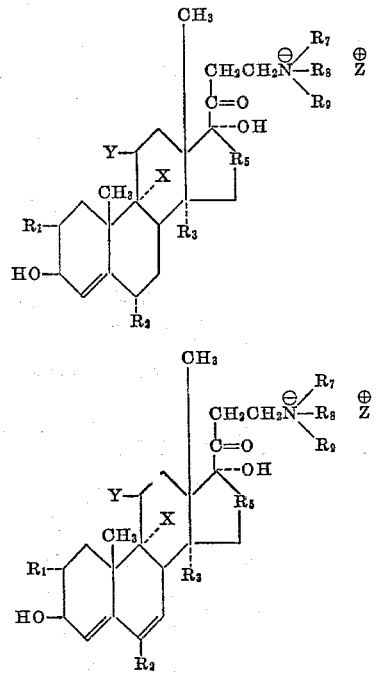

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_5$ is selected from the group consisting of:

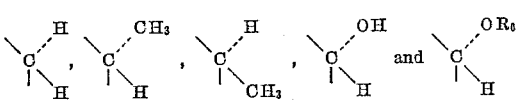

wherein $R_6$ is an acyl group; X is selected from the group consisting of chlorine and bromine; Y is selected from the group consisting of chlorine and fluorine when X is chlorine and from the group consisting of chlorine, bromine and fluorine when X is bromine; the total number of substituents other than hydrogen in a particular compound in the 2-, 6-, 14- and 16-positions being from zero to one; $R_7$, $R_8$ and $R_9$ are selected from the group consisting of alkyl containing up to four carbon atoms and Z is halogen; an acyl group containing only carbon, hydrogen and oxygen atoms and being derived from mono- and dicarboxylic acids containing up to ten carbon atoms.

11. A compound selected from the group consisting of those having the formulas:

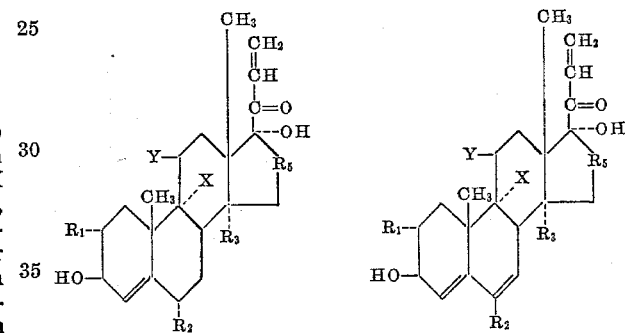

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_5$ is selected from the group consisting of:

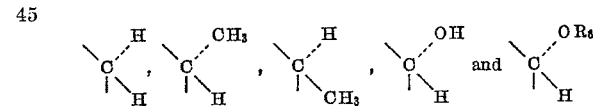

wherein $R_6$ is an acyl group; X is selected from the group consisting of chlorine and bromine; Y is selected from the group consisting of chlorine and fluorine when X is chlorine and from the group consisting of chlorine, bromine and fluorine when X is bromine; the total number of substituents other than hydrogen in a particular compound in the 2-, 6-, 14- and 16-positions being from zero to one; an acyl group containing only carbon, hydrogen and oxygen atoms and being derived from mono- and dicarboxylic acids containing up to ten carbon atoms.

12. A compound selected from the group consisting of those having the formulas:

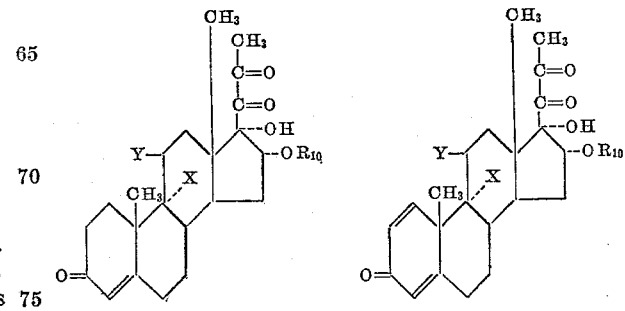

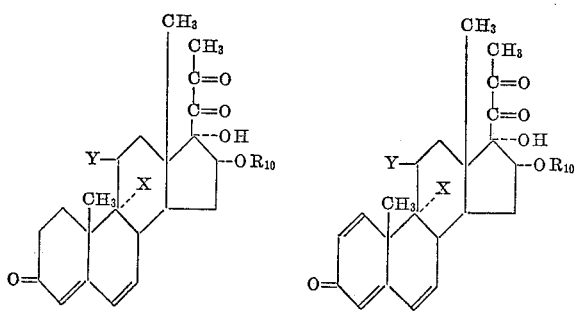

wherein X is selected from the group consisting of chlorine and bromine; Y is selected from the group consisting of chlorine and fluorine when X is chlorine and from the group consisting of chlorine, bromine and fluorine when X is bromine and $R_{10}$ is an acyl hydrocarbon group containing only carbon, hydrogen and oxygen up to a total of five carbon atoms and being derived from mono- and dicarboxylic acids.

13. A process which comprises reacting a compound selected from the group consisting of those having the formulas:

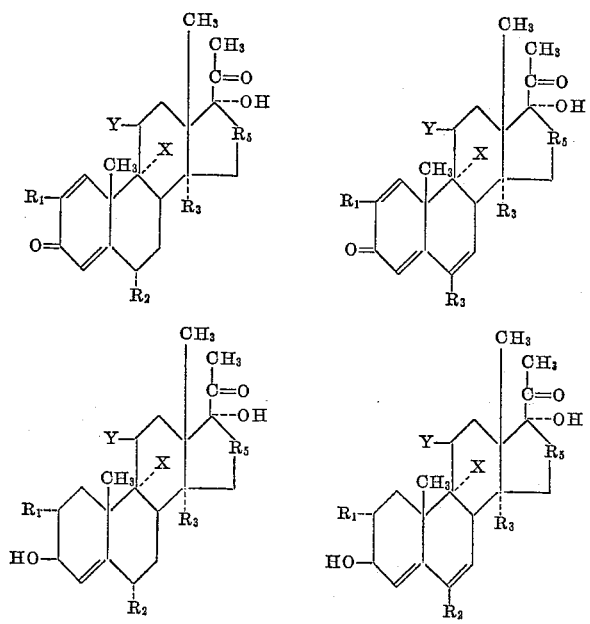

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_5$ is selected from the group consisting of:

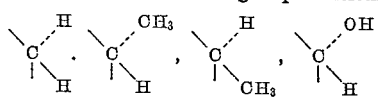

and

wherein $R_6$ is an acyl group; X is selected from the group consisting of chlorine and bromine; Y is selected from the group consisting of chlorine and fluorine when X is chlorine and from the group consisting of chlorine, bromine and fluorine when X is bromine; the total number of substituents other than hydrogen in a particular compound in the 2-, 6-, 14- and 16-positions being from zero to one; an acyl group containing only carbon, hydrogen and oxygen atoms and being derived from mono- and dicarboxylic acids containing up to ten carbon atoms; with a molar excess of formaldehyde and a lower alkyl amine salt, each alkyl group containing up to four carbon atoms at a pH of from about 2.5 to about 5.0 at a temperature of from about 90° C. to about 140° C. in an alkanol solvent containing up to five carbon atoms for a period of from about two to about twenty-four hours; reacting resulting 21-aminomethyl compound with an alkyl halide containing up to four carbon atoms in a lower alkanol solvent containing up to two carbon atoms at a temperature of from about 20° C. to about 30° C. for a period of from about 6 to about 16 hours and maintaining resulting quaternary ammonium halide compound in an aqueous solution at a pH of from about 7 to about 12 at a temperature of from about 20° C. to about 30° C. for a period of from about 1 to about 6 hours.

14. A process which comprises reacting a compound selected from the group consisting of those having the formulas:

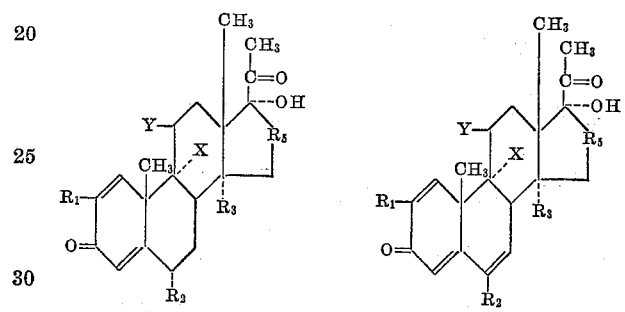

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_5$ is selected from the group consisting of:

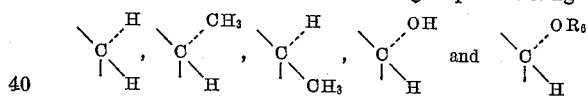

wherein $R_6$ is an acyl group; X is selected from the group consisting of chlorine and bromine; Y is selected from the group consisting of chlorine and fluorine when X is chlorine and from the group consisting of chlorine, bromine and fluorine when X is bromine; the total number of substituents other than hydrogen in a particular compound in the 2-, 6-, 14- and 16-positions being from zero to one; an acyl group containing only carbon, hydrogen and oxygen atoms and being derived from mono- and dicarboxylic acids containing up to ten carbon atoms; with a molar excess of formaldehyde and a lower alkyl amine salt, each alkyl group containing up to four carbon atoms, at a pH of from about 2.5 to about 5.0 at a temperature of from about 90° C. to about 140° C. in an alkanol solvent containing up to five carbon atoms for a period of from about 2 to about 24 hours; reacting resulting 21-aminomethyl compound with an alkyl halide containing up to four carbon atoms in a lower alkanol solvent containing up to two carbon atoms at a temperature of from about 20° C. to about 30° C. for a period of from about 6 to about 16 hours and maintaining resulting quaternary ammonium halide compound in an aqueous solution at a pH of from about 7 to about 12 at a temperature of from about 20° C. to about 30° C. for a period of from about 1 to about 6 hours; reacting resulting 17β-propenoyl compound with hydrogen in the presence of palladium in a liquid medium at from about 15° C. to about 35° C. at a pressure of from about 1 to about 10 atmospheres; reacting resulting 17β-propanoyl compound with from 4 to 6 molar equivalents of calcium oxide and 1.5 to 2 molar equivalents of iodine in a solvent system comprising 2 volumes of tetrahydrofuran and 1 volume of a lower alkanol containing up to four carbon atoms, the said solvent system containing tertiary butyl hydroperoxide in a quantity equivalent to from 0.006 to 0.018 grams of iodine/ml. of tetrahydrofuran, at a temperature of from about 20° C. to about 40° C. for a period of from about 2 to about 5 hours; and reacting resulting 21-iodo compound with from about a 200% molar excess to about a 2000% molar excess of a reagent selected from the group consisting of sodium and potassium salts of fatty acids containing up to five carbon atoms in a solvent selected from the group consisting of dimethyl formamide and aliphatic esters and ketones containing up to five carbon atoms at a temperature of from about 40° C. to about 100° C. for a period of from about 4 to about 24 hours.

15. A process which comprises reacting a compound selected from the group consisting of those having the formulas:

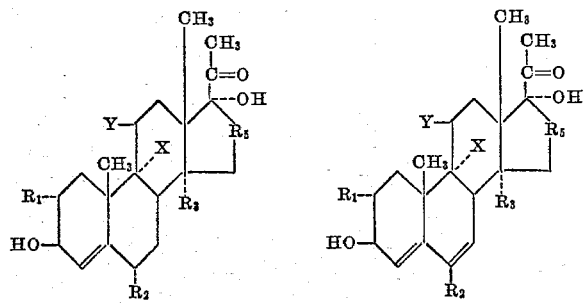

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_5$ is selected from the group consisting of:

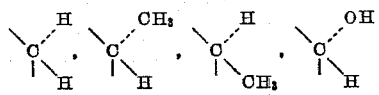

and

wherein $R_6$ is an acyl group; X is selected from the group consisting of chlorine and bromine; Y is selected from the group consisting of chlorine and fluorine when X is chlorine and from the group consisting of chlorine, bromine and fluorine when X is bromine; the total number of substituents other than hydrogen in a particular compound in the 2-, 6-, 14- and 16-positions being from zero to one; an acyl group containing only carbon, hydrogen and oxygen atoms and being derived from mono- and dicarboxylic acids containing up to ten carbon atoms; with a molar excess of formaldehyde and a lower alkyl amine salt, each alkyl group containing up to four carbon atoms, at a pH of from about 2.5 to about 5.0 at a temperature of from about 90° C. to about 140° C. in an alkanol solvent containing up to five carbon atoms for a period of from about 2 to about 24 hours; reacting resulting 21-aminomethyl compound with an alkyl halide containing up to four carbon atoms in a lower alkanol solvent containing up to two carbon atoms at a temperature of from about 20° C. to about 30° C. for a period of from about 6 to about 16 hours and maintaining resulting quaternary ammonium halide compound in an aqueous solution at a pH of from about 7 to about 12 at a temperature of from about 20° C. to about 30° C. for a period of from about 1 to about 6 hours; oxidizing resulting 17β-propenoyl compound, reducing resulting 3-keto compound with hydrogen in the presence of palladium in a liquid medium at from about 15° C. to about 35° C. at a pressure of from about 1 to about 10 atmospheres; reacting resulting 17β-propanoyl compound with from 4 to 6 molar equivalents of calcium oxide and 1.5 to 2 molar equivalents of iodine in a solvent system comprising 2 volumes of tetrahydrofuran and 1 volume of a lower alkanol containing up to four carbon atoms, the said solvent system containing tertiary butyl hydroperoxide in a quantity equivalent to from 0.006 to 0.018 grams of iodine/ml. of tetrahydrofuran, at a temperature of from about 20° C. to about 40° C. for a period of from about 2 to about 5 hours; and reacting resulting 21-iodo compound with from about a 200% molar excess to a 2000% molar excess of a reagent selected from the group consisting of sodium and potassium salts of fatty acids containing up to five carbon atoms in a solvent selected from the group consisting of dimethyl formamide and aliphatic esters and ketones containing up to five carbon atoms at a temperature of from about 40° C. to about 100° C. for a period of from about 4 to about 24 hours.

16. A process which comprises refluxing a compound selected from the group consisting of those having the formulas:

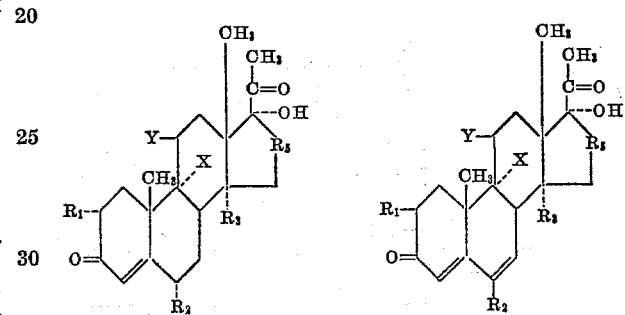

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_5$ is selected from the group consisting of:

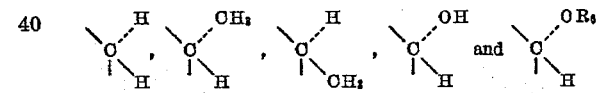

wherein $R_6$ is an acyl group; X is selected from the group consisting of chlorine and bromine; Y is selected from the group consisting of chlorine and fluorine when X is chlorine and from the group consisting of chlorine, bromine and fluorine when X is bromine; the total number of substituents other than hydrogen in a particular compound in the 2-, 6-, 14- and 16-positions being from zero to one; an acyl group containing only carbon, hydrogen and oxygen atoms and being derived from mono- and dicarboxylic acids containing up to ten carbon atoms; in benzene containing from about an equimolar portion to about a 10% molar excess of glycol containing up to four carbon atoms together with from about 0.5% to about 2.5% by weight of p-toluenesulfonic acid based on the weight of steroid substrate for of from about 15 to about 20 hours, reacting resulting 20-ketal compound with from about a 200% molar excess to about a 300% molar excess of sodium borohydride in a lower alkanol solvent containing up to threee carbon atoms at a temperature of from about 10° C. to about 40° C. for a period of from about 30 minutes to about 3 hours and hydrolyzing resulting 3-hydroxy compound by reaction with aqueous mineral acid in a water-miscible lower alkanol having up to three carbon atoms and containing from about 4% to about 20% by volume of concentrated acid at a temperature of from about 60° C. to about 100° C. for a period of from about 1 to about 4 hours.

References Cited in the file of this patent
UNITED STATES PATENTS
2,894,963    Gould et al. _____ June 14, 1959

UNITED STATES PATENT OFFICE
CERTIFICATE OF CORRECTION

Patent No. 3,064,017            November 13, 1962

Sanford K. Figdor et al.

It is hereby certified that error appears in the above numbered patent requiring correction and that the said Letters Patent should read as corrected below.

Column 21, lines 1 to 14, the right-hand formula should appear as shown below instead of as in the patent:

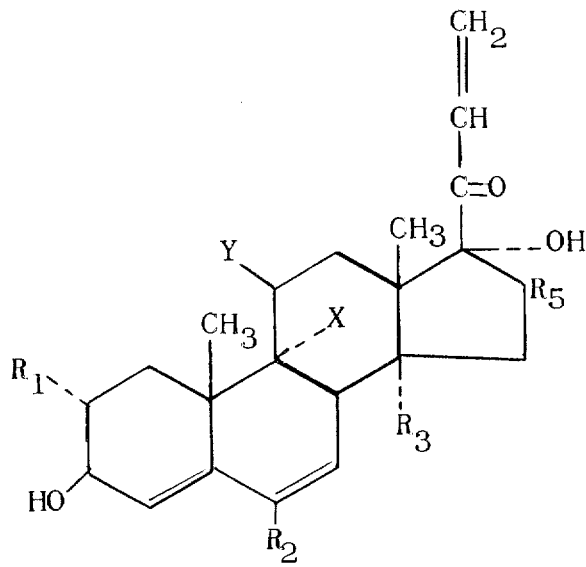

column 59, lines 40 to 59, the top two and the lower right-hand formulae should appear as shown below instead of as in the patent:

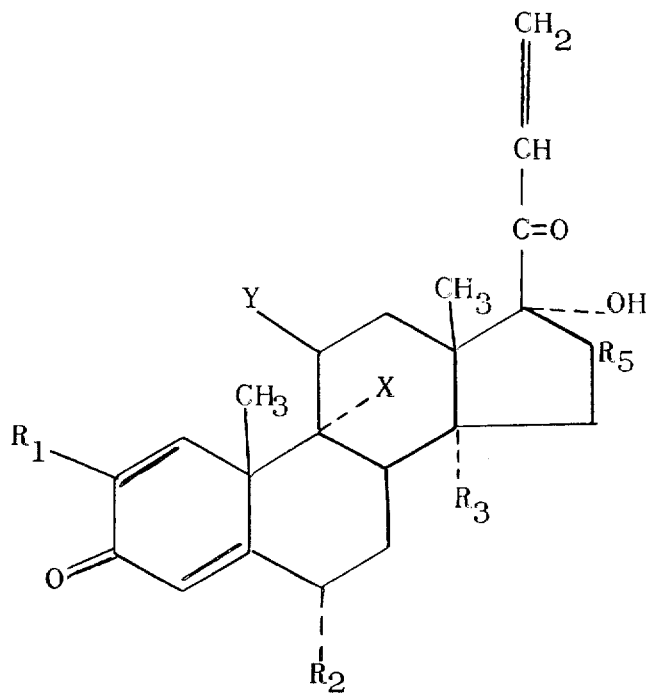

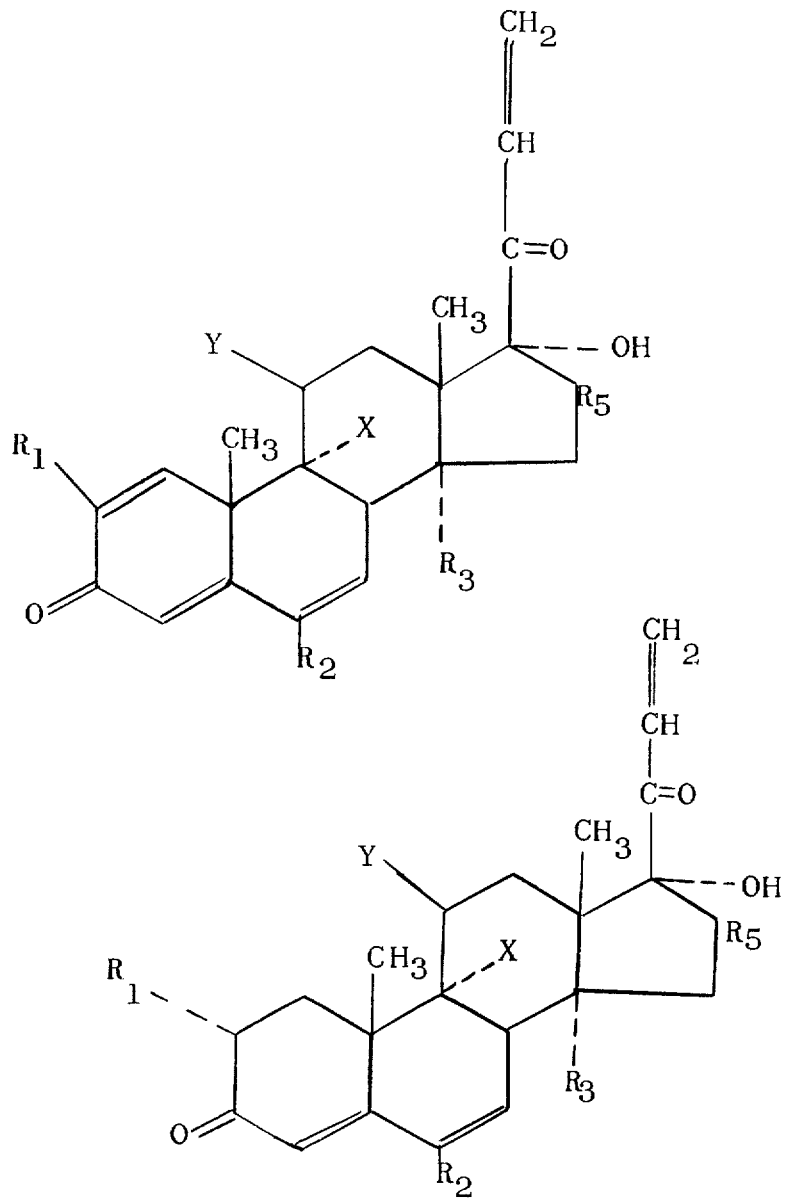

Signed and sealed this 18th day of June 1963.

(SEAL)
Attest:

ERNEST W. SWIDER
Attesting Officer

DAVID L. LADD

Commissioner of
Patents